US012432488B2

(12) United States Patent
Kim et al.

(10) Patent No.: US 12,432,488 B2
(45) Date of Patent: Sep. 30, 2025

(54) ACTIVE AND PASSIVE VIBRATION MEMBERS FOR OUTPUTTING SOUND

(71) Applicant: LG Display Co., Ltd., Seoul (KR)

(72) Inventors: Taehyung Kim, Gyeonggi-do (KR); Gyungbo Ha, Gyeonggi-do (KR); Seulki Nam, Gyeonggi-do (KR); Minjung Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 221 days.

(21) Appl. No.: 18/208,561

(22) Filed: Jun. 12, 2023

(65) Prior Publication Data

US 2024/0007783 A1 Jan. 4, 2024

(30) Foreign Application Priority Data

Jun. 30, 2022 (KR) ........................ 10-2022-0080215

(51) Int. Cl.

*H04R 1/28* (2006.01)
*H04R 7/06* (2006.01)
*H04R 17/00* (2006.01)

(52) U.S. Cl.

CPC ............. *H04R 1/2834* (2013.01); *H04R 7/06* (2013.01); *H04R 17/00* (2013.01)

(58) Field of Classification Search

CPC ........ H04R 1/283; H04R 1/2834; H04R 7/06; H04R 17/00; H04R 2499/15
USPC .......................................................... 381/337
See application file for complete search history.

(56) References Cited

U.S. PATENT DOCUMENTS

2002/0094095 A1* 7/2002 Ellis ........................ H04R 9/045 381/431
2018/0103306 A1* 4/2018 Pellikka ................. H04R 1/026
2019/0267535 A1* 8/2019 Hamada ............... H10N 30/872
2022/0097620 A1* 3/2022 Katz ...................... H04R 7/045
2022/0249273 A1* 8/2022 Martin .................... A61F 5/455

* cited by examiner

*Primary Examiner* — Katherine A Faley
(74) *Attorney, Agent, or Firm* — Morgan, Lewis & Bockius LLP

(57) ABSTRACT

An apparatus according to an embodiment of the present disclosure may include a passive vibration member and an active vibration member including a first active vibration member and a second active vibration member disposed at the passive vibration member. The first active vibration member and the second active vibration member may be disposed to be staggered each other with respect to a center portion of the passive vibration member.

44 Claims, 14 Drawing Sheets

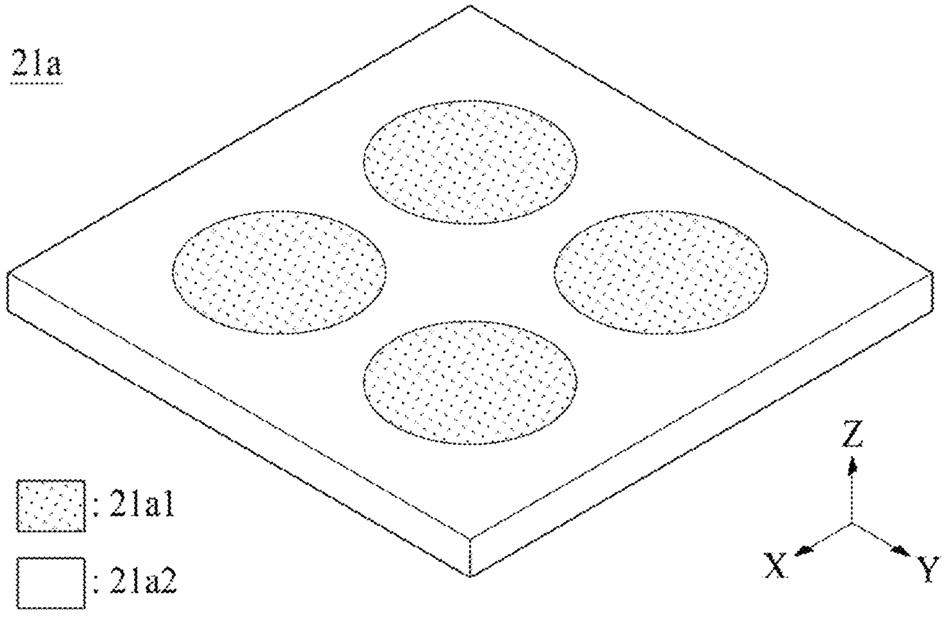
FIG. 6D
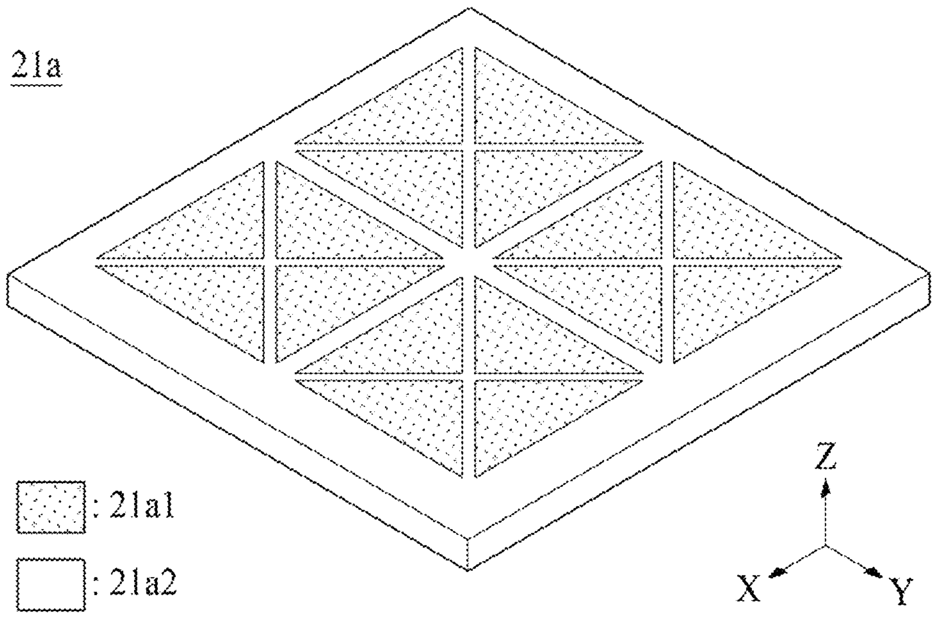

11: 11a, 11b, 11c,11d

ACTIVE AND PASSIVE VIBRATION MEMBERS FOR OUTPUTTING SOUND

CROSS-REFERENCE TO RELATED APPLICATIONS

This application claims the benefit of and priority to Korean Patent Application No. 10-2022-0080215 filed on Jun. 30, 2022, the entirety of each which is hereby incorporated by reference for all purposes as if fully set forth herein.

BACKGROUND

Technical Field

The present disclosure relates to an apparatus for outputting sound.

Discussion of the Related Art

An apparatus includes a separate speaker or sound apparatus providing a sound. When a speaker is disposed at an apparatus, the speaker occupies space of the apparatus. Thus, the design and spatial disposition of the apparatus are limited.

A speaker applied to the apparatus may be, for example, an actuator including a magnet and a coil. However, when the actuator is applied to the apparatus, a thickness thereof becomes bulky. Therefore, piezoelectric devices for realizing a thin thickness are attracting much attention.

Because piezoelectric devices have a fragile characteristic, the piezoelectric devices are easily damaged due to an external impact, and thus the reliability of sound reproduction is low. And, when a speaker such as a piezoelectric device or the like is applied to a flexible apparatus, there is a problem where damage occurs due to a fragile characteristic.

SUMMARY

Accordingly, the inventors of the present disclosure have recognized problems described above and have performed extensive research and experiments for implementing an apparatus for enhancing the quality of a sound and a sound pressure level characteristic. Through the extensive research and experiments, the inventors of the present disclosure have invented an apparatus which includes a new apparatus for enhancing the quality of a sound and a sound pressure level characteristic.

Accordingly, embodiments of the present disclosure are directed to an apparatus that substantially obviates one or more of the problems due to limitations and disadvantages of the related art.

An aspect of the present disclosure is to providing an apparatus which may enhance a sound pressure level of a low-pitched sound band.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, in one or more aspects, an apparatus may comprise a passive vibration member, and an active vibration member including a first active vibration member and a second active vibration member disposed at the passive vibration member, the first active vibration member and the second active vibration member are disposed to be staggered each other with respect to a center portion of the passive vibration member.

In another aspect, an apparatus may comprise a passive vibration member having first to fourth regions with respect to a center portion, and an active vibration member including a first active vibration member and a second active vibration member, the first and second active vibration members being disposed to overlap the center portion of the passive vibration member, center portions of each of the first active vibration member and the second active vibration member are spaced apart from the center portion of the passive vibration member to different regions among the first to fourth regions.

According to one or more embodiments of the present disclosure, a sound pressure level characteristic of the low-pitched sound band may be enhanced.

According to one or more embodiments of the present disclosure, a sound pressure level characteristic of the low-pitched sound band and the flatness of a sound pressure level characteristic may be improved.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

FIGS. 6A to 6D are a perspective view illustrating a vibration layer according to another embodiment of the present disclosure.

Figure 1:
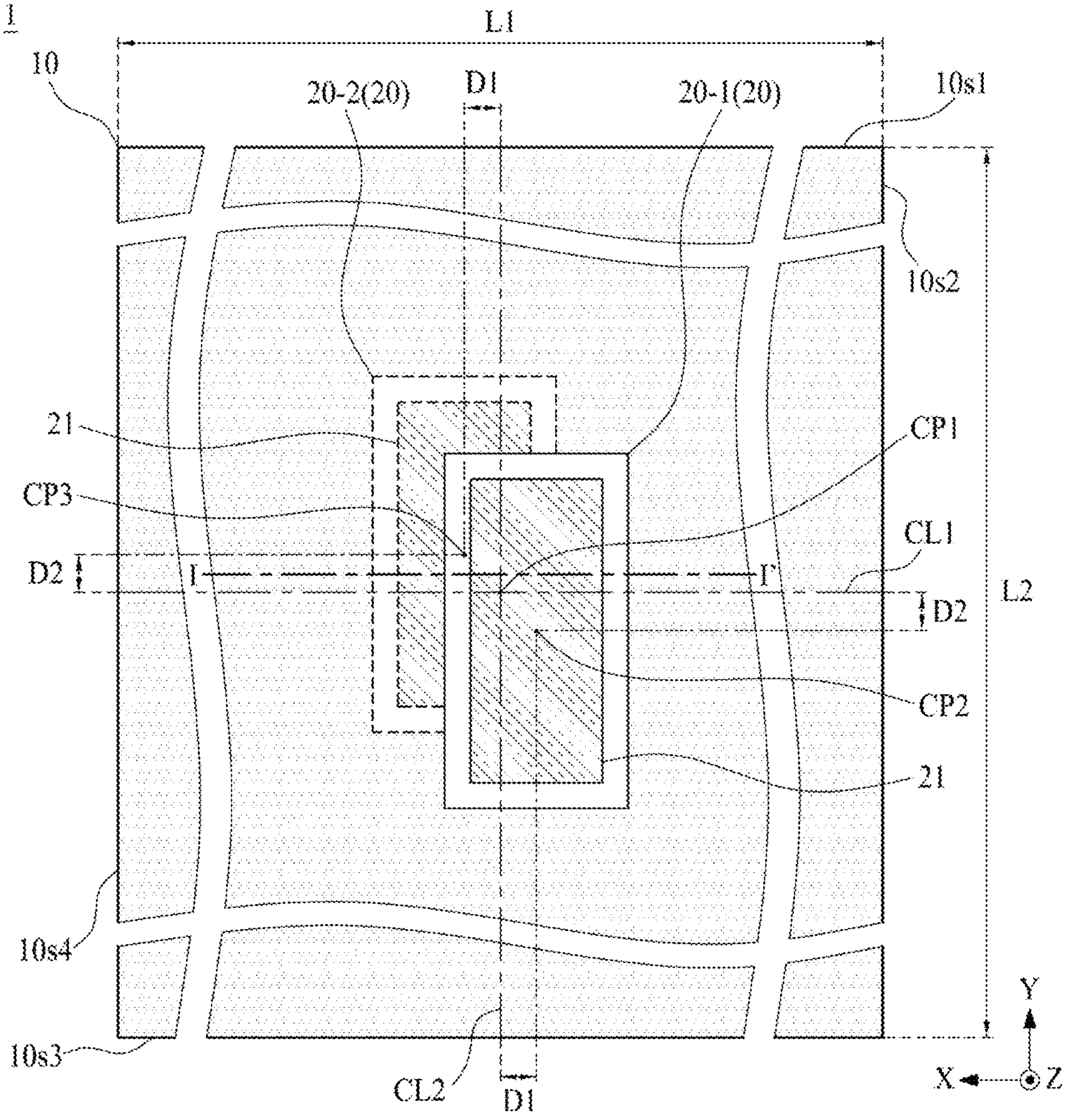
FIG. 1 is a cross-sectional view illustrating an apparatus according to an embodiment of the present disclosure.
Figure 2:
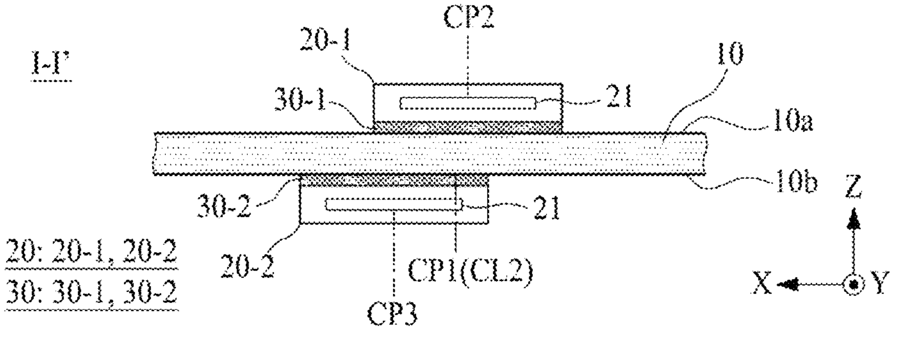
FIG. 2 is a cross-sectional view taken along line I-I' of FIG. 1 according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

The shapes, sizes, areas, ratios, angles, numbers, and the like disclosed in the drawings for describing embodiments of the present disclosure are merely an example, and thus, the present disclosure is not limited to the illustrated details. Like reference numerals refer to like elements throughout.

When the term "comprise," "have," "include," "contain," "constitute," "make up of," "formed of," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," or "adjacent to," "beside," "next to," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," and "before," "preceding," "prior to," or the like a case that is not consecutive or not sequential may be included unless a more limiting term, such as "just," "immediate(ly)," or "direct(ly)" is used.

It will be understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms “first,” “second,” and the like may be used to distinguish components from each other, but the functions or structures of the components are not limited by ordinal numbers or component names in front of the components.

In describing elements of the present disclosure, the terms “first,” “second,” “A,” “B,” “(a),” “(b),” or the like may be used. These terms are intended to identify the corresponding element(s) from the other element(s), and these are not used to define the essence, basis, order, or number of the elements.

For the expression that an element or layer is “connected,” “coupled,” “attached,” or “adhered” to another element or layer the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer “contacts,” “overlaps,” or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The terms such as a “line” or “direction” should not be interpreted only based on a geometrical relationship in which the respective lines or directions are parallel or perpendicular to each other, and may be meant as lines or directions having wider directivities within the range within which the components of the present disclosure can operate functionally.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as only one of the first item, the second item, or the third item.

The expression of a first element, a second elements “and/or” a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression “element A/element B” may be understood as element A and/or element B.

In one or more aspects, the terms “between” and “among” may be used interchangeably simply for convenience unless stated otherwise. For example, an expression “between a plurality of elements” may be understood as among a plurality of elements. In another example, an expression “among a plurality of elements” may be understood as between a plurality of elements. In one or more examples, the number of elements may be two. In one or more examples, the number of elements may be more than two.

In one or more aspects, the phrases “each other” and “one another” may be used interchangeably simply for convenience unless stated otherwise. For example, an expression “different from each other” may be understood as being different from one another. In another example, an expression “different from one another” may be understood as being different from each other. In one or more examples, the number of elements involved in the foregoing expression may be two. In one or more examples, the number of elements involved in the foregoing expression may be more than two.

In one or more aspects, the phrases “one or more among” and “one or more of” may be used interchangeably simply for convenience unless stated otherwise.

Features of various embodiments of the present disclosure may be partially or wholly coupled to or combined with each other, and may be variously inter-operated, linked or driven together. The embodiments of the present disclosure may be carried out independently from each other, or may be carried out together in a co-dependent or related relationship. In one or more aspects, the components of each apparatus according to various embodiments of the present disclosure are operatively coupled and configured.

Unless otherwise defined, the term is (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 is a cross-sectional view illustrating an apparatus according to an embodiment of the present disclosure.

With reference to FIG. 1, an apparatus 1 according to an embodiment of the present disclosure may implement a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, a vehicular apparatus may include one or more seats and one or more glass windows. For example, the vehicular apparatus may include a vehicle, a train, a ship, or an aircraft, but embodiments of the present disclosure are not limited thereto. And, the apparatus 1 according to an embodiment of the present disclosure may implement or realize an analog signage or a digital signage, or the like such as an advertising signboard, a poster, or a noticeboard, or the like.

The apparatus 1 according to an embodiment of the present disclosure may be a display apparatus including a plurality of pixels, but embodiments of the present disclosure are not limited thereto.

The display apparatus may include a display panel which includes a plurality of pixels configuring a black/white or color image and a driving part for driving the display panel. The pixel may be a subpixel which configures any one of a plurality of colors configuring a color image. The apparatus according to an embodiment of the present disclosure may include a set device (or a set apparatus) or a set electronic device such as a notebook computer, a TV, a computer monitor, an equipment apparatus including an automotive apparatus or another type apparatus for vehicles, or a mobile electronic device such as a smartphone, or an electronic pad, or the like which is a complete product (or a final product) including a display panel such as a liquid crystal display panel or an organic light emitting display panel, or the like.

The apparatus 1 according to a first embodiment of the present disclosure may include a passive vibration member 10 and an active vibration member 20.

The passive vibration member 10 may vibrate based on driving (or vibration) of the active vibration member 20. For example, the passive vibration member 10 may generate one or more of a vibration and a sound based on the driving of the active vibration member 20.

The passive vibration member 10 according to an embodiment of the present disclosure may be a display panel including a display part (or a screen) having a plurality of pixels which implement a black/white or color image. Therefore, the passive vibration member 10 may generate one or more of a vibration and a sound based on driving of the active vibration member 20. For example, the passive vibration member 10 may vibrate based on driving of the active vibration member 20 while displaying an image on the display part, thereby generating or outputting a sound synchronized with the image in the display part. For example, the passive vibration member 10 may be a vibration object, a display member, a display panel, a signage panel, a vibration plate, a passive vibration plate, a front member, a rear member, a vibration panel, a sound panel, a passive vibration panel, a sound output plate, a sound vibration plate, or an image screen, or the like, but embodiments of the present disclosure are not limited thereto.

The passive vibration member 10 according to an embodiment of the present disclosure may be configured to be transparent, translucent, or opaque. The passive vibration member 10 may include a metal material or a nonmetal material (or a composite nonmetal material) having a material characteristic suitable for outputting a sound based on a vibration.

According to an embodiment of the present disclosure, the metal material of the passive vibration member 10 may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the passive vibration member 10 may be configured as a metal material such as aluminum (Al) or a plastic material such as plastic or styrene material, but embodiments of the present disclosure are not limited thereto. For example, the styrene material may be an ABS material. The ABS material may be acrylonitrile, butadiene, or styrene.

According to an embodiment of the present disclosure, the nonmetal material (or the composite nonmetal material) of the passive vibration member 10 may include one or more material (or substance) of plastic, fiber, leather, wood, cloth, rubber, carbon, glass, and paper, but embodiments of the present disclosure are not limited thereto. For example, the paper may be cone for speakers. For example, the cone may be pulp or foamed plastic, or the like, but embodiments of the present disclosure are not limited thereto.

According to an embodiment of the present disclosure, the passive vibration member 10 may include a plastic material including a porous pattern. The porous pattern may be a bubble, a micro bubble, or a foam, but embodiments of the present disclosure are not limited thereto. The passive vibration member 10 may be configured as a micro foamable and rollable plastic material. For example, the passive vibration member 10 may include a porous plastic material or a micro cellular plastic material. For example, the passive vibration member 10 may be configured as a polyethylene terephthalate (PET) material or a polycarbonate (PC) material. For example, the passive vibration member 10 may be configured as a Micro Cellular polyethylene terephthalate (MCPET) material.

The passive vibration member 10 according to another embodiment of the present disclosure may include a display panel including a pixel configured to display an image, or may include a non-display panel. For example, the passive vibration member 10 may include one or more of a display panel including a pixel configured to display an image, a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), or an inorganic light emitting lighting panel (or apparatus), but embodiments of the present disclosure are not limited thereto.

The passive vibration member 10 may include first to fourth regions. For example, the passive vibration member 10 may include the first to fourth regions with respect to a center portion CP1. For example, the passive vibration member 10 may include the first to fourth regions defined by a first center line CL1 and a second center line CL2 orthogonal to each other at the center portion CP1 (or a same plane). For example, with respect to the center portion CP1, the passive vibration member 10 may include a first region (or first upper region) corresponding to the upper left region, a second region (or second upper region) corresponding to the upper right region, a third region (or first lower region) corresponding to the lower left region, and a fourth region (or second lower region) corresponding to the lower right region.

The passive vibration member 10 may be a tetragonal shape which has a first length L1 parallel to a first direction X and a second length L2 parallel to a second direction Y. For example, the passive vibration member 10 may be a plate-shaped structure including a tetragonal shape. For example, the passive vibration member 10 may have a square shape in which the first length L1 and the second length L2 are the same, but embodiments of the present disclosure are not limited thereto, and the passive vibration member 10 may have a rectangular shape with the first lengths L1 and second lengths L2 different from each other. For example, a first direction X may be a first horizontal direction. The first direction X may be a first longitudinal direction or a widthwise direction of the passive vibration member 10. A second direction Y may be a second horizontal direction crossing the first direction X. The second direction Y may be a second longitudinal direction or a lengthwise direction of the passive vibration member 10.

The passive vibration member 10 may include a first side **10*s*1 (or a first sidewall or a first outer surface), a second side 10*s*2 (or a second sidewall or a second outer surface), a third side 10*s*3 (or a third sidewall or a third outer surface, and a fourth side 10*s*4 (or a fourth sidewall or a fourth outer surface). The first side 10*s*1 may have a first length L1** and the second side 10*s*2 may have a second length L2. The third side 10*s*3 may be parallel to the first side 10*s*1 and the fourth side 10*s*4 nay be parallel to the second side 10*s*2. For example, in the passive vibration member 10, the first center line CL1 may be parallel to the first direction X and may be located between the first side 10*s*1 and the third side 10*s*3. For example, in the passive vibration member 10, the distance between each of the first side 10*s*1 and the third side 10*s*3 and the first center line CL1 may be half of the second length L2. For example, in the passive vibration member 10, the second center line CL2 may be parallel to the second direction Y and may be located between the second side 10*s*2 and the fourth side 10*s*4. For example, in the passive vibration member 10, the distance between each of the second side 10*s*2 and the fourth side 10*s*4 and the second center line CL2 may be half of the first length L1.

The active vibration member 20 may be configured to vibrate the passive vibration member 10. Accordingly, the passive vibration member 10 may vibrate based on the vibration of the active vibration member 20 to generate or output one or more of vibration and sound. The active vibration member 20 may be connected to the passive vibration member 10 through or via or by a connection member 30. For example, the active vibration member 20 may be connected to both surfaces of the passive vibration member 10 through or via or by the connection member 30. For example, the active vibration member 20 may be connected to each of a first surface (or a front surface) and a second surface (or a rear surface) of the passive vibration member 10 through or via or by the connection member 30.

The active vibration member 20 according to an embodiment of the present disclosure may include a first active vibration member 20-1 and a second active vibration member 20-2.

The first active vibration member 20-1 may be connected to the first to fourth regions of the passive vibration member 10 to have an asymmetric arrangement structure or an asymmetric structure with respect to the center portion CP1 (or the first center portion) of the passive vibration member 10. For example, the first active vibration member 20-1 may be disposed to be biased toward the fourth region of the passive vibration member 10. For example, the center portion CP2 of the first active vibration member 20-1 may be disposed at the fourth region of the passive vibration member 10.

The second active vibration member 20-2 may be connected to the first to fourth regions of the passive vibration member 10 to have an asymmetric arrangement structure or an asymmetric structure with respect to the center portion CP1 of the passive vibration member 10. For example, the second active vibration member 20-2 may be disposed to be biased toward the first region of the passive vibration member 10. For example, the center portion CP3 of the second active vibration member 20-2 may be disposed at the first region of the passive vibration member 10.

According to an embodiment of the present disclosure, the first active vibration member 20-1 and the second active vibration member 20-2 may be disposed to be staggered with respect to the center portion CP1 of the passive vibration member 10. For example, the first active vibration member 20-1 and the second active vibration member 20-2 may be disposed to be staggered with respect to the center portion CP1 of the passive vibration member 10 within a range overlapped each other with the passive vibration member 10 therebetween. For example, the first active vibration member 20-1 and the second active vibration member 20-2 may be disposed to be staggered each other along a diagonal direction between the first direction X and the second direction Y with respect to the center portion CP1 of the passive vibration member 10 within a range overlapped each other with the passive vibration member 10 therebetween.

According to another embodiment of the present disclosure, the center portion CP2 of the first active vibration member 20-1 and the center portion CP3 of the second active vibration member 20-2 may be disposed at different quadrants in the passive vibration member 10. For example, the center portion CP2 of the first active vibration member 20-1 and the center portion CP3 of the second active vibration member 20-2 may be disposed to be biased toward the center portion CP1 of the passive vibration member 10 within different quadrants of the passive vibration member 10. For example, the center portion CP2 of the first active vibration member 20-1 and the center portion CP3 of the second active vibration member 20-2 may be disposed between the center portion of the corresponding quadrant and the center portion CP1 of the passive vibration member 10.

According to another embodiment of the present disclosure, each of the first active vibration member 20-1 and the second active vibration member 20-2 may be disposed to overlap the center portion CP1 of the passive vibration member 10. The center portion CP2 of the first active vibration member 20-1 and the center portion CP3 of the second active vibration member 20-2 may be spaced apart from the center portion CP1 of the passive vibration member 10 in different regions among the first to fourth regions. For example, the center portion CP2 of the first active vibration member 20-1 and the center portion CP3 of the second active vibration member 20-2 may be spaced apart from the center portion CP1 of the passive vibration member 10 in different regions which are located in a diagonal direction between the first direction X and the second direction Y among the first to fourth regions. For example, the center portion CP1 of the passive vibration member 10 may be disposed at an overlapping region between the first active vibration member 20-1 and the second active vibration member 20-2.

According to another embodiment of the present disclosure, the center portion CP2 of the first active vibration member 20-1 and the center portion CP3 of the second active vibration member 20-2 may be spaced apart from the center portion CP1 of the passive vibration member 10 by a first distance D1 along the first direction X and may be spaced apart from the center portion CP1 of the passive vibration member 10 by a second distance D2 along the second direction Y. For example, the center portion CP2 of the first active vibration member 20-1 and the center portion CP3 of the second active vibration member 20-2 may be spaced apart from the second center line CL2 of the passive vibration member 10 by the first distance D1 along the first direction X and may be spaced apart from the first center line CL1 of the passive vibration member 10 by the second distance D2 along the second direction Y. For example, the first distance D1 and the second distance D2 may be the same or different.

According to an embodiment of the present disclosure, the first distance D1 may be less than or equal to 1/10 of the first length L1 of the passive vibration member 10 ($D1 \le (L1)/10$) or less than or equal to 0.1 times of the first length L1 the passive vibration member 10 ($D1 \le 0.1 \times L1$), but embodiments of the present disclosure are not limited thereto. For example, the second distance D2 may be less than or equal to 1/10 of the second length L2 of the passive vibration member 10 (D2≤(L2)/10) or less than or equal to 0.1 times the second length L2 of the passive vibration member 10 (D2≤0.1×L2), but embodiments of the present disclosure are not limited thereto.

According to an embodiment of the present disclosure, when the passive vibration member 10 is vibrated by vibration of the first active vibration member 20-1 and the second active vibration member 20-2, the central vibration mode of the passive vibration member 10 is maximized and the mode shape of the peripheral vibration mode is corrected, and thus one or more of peak and dip generated in a reproduction frequency band of a sound (or a sound pressure level) generated by the vibration of the passive vibration member 10 may be reduced. Furthermore, each of a highest sound pressure level and a lowest sound pressure level generated in the reproduction frequency band of the sound (or the sound pressure level) generated by the vibration of the passive vibration member 10 is reduced, and thus the flatness of the sound pressure level may be improved. For example, the central vibration mode may be an odd-numbered vibration mode such as a first vibration mode and a third vibration mode, and the peripheral vibration mode may be an even-numbered vibration mode such as a secondary vibration mode and a fourth vibration mode.

According to an embodiment of the present disclosure, if the first distance D1 is greater than 1/10 of the first length L1 of the passive vibration member 10 (D1>L1/10) and the second distance D2 is greater than 1/10 of the second length L2 of the passive vibration member 10 (D2>L2/10), the intensity of the central vibration mode of the passive vibration member 10 decreases or dip increases due to offset interference between the vibration of the center portion CP2 of the first active vibration member 20-1 and the vibration of the center portion CP3 of the second active vibration member 20-2, and thus the flatness of the sound pressure level may be reduced.

According to an embodiment of the present disclosure, the first active vibration member 20-1 and the second active vibration member 20-2 may have structures inverted from each other and may be configured to be displaced (or vibrated or driven) in a same direction. For example, a phase of a vibration driving signal applied to the first active vibration member 20-1 and a phase of a vibration driving signal applied to the second active vibration member 20-2 may be opposite to each other (or opposite phases or anti-phases), but embodiments of the present disclosure are not limited thereto.

According to another embodiment of the present disclosure, the first active vibration member 20-1 and the second active vibration member 20-2 may have a non-inverted structure and may be configured to be displaced (or vibrated or driven) in a same direction. For example, the phase of the vibration driving signal applied to the first active vibration member 20-1 and the phase of the vibration driving signal applied to the second active vibration member 20-2 may be the same phase, but embodiments of the present disclosure are not limited thereto.

Each of the first active vibration member 20-1 and the second active vibration member 20-2 according to an embodiment of the present disclosure may include a vibration part 21.

The vibration part 21 may be disposed at a central portion of each of the first active vibration member 20-1 and the second active vibration member 20-2. For example, the vibration part 21 may be disposed at the central portion of each of the first active vibration member 20-1 and the second active vibration member 20-2 except for the periphery portion of each of the first active vibration member 20-1 and the second active vibration member 20-2. The vibration part 21 of the first active vibration member 20-1 and the vibration part 21 of the second active vibration member 20-2 may be configured to be displaced (or vibrated or driven) in the same direction. The phase of the vibration driving signal applied to the vibration part 21 of the first active vibration member 20-1 and the phase of the vibration driving signal applied to the vibration part 21 of the second active vibration member 20-2 may have the same phase or the opposite phases, but embodiments of the present disclosure are not limited thereto.

In the first active vibration member 20-1 according to an embodiment of the present disclosure, the vibration part 21 may be disposed at the first to fourth regions of the passive vibration member 10 to have an asymmetrical structure with respect to the center portion CP1 of the passive vibration member 10. For example, a size (or an area) of an overlapping region (or an arrangement region) between each of the first to fourth regions of the passive vibration member 10 and the vibration part 21 may be the largest at the fourth region and may be the smallest at the first region. The size of the overlapping region at the second region may be greater than that of the size of the overlapping region at the third region. The size of the overlapping region at the third region may be greater than that of the size of the overlapping region at the first region.

In the first active vibration member 20-1 according to an embodiment of the present disclosure, the center portion (or the second center portion) CP2 of the vibration part 21 may be spaced apart from the center portion CP1 of the passive vibration member 10. For example, the center portion CP2 of the vibration part 21 may be spaced apart from the center portion CP1 of the passive vibration member 10 in a diagonal direction. For example, the center portion CP2 of the vibration part 21 may be disposed at the fourth region (or lower right region) of the passive vibration member 10 diagonally spaced apart from the center portion CP1 of the passive vibration member 10.

According to an embodiment of the present disclosure, the center portion CP2 of the vibration part 21 may be spaced apart from the second center line CL2 of the passive vibration member 10 by the first distance D1 along the first direction X and may be spaced apart from the first center line CL1 of the passive vibration member 10 by the second distance D2 along the second direction Y. For example, the first distance D1 and the second distance D2 may be the same or different from each other. For example, the first distance D1 may be greater than or equal to 1/100 of the first length L1 of the passive vibration member 10 and less than or equal to 1/10 of the first length L1 of the passive vibration member 10 (L1/100≤D1≤L1/10), or may be greater than or equal to 0.01 times the first length L1 of the passive vibration member 10 and less than or equal to 0.1 times the first length L1 of the passive vibration member 10 (0.01×L1≤D1≤0.1×L1). For example, the second distance D2 may be greater than or equal to 1/100 of the second length L2 of the passive vibration member 10 and less than or equal to 1/10 of the second length L2 of the passive vibration member 10 (L2/100≤D2≤L2/10), or greater than or equal to 0.01 times the second length L2 of the passive vibration member 10 and less than or equal to 0.1 times the second length L2 of the passive vibration member 10 (0.01×L2≤D2≤0.1×L2). Accordingly, the center portion CP2 of the vibration part 21 may be disposed to be biased toward the center portion CP1 of the passive vibration member 10 within the fourth region of the passive vibration member 10. The fourth region of the passive vibration member 10 may be a region defined by the center portion CP1, the second side 10*s*2, and the third side 10*s*3 at the passive vibration member 10.

In the second active vibration member 20-2 according to an embodiment of the present disclosure, the vibration part 21 may be disposed at the first to fourth regions of the passive vibration member 10 to have an asymmetrical structure with respect to the center portion CP1 of the passive vibration member 10. For example, the size (or area) of the overlapping region (or arrangement region) between each of the first to fourth regions of the passive vibration member 10 and the vibration part 21 may be the largest at the first region and may be the smallest at the fourth region. The size of the overlapping region at the third region may be greater than that of the size of the overlapping region at the second region. The size of the overlapping region at the second region may be greater than that of the size of the overlapping region at the fourth region.

In the second active vibration member 20-2 according to an embodiment of the present disclosure, the center portion (or the third center portion) CP3 of the vibration part 21 may be spaced apart from the center portion CP1 of the passive vibration member 10. For example, the center portion CP3 of the vibration part 21 may be spaced apart from the center portion CP1 of the passive vibration member 10 in a diagonal direction. For example, the center portion CP3 of the vibration part 21 may be disposed at the first region (or upper left region) of the passive vibration member 10 diagonally spaced apart from the center portion CP1 of the passive vibration member 10. For example, the center portion CP3 of the vibration part 21 may be spaced apart from the second center line CL2 of the passive vibration member 10 by the first distance D1 along the first direction X and may be spaced apart from the first center line CL1 of the passive vibration member 10 by the second distance D2 along the second direction Y. Accordingly, the center portion CP3 of the vibration part 21 may be disposed to be biased toward the center portion CP1 of the passive vibration member 10 within the first region of the passive vibration member 10. The first region of the passive vibration member 10 may be a region defined by the center portion CP1, the first side 10*s*1, and the fourth side 10*s*4 at the passive vibration member 10.

The vibration part 21 of the second active vibration member 20-2 may overlap the vibration part 21 of the first active vibration member 20-1. The vibration part 21 of the second active vibration member 20-2 and the vibration part 21 of the first active vibration member 20-1 may be disposed to be staggered within a range overlapping each other with the passive vibration member 10 therebetween. For example, vibration part 21 of the second active vibration member 20-2 and the vibration part 21 of the first active vibration member 20-1 may be arranged along the diagonal direction within a range overlapping each other with the passive vibration member 10 therebetween. For example, the center portion CP1 of the passive vibration member 10 may be disposed between the center portion CP2 of the vibration part 21 of the first active vibration member 20-1 and the center portion CP3 of the vibration part 21 of the second active vibration member 20-2 along the diagonal direction. For example, the center portion CP1 of the passive vibration member 10, the center portion CP2 of the vibration part 21 of the first active vibration member 20-1, and the center portion CP3 of the vibration part 21 of the second active vibration member 20-2 may be positioned or aligned on the one diagonal line or a same diagonal line, but embodiments of the present disclosure are not limited thereto.

According to an embodiment of the present disclosure, in the first active vibration member 20-1, the center portion CP2 of the vibration part 21 may overlap a portion (or a periphery portion) of the second active vibration member 20-2 and may not overlap the vibration part 21 of the second active vibration member 20-2. In the second active vibration member 20-2, the center portion CP3 of the vibration part 21 may overlap a portion (or a periphery portion) of the first active vibration member 20-1 and may not overlap the vibration part 21 of the first active vibration member 20-1.

According to an embodiment of the present disclosure, the first active vibration member 20-1 and the second active vibration member 20-2 may be disposed to be staggered each other or to be shifted along the diagonal direction with respect to the center portion CP1 of the passive vibration member 10 within a range overlapping each other with the passive vibration member 10 therebetween, and thus it is possible to increase the displacement width (or vibration width or driving width) of the passive vibration member 10 and improve the sound pressure level characteristic and/or the sound characteristic in a low-pitched sound band generated by vibration of the passive vibration member 10. For example, a vibration magnitude of the active vibration member 20 is increased than that of a vibration magnitude of a single first active vibration member 20-1 (or a single second active vibration member 20-2) by the first active vibration member 20-1 and the second active vibration member 20-2 disposed to be staggered each other, thereby increasing a direct vibration area of the passive vibration member 10 directly vibrated by the active vibration member 20, and thus it is possible to improve the sound pressure level characteristic and/or the sound characteristic in a low-pitched sound band generated by vibration of the passive vibration member 10. For example, the low-pitched sound band may be less than 300 Hz or 500 Hz, but embodiments of the present disclosure are not limited thereto.

The active vibration member 20 according to an embodiment of the present disclosure may include the first active vibration member 20-1 and the second active vibration member 20-2 disposed to be staggered each other with respect to the center portion CP1 of the passive vibration member 10, thereby maximizing the central vibration mode and correcting the mode shape of the peripheral vibration mode. Accordingly, one or more of peak and dip generated in the reproduction frequency band of the sound (or the sound pressure level) generated by the vibration of the passive vibration member 10 may be reduced, and thus each of the highest sound pressure level and the lowest sound pressure level generated in the reproduction frequency band of the sound (or the sound pressure level) generated by the vibration of the passive vibration member 10 is reduced, thereby improving the flatness of the sound pressure level.

The first active vibration member 20-1 may be connected to the first surface 10*a* of the passive vibration member 10 through or via or by the first connection member 30-1 of the connection member 30. For example, the first active vibration member 20-1 may be connected to the front surface 10*a* of the passive vibration member 10 through or via or by the first connection member 30-1 of the connection member 30.

The second active vibration member 20-2 may be connected to the second surface 10*b* of the passive vibration member 10 through or via or by the second connection member 30-2 of the connection member 30. For example, the second active vibration member 20-2 may be connected to the rear surface 10*b* of the passive vibration member 10 through or via or by the second connection member 30-2 of the connection member 30.

The connection member 30 or the first connection member 30-1 and the second connection member 30-2 according to an embodiment of the present disclosure may be configured as a material including an adhesive layer which is good in adhesive force or attaching force with respect to each of the passive vibration member 10 and the active vibration member 20. For example, the connection member 30 or the first connection member 30-1 and the second connection member 30-2 may include a foam pad, a double-sided tape, a double-sided foam pad, a double-sided foam tape, an adhesive, a double-sided adhesive tape, a double-sided adhesive foam tape, or a tacky sheet, but embodiments of the present disclosure are not limited thereto. For example, when the connection member 30 or the first connection member 30-1 and the second connection member 30-2 include the tacky sheet (or a tacky layer), the connection member 30 or the first connection member 30-1 and the second connection member 30-2 may include only an adhesive layer or a tacky layer without a base member such as a plastic material or the like.

The adhesive layer (or a tacky layer) of the connection member 30 or the first connection member 30-1 and the second connection member 30-2 according to an embodiment of the present disclosure may include epoxy, acrylic, silicone, or urethane, but embodiments of the present disclosure are not limited thereto. The adhesive layer (or a tacky layer) of the connection member 30 or the first connection member 30-1 and the second connection member 30-2 according to another embodiment of the present disclosure may include a pressure sensitive adhesive (PSA), an optically clear adhesive (OCA), or an optically clear resin (OCR), but embodiments of the present disclosure are not limited thereto. For example, the adhesive layer of the connection member 30 or the first connection member 30-1 and the second connection member 30-2 may include an acrylic-based material (or substance) having a characteristic where an adhesive force is relatively better and hardness is higher than the urethane-based material. Accordingly, a vibration of the active vibration member 20 may be transferred to the passive vibration member 10 well.

The adhesive layer of the connection member 30 or the first connection member 30-1 and the second connection member 30-2 may further include an additive, such as a tackifier or an adhesion enhancing agent, a wax component, an anti-oxidation agent, or the like, but embodiments of the present disclosure are not limited thereto. The additive may prevent or reduce the connection member 30 from being detached (or delamination) from the passive vibration member 10 by a vibration of the active vibration member 20. For example, the tackifier may be rosin derivative or the like, and the wax component may be paraffin wax or the like. For example, the anti-oxidation agent may be a phenol-based anti-oxidation agent, such as thioester, but embodiments of the present disclosure are not limited thereto.

The apparatus 1 according to an embodiment of the present disclosure includes the first active vibration member 20-1 and the second active vibration member 20-2 disposed to be staggered each other, thereby maximizing the central vibration mode of the passive vibration member 10 and correcting the mode shape of the peripheral vibration mode. Accordingly, one or more of peak and dip generated in the reproduction frequency band of the sound (or the sound pressure level) generated by the vibration of the passive vibration member 10 may be reduced and each of the highest sound pressure level and the lowest sound pressure level generated in the reproduction frequency band of the sound (or the sound pressure level) generated by the vibration of the passive vibration member 10 may be reduced, thereby improving the flatness of the sound pressure level.

Figure 3:
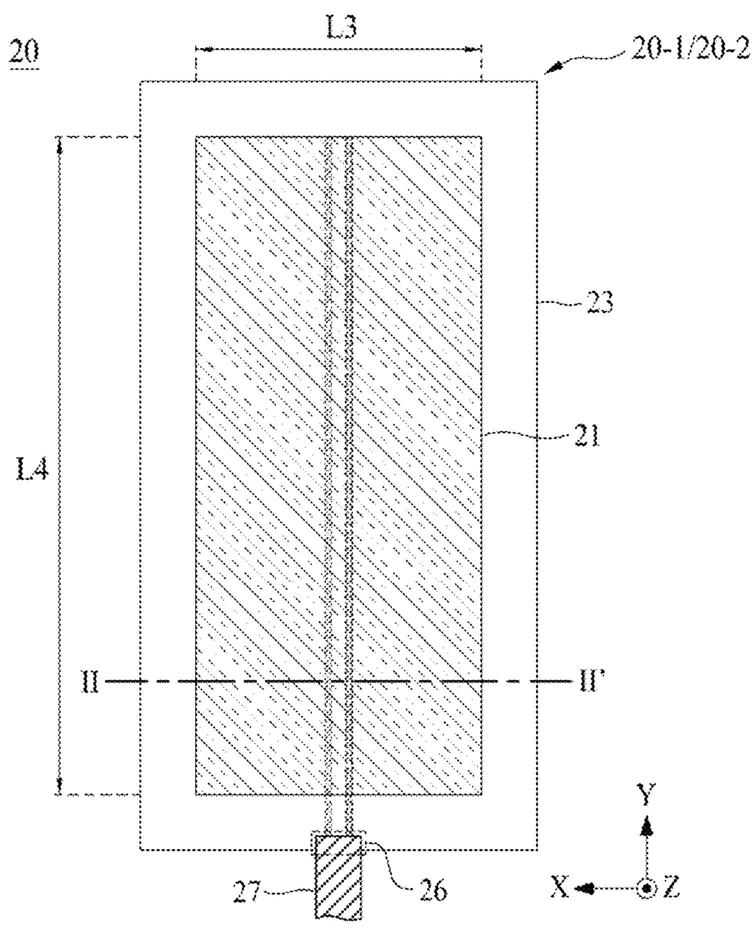
FIG. 3 illustrates an active vibration member according to an embodiment of the present disclosure illustrated in FIG. 1.
Figure 4:
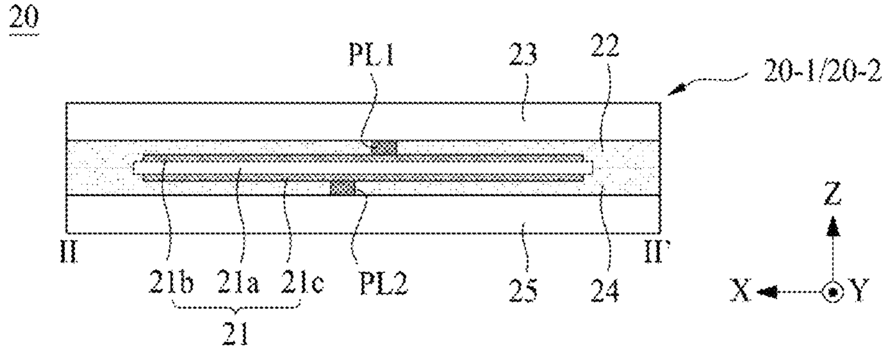
FIG. 4 is a cross-sectional view taken along line II-II' illustrated in FIG. 3 according to an embodiment of the present disclosure.
Figure 5:
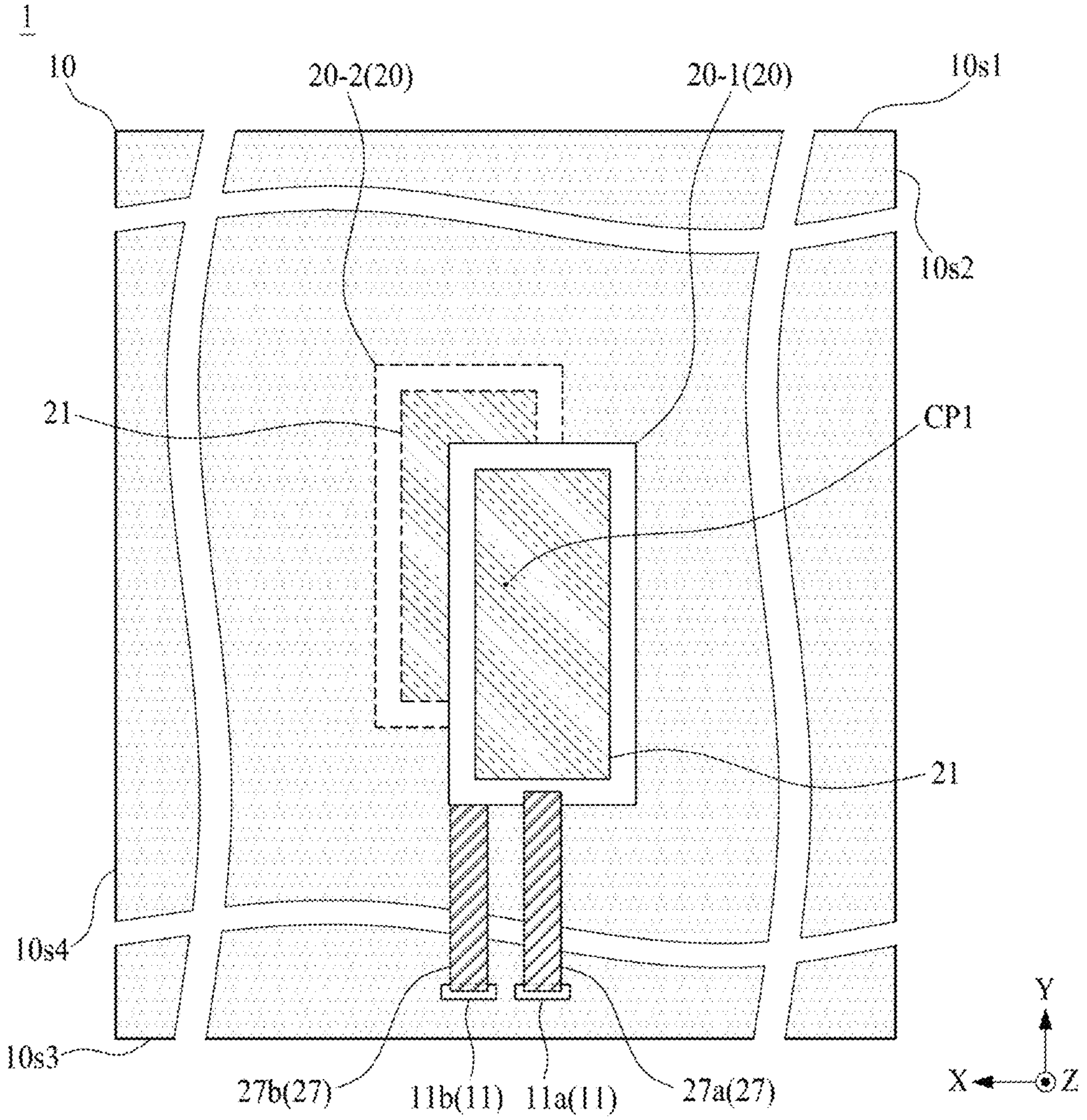
FIG. 5 illustrates a connection structure of a signal cable connected to the active vibration member according to an embodiment of the present disclosure illustrated in FIG. 3.

FIG. 3 illustrates an active vibration member according to an embodiment of the present disclosure illustrated in FIG. 1. FIG. 4 is a cross-sectional view of line II-II' illustrated in FIG. 3 according to an embodiment of the present disclosure. FIGS. 3 and 4 illustrate a first active vibration member or a second active vibration member of the active vibration member according to an embodiment of the present disclosure. FIG. 5 illustrates a connection structure of a signal cable connected to the active vibration member according to an embodiment of the present disclosure shown in FIG. 3.

With reference to FIGS. 1 to 4, the active vibration member 20 (or the first active vibration member 20-1 and the second active vibration member 20-2) according to an embodiment of the present disclosure may be referred to as a vibration device, a vibration apparatus, a flexible vibration apparatus, a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite speaker, a film speaker, a film-type piezoelectric speaker, or a film-type piezoelectric composite speaker, or the like, but embodiments of the present disclosure are not limited thereto.

The active vibration member 20 (or the first active vibration member 20-1 and the second active vibration member 20-2) according to an embodiment of the present disclosure may include a vibration part 21. For example, the vibration part 21 may be a piezoelectric vibration part or a piezoelectric type vibration part.

The vibration part 21 may be a tetragonal shape having a third length L3 and a fourth length L4. For example, the vibration part 21 may have a rectangular shape having the third length L3 of 5 cm or more and the fourth length L4 of 10 cm or more.

The vibration part 21 according to an embodiment of the present disclosure may include a vibration layer 21*a*, a first electrode layer 21*b*, and a second electrode layer 21*c*.

The vibration layer 21*a* may be formed of a transparent piezoelectric material, semitransparent piezoelectric material, or opaque piezoelectric material. The vibration layer 21*a* may be transparent, semitransparent, or opaque.

The vibration layer 21*a* may include a piezoelectric material (or an electroactive material) which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 21*a* may be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto.

The vibration layer 21*a* may be configured as an inorganic material portion or a piezoelectric material portion. The inorganic material portion may include a piezoelectric material, a composite piezoelectric material, or an electroactive material which includes a piezoelectric effect. The vibration layer 21*a* may be configured as a ceramic-based material capable of implementing a relatively high vibration, or may be configured as a piezoelectric ceramic having a perovskite crystalline structure.

The vibration layer 21*a* according to another embodiment of the present disclosure may include one or more of lead (Pb), zirconium (Zr), titanium (Ti), zinc (Zn), nickel (Ni), and niobium (Nb), but embodiments of the present disclosure are not limited thereto. For example, the vibration layer 21*a* may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. For example, the vibration layer 21*a* may include at least one or more of calcium titanate ($CaTiO_3$), barium titanate ($BaTiO_3$), and strontium titanate ($SrTiO_3$), each without lead (Pb), but embodiments of the present disclosure are not limited thereto.

The first electrode layer 21*b* may be disposed at a first surface (or an upper surface) of the vibration layer 21*a*. The first electrode layer 21*b* may have the same size as that of the vibration layer 21*a*, or may have a size which is smaller than that of the vibration layer 21*a*. For example, the first electrode layer 21*b* may be formed at a whole first surface, other than a periphery portion, of the vibration layer 21*a*.

The second electrode layer 21*c* may be disposed at a second surface (or a lower surface) which is opposite to or different from the first surface of the vibration layer 21*a*. The second electrode layer 21*c* may have the same size as that of the vibration layer 21*a*, or may have a size which is smaller than that of the vibration layer 21*a*. For example, the second electrode layer 21*c* may be formed at an entire second surface, other than a periphery portion, of the vibration layer 21*a*. For example, the second electrode layer 21*c* may have a same shape as that of the vibration layer 21*a*, but embodiments of the present disclosure are not limited thereto.

One or more of the first electrode layer 21*b* and the second electrode layer 21*c* according to an embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), or magnesium (Mg), or the like, and an alloy of any thereof, but embodiments of the present disclosure are not limited thereto.

The vibration layer 21*a* may be polarized (or poling) by a certain voltage applied to the first electrode layer 21*b* and the second electrode layer 21*c* in a certain temperature atmosphere, or a temperature atmosphere that may be changed from a high temperature to a room temperature, but embodiments of the present disclosure are not limited thereto. For example, the vibration layer 21*a* may alternately and repeatedly contract or expand based on an inverse piezoelectric effect according to a sound signal (or a voice signal) applied to the first electrode layer 21*b* and the second electrode layer 21*c* from the outside to vibrate. For example, the vibration layer 21*a* may vibrate based on a vertical direction vibration and a planar direction vibration by the signal applied to the first electrode layer 21*b* and the second electrode layer 21*c*. The vibration layer 21*a* may increase the displacement of the passive vibration member 10 by contraction and/or expansion of the planar direction, thereby further improving the vibration of the passive vibration member 10.

According to an embodiment of the present disclosure, the vibration layer 21*a* of the first active vibration member 20-1 and the vibration layer 21*a* of the second active vibration member 20-2 may have polarization directions (or poling directions) that are opposite to each other. For example, the vibration layer 21*a* of the first active vibration member 20-1 may have a polarization direction (or a poling direction) from the first electrode layer 21*b* toward the second electrode layer 21*c*. For example, the vibration layer 21*a* of the second active vibration member 20-2 may have a polarization direction (or a poling direction) from the second electrode layer 21*c* toward the first electrode layer 21*b*. For example, when the vibration layer 21*a* of the first active vibration member 20-1 and the vibration layer 21*a* of the second active vibration member 20-2 have polarization directions (or poling directions) that are opposite to each other, a vibration driving signal applied to the first active vibration member 20-1 and a vibration driving signal applied to the second active vibration member 20-2 may be signals having opposite phases to each other.

According to an embodiment of the present disclosure, the vibration layer 21*a* of the first active vibration member 20-1 and the vibration layer 21*a* of the second active vibration member 20-2 may have polarization directions (or poling directions) in the same direction as each other. For example, each of the vibration layer 21*a* of the first active vibration member 20-1 and the vibration layer 21*a* of the second active vibration member 20-2 may have a polarization direction (or a poling direction) from the first electrode layer 21*b* toward the second electrode layer 21*c*. For example, each of the vibration layer 21*a* of the first active vibration member 20-1 and the vibration layer 21*a* of the second active vibration member 20-2 may have a polarization direction (or a poling direction) from the second electrode layer 21*c* toward the first electrode layer 21*b*. For example, when the vibration layer 21*a* of the first active vibration member 20-1 and the vibration layer 21*a* of the second active vibration member 20-2 have polarization directions (or poling directions) in the same direction as each other, a vibration driving signal applied to the first active vibration member 20-1 and a vibration driving signal applied to the second active vibration member 20-2 may be signals having same phases to each other.

The active vibration member 20 (or the first active vibration member 20-1 and the second active vibration member 20-2) according to an embodiment of the present disclosure may further include a first cover member 23 and a second cover member 25.

The first cover member 23 may be disposed at a first surface of the vibration part 21. For example, the first cover member 23 may be configured to cover the first electrode layer 21*b*. Accordingly, the first cover member 23 may protect the first electrode layer 21*b*.

The second cover member 25 may be disposed at a second surface of the vibration part 21. For example, the second cover member 25 may be configured to cover the second electrode layer 21*c*. Accordingly, the second cover member 25 may protect the second electrode layer 21*c*.

Each of the first cover member 23 and the second cover member 25 according to an embodiment of the present disclosure may include one or more material of plastic, fiber, leather, wood, cloth, rubber, carbon, glass, and paper, but embodiments of the present disclosure are not limited thereto. For example, each of the first cover member 23 and the second cover member 25 may include the same material or different material. For example, each of the first cover member 23 and the second cover member 25 may be a polyimide film or a polyethylene terephthalate film, but embodiments of the present disclosure are not limited thereto.

The first cover member 23 according to an embodiment of the present disclosure may be connected or coupled to the first electrode layer 21*b* by a first adhesive layer 22. For example, the first cover member 23 may be connected or coupled to the first electrode layer 21*b* by a film laminating process using the first adhesive layer 22.

The second cover member 25 according to an embodiment of the present disclosure may be connected or coupled to the second electrode layer 21*c* by a second adhesive layer 24. For example, the second cover member 25 may be connected or coupled to the second electrode layer 21*c* by a film laminating process using the second adhesive layer 24.

The first adhesive layer 22 may be disposed between the first electrode layer 21*b* and the first cover member 23. The second adhesive layer 24 may be disposed between the second electrode layer 21*c* and the second cover member 25. For example, the first adhesive layer 22 and second adhesive layer 24 may be configured between the first cover member 23 and the second cover member 25 to surround the vibration layer 21*a*, the first electrode layer 21*b*, and the second electrode layer 21*c*. For example, the first adhesive layer 22 and second adhesive layer 24 may be configured between the first cover member 23 and the second cover member 25 to completely surround the vibration layer 21*a*, the first electrode layer 21*b*, and the second electrode layer 21*c*. For example, the vibration layer 21*a*, the first electrode layer 21*b*, and the second electrode layer 21*c* may be embedded or built-in between the first adhesive layer 22 and the second adhesive layer 24.

Each of the first adhesive layer 22 and second adhesive layer 24 according to an embodiment of the present disclosure may include an electrically insulating material which has adhesiveness and is capable of compression and decompression. For example, each of the first adhesive layer 22 and the second adhesive layer 24 may include an epoxy resin, an acrylic resin, a silicone resin, or a urethane resin, but embodiments of the present disclosure are not limited thereto.

The active vibration member 20 (or the first active vibration member 20-1 and the second active vibration member 20-2) according to an embodiment of the present disclosure may further include a first power supply line PL1, a second power supply line PL2, and a pad part 26.

The first power supply line PL1 may be configured to be electrically connected to the first electrode layer 21*b*. For example, the first power supply line PL1 may be disposed between the first electrode layer 21*b* and the first cover member 23 and may be electrically connected to the first electrode layer 21*b*. The first power supply line PL1 may be extended long along the second direction Y and may be electrically connected to a central portion of the first electrode layer 21*b*. As an embodiment of the present disclosure, the first power supply line PL1 may be electrically connected to the first electrode layer 21*b* by an anisotropic conductive film. As another embodiment of the present disclosure, the first power supply line PL1 may be electrically connected to the first electrode layer 21*b* through a conductive material (or particle) included in the first adhesive layer 22.

The second power supply line PL2 may be configured to be electrically connected to the second electrode layer 21*c*. For example, the second power supply line PL2 may be disposed between the second electrode layer 21*c* and the second cover member 25 and may be electrically connected to the second electrode layer 21*c*. The second power supply line PL2 may be extended long along the second direction Y and may be electrically connected to a central portion of the second electrode layer 21*c*. As an embodiment of the present disclosure, the second power supply line PL2 may be electrically connected to the second electrode layer 21*c* by an anisotropic conductive film. As another embodiment of the present disclosure, the second power supply line PL2 may be electrically connected to the second electrode layer 21*c* through a conductive material (or particle) included in the second adhesive layer 24.

According to an embodiment of the present disclosure, the first power supply line PL1 may be disposed not to overlap the second power supply line PL2. When the first power supply line PL1 is disposed not to overlap the second power supply line PL2, a short circuit between the first power supply line PL1 and the second power supply line PL2 may be prevented.

The pad part 26 may be configured to be electrically connected to the first power supply line PL1 and the second power supply line PL2. The pad part 26 may be configured at one periphery portion of any one of the first cover member 23 and the second cover member 25 to be electrically connected to one end (or one side) of each of the first power supply line PL1 and the second power supply line PL2.

The pad part 26 according to an embodiment of the present disclosure may include a first pad electrode electrically connected to the one end (or one side) of the first power supply line PL1, and a second pad electrode electrically connected to the one end (or one side) of the second power supply line PL2.

The first pad electrode may be disposed at one periphery portion of any one of the first cover member 23 and the second cover member 25 to be electrically connected to the one end (or one side) of the first power supply line PL1. For example, the first pad electrode may pass through any one of the first cover member 23 and the second cover member 25 to be electrically connected to the one end (or one side) of the first power supply line PL1.

The second pad electrode may be disposed in parallel with the first pad electrode to be electrically connected to the one end (or one side) of the second power supply line PL2. For example, the second pad electrode may pass through any one of the first cover member 23 and the second cover member 25 to be electrically connected to the one end (or one side) of the second power supply line PL2.

According to an embodiment of the present disclosure, each of the first power supply line PL1, the second power supply line PL2, and the pad part 26 may be configured to be transparent, translucent, or opaque.

The apparatus 1 or the active vibration member 20 according to an embodiment of the present disclosure may further include a signal cable 27.

The signal cable 27 may be electrically connected to the pad part 26 and may supply the vibration part 21 with a vibration driving signal (or a sound signal or a voice signal) provided from a sound processing circuit. The signal cable 27 according to an embodiment of the present disclosure may include a first terminal electrically connected to the first pad electrode of the pad part 26 and a second terminal electrically connected to the second pad electrode of the pad part 26. For example, the signal cable 27 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto. For example, signal cable 27 may be configured to be transparent, translucent, or opaque.

The signal cable 27 according to an embodiment of the present disclosure may pass through a hole 11 configured at the passive vibration member 10 to be electrically connected to a sound processing circuit. For example, one side of the signal cable 27 may be electrically connected to the pad part 26 of the active vibration member 20, and the other side of the signal cable 27 may be disposed at the second surface 10*b* of the passive vibration member 10 through the hole 11 configured at the passive vibration member 10. For example, the other side of the signal cable 27 may be electrically connected to the sound processing circuit at a rear surface of the second surface 10*b* of the passive vibration member 10. For example, the hole 11 may be a cable hole, a cable through hole, a cable outlet, a cable outlet hole, a slit, or a slot, but embodiments of the present disclosure are not limited thereto.

The passive vibration member 10 according to another embodiment of the present disclosure may include one or more holes 11. For example, the passive vibration member 10 may include a first hole 11*a* and a second hole 11*b*. According to an embodiment of the present disclosure, the first hole 11*a* and the second hole 11*b* may be connected (or communicated) to each other. Accordingly, the passive vibration member 10 may include one or more holes 11*a* and 11*b* through which the signal cables 27*a* and 27*b* pass. The wiring of the signal cable 27 may pass through one or more holes 11*a* and 11*b* collectively. And, the signal cables 27*a* and 27*b* may be disposed at one side of the passive vibration member 10, the wiring of the signal cables 27*a* and 27*b* may collectively pass through or via or by one or more holes 11*a* and 11*b*.

One or more holes 11*a* and 11*b* or the first hole 11*a* and the second hole 11*b* may be configured to penetrate (or vertically pass through) the passive vibration member 10 along a thickness direction Z of the passive vibration member 10.

The first hole 11*a* may be configured at a first part of the passive vibration member 10 adjacent to the first active vibration member 20-1 of the active vibration member 20. Thereby, the signal cable 27*a* connected to the first active vibration member 20-1 may pass through or via or by the first hole 11*a* of the passive vibration member 10 to be electrically connected to the sound processing circuit.

The second hole 11*b* may be configured at a second part of the passive vibration member 10 adjacent to the second active vibration member 20-2 of the active vibration member 20. Thereby, the signal cable 27*b* connected to the second active vibration member 20-2 may pass through the second hole 11*b* of the passive vibration member 10 to be electrically connected to the sound processing circuit.

The sound processing circuit may generate a vibration driving signal of an alternating current (AC) type including a first vibration driving signal and a second vibration driving signal based on a sound data provided from an external sound data generating circuit part.

Each of the first and second vibration driving signals may include a vibration driving signal having a first polarity and a vibration driving signal having a second polarity. For example, the vibration driving signal having the first polarity may be a positive (+) vibration driving signal. The vibration driving signal having the second polarity may be a negative (−) vibration driving signal.

The first vibration driving signal may be supplied to the vibration part 21 of the first active vibration member 20-1 through the signal cable 27 of the first active vibration member 20-1. For example, the vibration driving signal having the first polarity of the first vibration driving signal may be supplied to the first electrode layer 21*b* through the first terminal of the signal cable 27*a*, the first pad electrode of the pad part 26, and the first power supply line PL1. The vibration driving signal having the second polarity of the first vibration driving signal may be supplied to the second electrode layer 21*c* through the second terminal of the signal cable 27*a*, the second pad electrode of the pad part 26, and the second power supply line PL2.

The second vibration driving signal may be supplied to the vibration part 21 of the second active vibration member 20-2 through the signal cable 27 of the second active vibration member 20-2. For example, the vibration driving signal having the first polarity of the second vibration driving signal may be supplied to the first electrode layer 21*b* through the first terminal of the signal cable 27*a*, the first pad electrode of the pad part 26, and the first power supply line PL1. The vibration driving signal having the second polarity of the second vibration driving signal may be supplied to the second electrode layer 21*c* through the second terminal of the signal cable 27*a*, the second pad electrode of the pad part 26, and the second power supply line PL2.

Each of the first and second active vibration members 20-1 and 20-2 of the active vibration member 20 according to an embodiment of the present disclosure may individually vibrate based on the vibration driving signal supplied from the sound processing circuit through the corresponding signal cable 27. For example, each of the first and second active vibration members 20-1 and 20-2 may be displaced (or vibrated or driven) in the same direction based on the corresponding vibration driving signal.

FIGS. 6A to 6D are a perspective view illustrating a vibration layer according to another embodiment of the present disclosure. FIGS. 6A to 6D illustrate a vibration layer of each of first and second active vibration members illustrated in FIGS. 1 and 2.

Figure 6A:
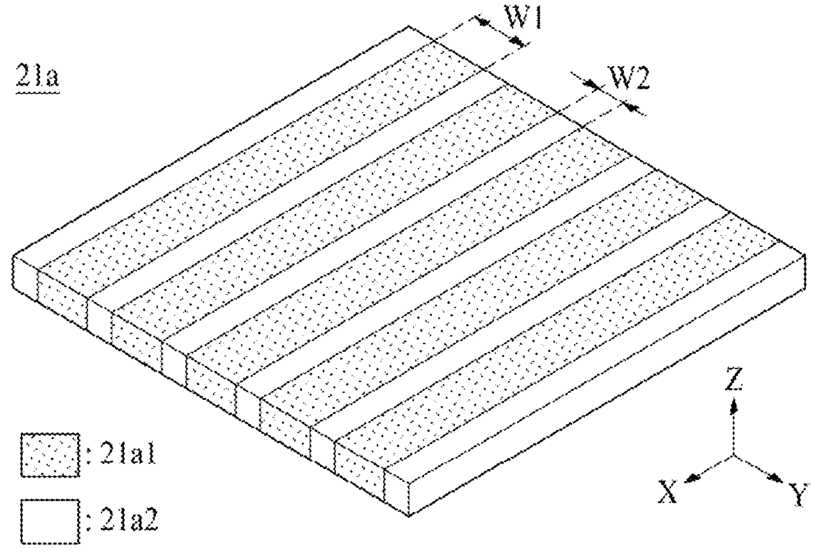

With reference to FIG. 6A, the vibration layer 21*a* according to another embodiment of the present disclosure may include a plurality of first portions 21*a*1 and a plurality of second portions 21*a*2. For example, the plurality of first portions 21*a*1 and the plurality of second portions 21*a*2 may be alternately and repeatedly disposed along a first direction X (or a second direction Y). For example, the first direction X may be a widthwise direction of the vibration layer 21*a*, the second direction Y may be a lengthwise direction of the vibration layer 21*a*, but embodiments of the present disclosure are not limited thereto, the first direction X may be the lengthwise direction of the vibration layer 21*a*, and the second direction Y may be the widthwise direction of the vibration layer 21*a*.

Each of the plurality of first portions 21*a*1 may be configured as an inorganic material portion or a piezoelectric material portion. The inorganic material portion may include a piezoelectric material, a composite piezoelectric material, or an electroactive material which includes a piezoelectric effect.

Each of the plurality of first portions 21*a*1 may be configured as a ceramic-based material capable of implementing a relatively high vibration, or may be configured as a piezoelectric ceramic having a perovskite crystalline structure. For example, each of the plurality of first portions **21*a*1 may include a material which is be substantially the same as a vibration layer 21*a* described above with reference to FIGS. 3 and 4**, and thus, the repetitive description thereof may be omitted.

Each of the plurality of first portions **21*a*1 according to an embodiment of the present disclosure may be disposed between the plurality of second portions 21*a*2 and may have a first width W1 parallel to the second direction Y (or the first direction X) and a length parallel to the first direction X (or the second direction Y). Each of the plurality of second portions 21*a*2 may have a second width W2 parallel to the second direction Y (or the first direction X) and may have a length parallel to the first direction X (or the second direction Y). The first width W1 may be the same as or different from the second width W2. For example, the first width W1 may be greater than the second width W2. For example, the first portion 21*a*1 and the second portion 21*a*2 may include a line shape or a stripe shape which has the same size or different sizes. Therefore, the vibration layer 21*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration layer 21*a*** may vary based on at least one or more of a shape, a length, and a thickness, or the like.

In the vibration layer **21*a*, each of the plurality of first portions 21*a*1 and the plurality of second portions 21*a*2 may be disposed (or arranged) at the same plane (or the same layer) in parallel with each other. Each of the plurality of second portions 21*a*2 may be configured to fill a gap between two adjacent first portions of the plurality of first portions 21*a*1 and may be connected to or attached on a second portion 21*a*2 adjacent thereto. Therefore, the vibration layer 21*a* may be expanded to a desired size or length by a lateral coupling (or connection) of the first portion 21*a*1 and the second portion 21*a*2**.

In the vibration layer **21*a*, each of the plurality of first portions 21*a*1 may have different sizes (or widths). For example, a size (or a width) of each of the plurality of first portions 21*a*1 may progressively decrease or increase in a direction from a center portion to the both peripheries (or both ends) of the vibration layer 21*a*. In this case, in the vibration layer 21*a*, a sound pressure level characteristic of a sound may be enhanced and a sound reproduction band may expand, based on various natural vibration frequencies according to a vibration of each of the plurality of first portions 21*a*1** having different sizes.

The plurality of second portions **21*a*2 may be disposed between the plurality of first portions 21*a*1. Therefore, in the vibration layer 21*a*, vibration energy by a link in a unit lattice of each first portion 21*a*1 may increase by a corresponding second portion 21*a*2, and thus, a vibration characteristic may increase, and a piezoelectric characteristic and flexibility may be secured. For example, the second portion 21*a*2** may include one or more of an epoxy-based polymer, an acrylic-based polymer, and a silicone-based polymer, but embodiments of the present disclosure are not limited thereto.

The plurality of second portions **21*a*2 according to an embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration layer 21*a*, and may provide flexibility to the vibration layer 21*a* or the active vibration member 20**.

The organic material portion configured at the second portion **21*a*2 may include one or more of an organic material, an organic polymer, an organic piezoelectric material, or an organic non-piezoelectric material that has a flexible characteristic in comparison with the inorganic material portion of the first portions 21*a*1. For example, the second portion 21*a*2** may be referred to as an adhesive portion, an elastic portion, a bending portion, a damping portion, or a flexible portion, or the like each having flexibility, but embodiments of the present disclosure are not limited thereto.

The plurality of first portions **21*a*1 and the second portion 21*a*2 may be disposed on (or connected to) the same plane, and thus, the vibration layer 21*a* according to an embodiment of the present disclosure may have a single thin film-type. For example, the vibration layer 21*a* may have a structure in which a plurality of first portions 21*a*1 are connected to one side. For example, the plurality of first portions 21*a*1 may have a structure connected to a whole vibration layer 21*a*. For example, the vibration layer 21*a* may vibrate in a vertical direction by the first portion 21*a*1 having a vibration characteristic and may be bent in a curved shape by the second portion 21*a*2** having flexibility.

Figure 6B:
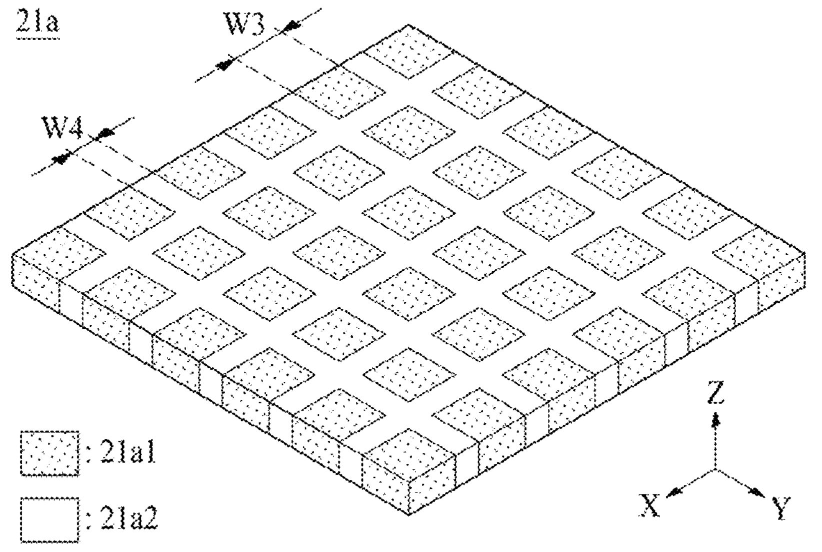

With reference to FIG. 6B, the vibration layer **21*a* according to another embodiment of the present disclosure may include a plurality of first portions 21*a*1 which are spaced apart from one another along each of a first direction X and a second direction Y, and a second portion 21*a*2 disposed between the plurality of first portions 21*a*1**.

Each of the plurality of first portions **21*a*1 may be disposed to be spaced apart from one another along each of the first direction X and the second direction Y. For example, each of the plurality of first portions 21*a*1 may have a hexahedral shape having the same size and may be disposed in a lattice shape. Each of the plurality of first portions 21*a*1 may include a material which is be substantially the same as the first portion 21*a*1 described above with reference to FIG. 6**A, and thus, like reference numeral refer to like element and the repetitive description thereof may be omitted.

The second portion **21*a*2 may be disposed between the plurality of first portions 21*a*1 along each of the first direction X and the second direction Y. The second portion 21*a*2 may be configured to fill a gap between two adjacent first portions 21*a*1 or to surround each of the plurality of first portions 21*a*1, and thus, the second portion 21*a*2 may be connected to or attached on an adjacent first portion 21*a*1. According to an embodiment of the present disclosure, a width W4 of a second portion 21*a*2 disposed between two first portions 21*a*1 adjacent to each other along the first direction X may be the same as or different from that of a width W3 of the first portion 21*a*1, and the width W4 of the second portion 21*a*2 disposed between two first portions 21*a*1 adjacent to each other along the second direction Y may be the same as or different from the width W3 of the first portion 21*a*1. The second portion 21*a*2 may include a material which is be substantially the same as the second portion 21*a*2 described above with reference to FIG. 6**A, and thus, like reference numeral refer to like element and the repetitive description thereof may be omitted.

The vibration layer **21*a*** according to another embodiment of the present disclosure may include a 1-3 composite structure having a piezoelectric characteristic of a 1-3 vibration mode, and thus, may have a resonance frequency of 30

MHz or less, but embodiments of the present disclosure are not limited thereto. For example, a resonance frequency of the vibration layer 21*a* may vary based on at least one or more of a shape, a length, and a thickness, or the like.

With reference to FIG. 6C, the vibration layer 21*a* according to another embodiment of the present disclosure may include a plurality of first portions 21*a*1 which are spaced apart from one another along each of a first direction X and a second direction Y, and a second portion 21*a*2 disposed between the plurality of first portions 21*a*1.

Each of the plurality of first portions 21*a*1 may have a flat structure of a circular shape. For example, each of the plurality of first portions 21*a*1 may have a circular plate shape, but embodiments of the present disclosure are not limited thereto. For example, each of the plurality of first portions 21*a*1 may have a dot shape including an oval shape, a polygonal shape, or a donut shape, or the like. Each of the plurality of first portions 21*a*1 may include a material which is be substantially the same as the first portion 21*a*1 described above with reference to FIG. 6A, and thus, like reference numeral refer to like element and the repetitive description thereof may be omitted.

The second portion 21*a*2 may be disposed between the plurality of first portions 21*a*1 along each of the first direction X and the second direction Y. The second portion 21*a*2 may be configured to surround each of the plurality of first portions 21*a*1, and thus, may be connected to or attached on a lateral surface of each of the plurality of first portions 21*a*1. Each of the plurality of first portions 21*a*1 and the second portion 21*a*2 may be disposed (or arranged) in parallel on the same plane (or the same layer). The second portion 21*a*2 may include a material which is be substantially the same as the second portion 21*a*2 described above with reference to FIG. 6A, and thus, like reference numeral refer to like element and the repetitive description thereof may be omitted.

With reference to FIG. 6D, the vibration layer 21*a* according to another embodiment of the present disclosure may include a plurality of first portions 21*a*1 which are spaced apart from one another along each of a first direction X and a second direction Y, and a second portion 21*a*2 disposed between the plurality of first portions 21*a*1.

Each of the plurality of first portions 21*a*1 may have a flat structure of a triangular shape. For example, each of the plurality of first portions 21*a*1 may have a triangular plate shape, but embodiments of the present disclosure are not limited thereto. Each of the plurality of first portions 21*a*1 may include a material which is be substantially the same as the first portion 21*a*1 described above with reference to FIG. 6A, and thus, like reference numeral refer to like element and the repetitive description thereof may be omitted.

According to an embodiment of the present disclosure, four adjacent first portions 21*a*1 among the plurality of first portions 21*a*1 may be adjacent to one another to form a tetragonal shape (or a square shape). Vertices of the four adjacent first portions 21*a*1 forming a tetragonal shape may be adjacent to one another in a central portion (or an exact central portion) of the tetragonal shape.

The second portion 21*a*2 may be disposed between the plurality of first portions 21*a*1 along each of the first direction X and the second direction Y. The second portion 21*a*2 may be configured to surround each of the plurality of first portions 21*a*1, and thus, may be connected to or attached on a lateral surface of each of the plurality of first portions 21*a*1. Each of the plurality of first portions 21*a*1 and the second portion 21*a*2 may be disposed (or arranged) in parallel on the same plane (or the same layer). The second portion 21*a*2 may include a material which is be substantially the same as the second portion 21*a*2 described above with reference to FIG. 6A, and thus, like reference numeral refer to like element and the repetitive description thereof may be omitted.

According to another embodiment of the present disclosure, 2N (where N is a natural number greater than or equal to 2) adjacent first portions 21*a*1 among the plurality of first portions 21*a*1 having the triangular shape may be disposed adjacent to one another to form a 2N-angular shape. For example, six adjacent first portions 21*a*1 among the plurality of first portions 21*a*1 may be adjacent to one another to form a hexagonal shape (or a regularly hexagonal shape). Vertices of the six adjacent first portions 21*a*1 forming a hexagonal shape may be adjacent to one another in a central portion (or an exact central portion) of the hexagonal shape. The second portion 21*a*2 may be configured to surround each of the plurality of first portions 21*a*1, and thus, may be connected to or attached on a lateral surface of each of the plurality of first portions 21*a*1.

Figure 7:
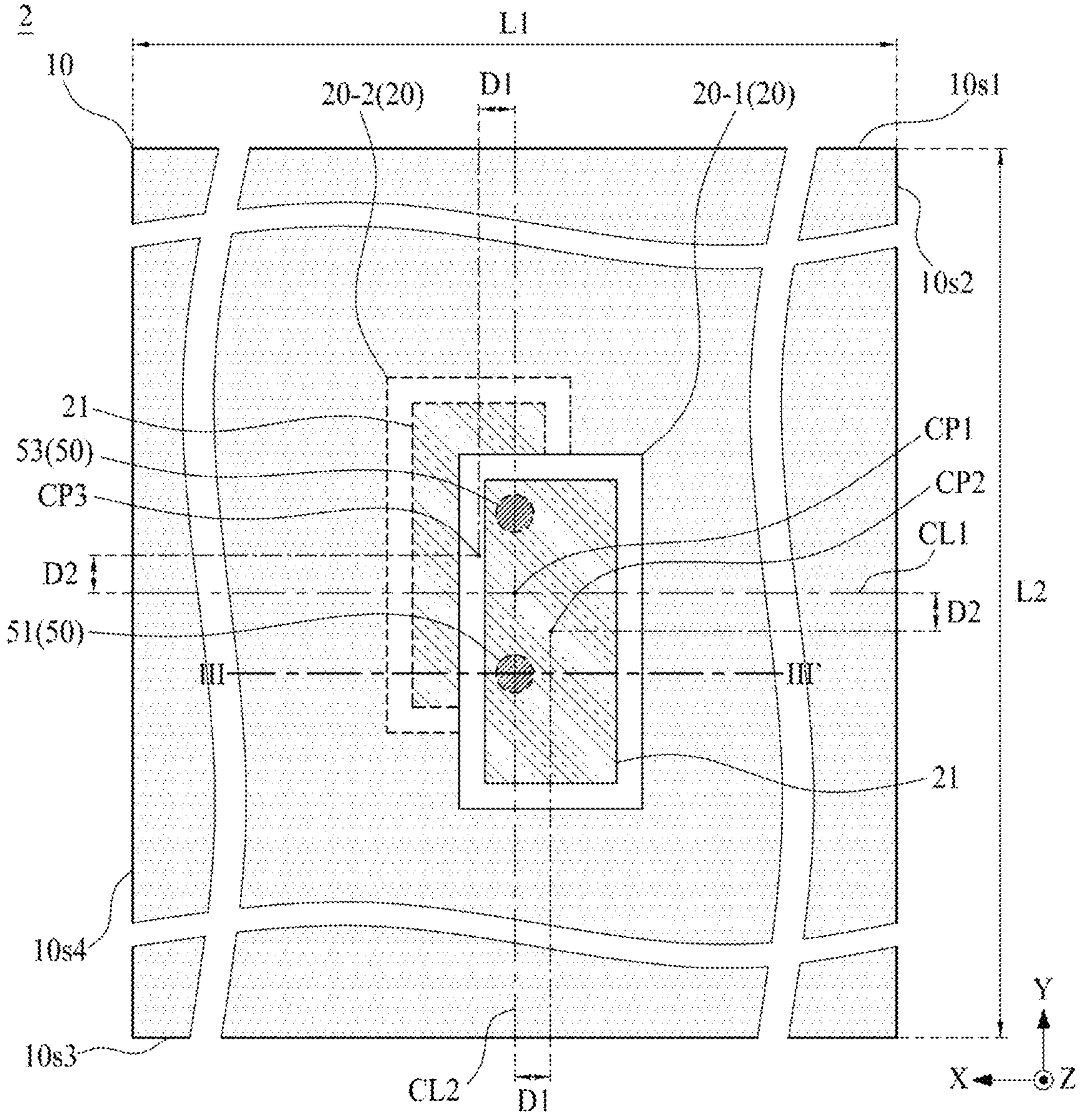
FIG. 7 illustrates an apparatus according to another embodiment of the present disclosure.
Figure 8:
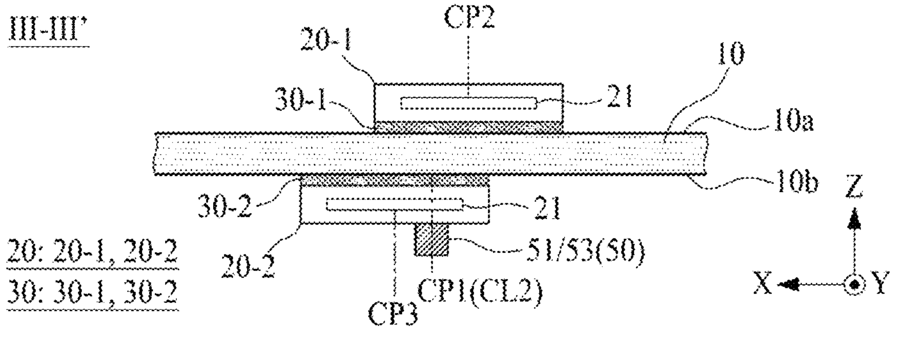
FIG. 8 is a cross-sectional view taken along line III-III' of FIG. 7 according to another embodiment of the present disclosure.

FIG. 7 is a cross-sectional view illustrating an apparatus according to another embodiment of the present disclosure. FIG. 8 is a cross-sectional view of line III-III' illustrated in FIG. 7 according to another embodiment of the present disclosure. FIGS. 7 and 8 illustrate an embodiment where a weight member added to the apparatus according to an embodiment of the present disclosure described with reference to FIGS. 1 to 6D. Therefore, in the following description, the other elements other than a weight member and relevant elements are referred to by like reference numerals, and their repetitive descriptions may be omitted or will be briefly given.

With reference to FIGS. 7 and 8, an apparatus 2 according to another embodiment of the present disclosure may include a passive vibration member 10, an active vibration member 20, and a weight member 50.

Each of the passive vibration member 10 and the active vibration member 20 may be substantially the same as described above with reference to FIGS. 1 and 2, and thus, the repetitive description thereof may be omitted or will be briefly given.

The weight member 50 may be configured to increase a weight (or mass) of the active vibration member 20. The weight member 50 may be configured to reduce a dip (e.g., a reduction of the sound pressure level at a specific frequency) generated in a reproduction frequency band of the sound (or the sound pressure level) generated by vibration of the active vibration member 20. The weight member 50 may improve the sound characteristic and/or the sound pressure level characteristic in a low-pitched sound band generated by vibration of the active vibration member 20. For example, the weight member 50 may reduce the lowest resonance frequency (or a lowest natural frequency) of the passive vibration member 10 by increasing the weight of the active vibration member 20. Accordingly, the active vibration member 20 may vibrate at a relatively low frequency due to a decrease in a lowest resonance frequency (or a lowest natural frequency) based on an increase in weight caused by the weight member 50. Thus, the sound characteristic and/or the sound pressure level characteristic in a low-pitched sound band generated based on a vibration of the active vibration member 20 may be improved. For example, the weight member 50 may be a local mass, a point mass, a resonance pad, a weight clapper, or a mass member, but embodiments of the present disclosure are not limited thereto.

The weight member 50 may be configured to overlap the active vibration member 20. The weight member 50 may be connected or attached to the active vibration member 20. The weight member 50 may be connected or attached to the active vibration member 20 spaced apart from the center portion CP1 of the passive vibration member 10. For example, the weight member 50 may be connected or attached to the active vibration member 20 spaced apart from each of the center portion CP1 of the passive vibration member 10 and the center portions CP2 and CP3 of the active vibration member 20. For example, the weight member 50 may be configured as a weight material having a weight. For example, the weight member 50 may be configured as one or more of a metal material, a plastic material, and an elastic material, but embodiments of the present disclosure are not limited thereto.

The weight member 50 according to an embodiment of the present disclosure may include a first weight member 51 and a second weight member 53.

The first weight member 51 may be configured to be spaced apart from each of the center portion CP1 of the passive vibration member 10 and the center portion CP2 of the first active vibration member 20-1. For example, the first weight member 51 may be connected or attached to the second surface (or the rear surface) of the second active vibration member 20-2 to be spaced apart from each of the center portion CP1 of the passive vibration member 10 and the center portion CP2 of the first active vibration member 20-1.

The first weight member 51 according to an embodiment of the present disclosure may be spaced apart from each of the center portion CP1 of the passive vibration member 10 and the center portion CP2 of the first active vibration member 20-1, and may be connected or attached to the second surface (or the rear surface) of the second active vibration member 20-2 overlapped with the third region or the fourth region among the first to fourth regions of the vibration part 21 in the first active vibration member 20-1. For example, the vibration part 21 in the first active vibration member 20-1 may include a first region (or the first upper region) corresponding to the upper left region, a second region (or the second upper region) corresponding to the upper right region, and a third region (or the first lower region) corresponding to the lower left region, and a fourth region (or the second lower region) corresponding to the lower right region with respect to the center portion CP2.

The first weight member 51 according to an embodiment of the present disclosure may be spaced apart from each of the center portion CP1 of the passive vibration member 10 and the center portion CP2 of the first active vibration member 20-1, and may be connected or attached to the second surface (or the rear surface) of the second active vibration member 20-2 overlapped with the second center line CL2 of the passive vibration member 10.

The second weight member 53 may be configured to be spaced apart from the first weight member 51. The second weight member 53 may be configured to be spaced apart from each of the center portion CP1 of the passive vibration member 10 and the center portion CP3 of the second active vibration member 20-2. For example, the second weight member 53 may be connected or attached to the second surface (or the rear surface) of the second active vibration member 20-2 to be spaced apart from each of the center portion CP1 of the passive vibration member 10 and the center portion CP3 of the second active vibration member 20-2.

The second weight member 53 according to an embodiment of the present disclosure may be spaced apart from each of the center portion CP1 of the passive vibration member 10 and the center portion CP3 of the second active vibration member 20-2, and may be connected or attached to the second surface (or the rear surface) of the vibration part 21 in the second active vibration member 20-2 overlapped with the first region or the second region among the first to fourth regions of the vibration part 21 in the second active vibration member 20-2. For example, the vibration part 21 in the second active vibration member 20-2 may include a first region (or the first upper region) corresponding to the upper left region, a second region (or the second upper region) corresponding to the upper right region, and a third region (or the first lower region) corresponding to the lower left region, and a fourth region (or the second lower region) corresponding to the lower right region with respect to the center portion CP3.

The second weight member 53 according to another embodiment of the present disclosure may be spaced apart from each of the center portion CP1 of the passive vibration member 10 and the center portion CP2 of the first active vibration member 20-1, and may be connected or attached to the second surface (or the rear surface) of the second active vibration member 20-2 overlapped with the second center line CL2 of the passive vibration member 10.

The first weight member 51 and the second weight member 53 according to an embodiment of the present disclosure may be arranged in parallel on the second center line CL2 of the passive vibration member 10. For example, the first weight member 51 and the second weight member 53 may be arranged on the second center line CL2 of the passive vibration member 10 so as to be symmetrical to each other with respect to the center portion CP1 of the passive vibration member 10. For example, the first weight member 51 and the second weight member 53 may have a polygonal pillar shape or a cylindrical pillar shape. For example, each of the first weight member 51 and the second weight member 53 may be configured as a weight material having a weight. For example, each of the first weight member 51 and the second weight member 53 may be configured as one or more of a metal material, a plastic material, and an elastic material, but embodiments of the present disclosure are not limited thereto. For example, each of the first weight member 51 and the second weight member 53 may have a weight of 20 g or less based on the displacement force (or the bending force) of the active vibration member 20, but embodiments of the present disclosure are not limited thereto.

Each of the first weight member 51 and the second weight member 53 may reduce the lowest resonance frequency (or a lowest natural frequency) of the passive vibration member 10 by increasing the weight in the direct vibration region of the passive vibration member 10 connected to the first active vibration member 20-1 and the second active vibration member 20-2. Thereby, the sound characteristic and/or the sound pressure level characteristic of the low-pitched sound band generated by the vibration of the first active vibration member 20-1 and the second active vibration member 20-2 may be improved. For example, each of the first weight member 51 and the second weight member 53 is configured around the center portion CP1 of the passive vibration member 10 without overlapping the center portion CP1 of the passive vibration member 10, thereby reducing the dip generated in the reproduction frequency band of the sound (or the sound pressure level) generated by the vibration of the first active vibration member 20-1 and the second active vibration member 20-2. Accordingly, the sound characteristic and/or the sound pressure level characteristic of the low-pitched sound band generated by the vibration of the first active vibration member 20-1 and the second active vibration member 20-2 may be further improved, and the flatness of the sound pressure level may be improved in the low-pitched sound band.

Figure 9:
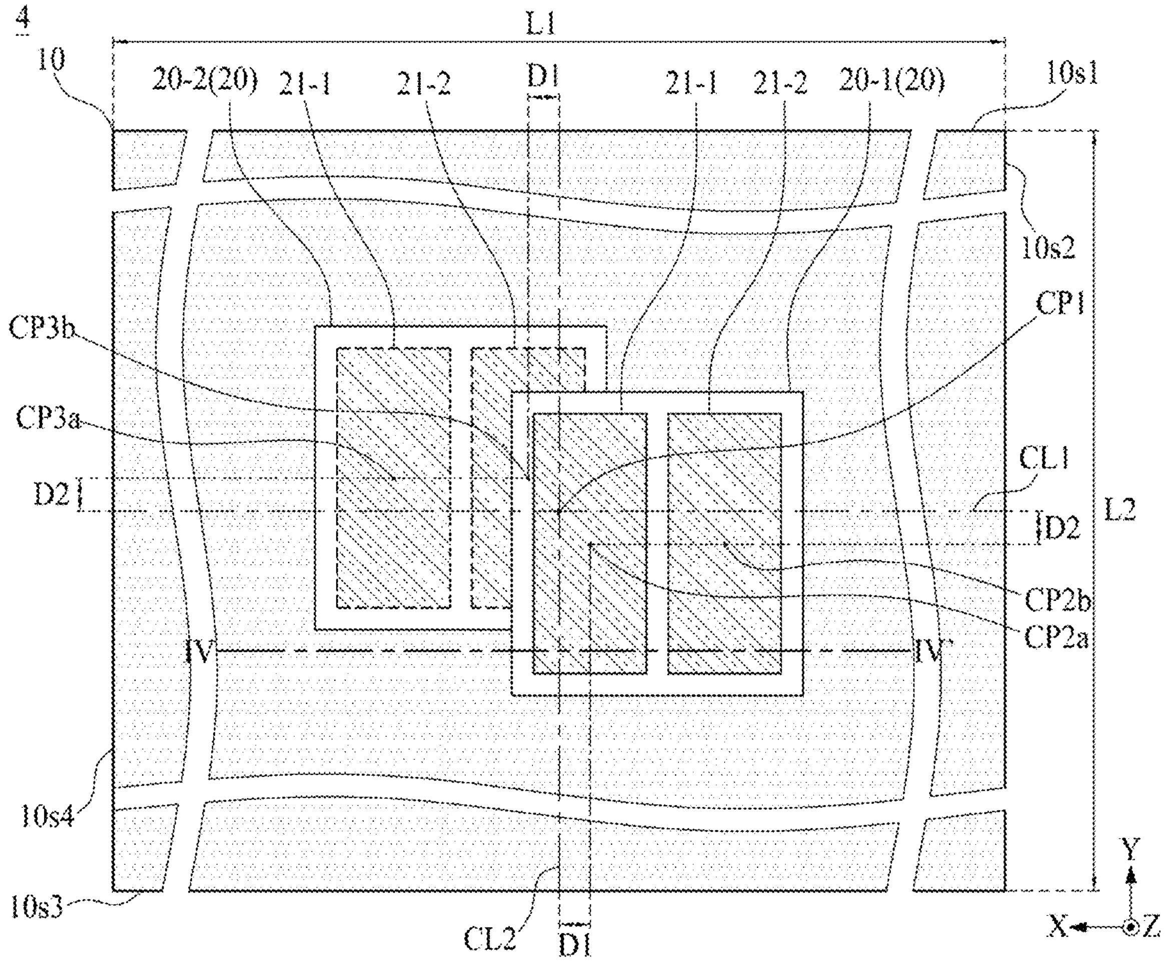
FIG. 9 illustrates an apparatus according to another embodiment of the present disclosure.
Figure 10:
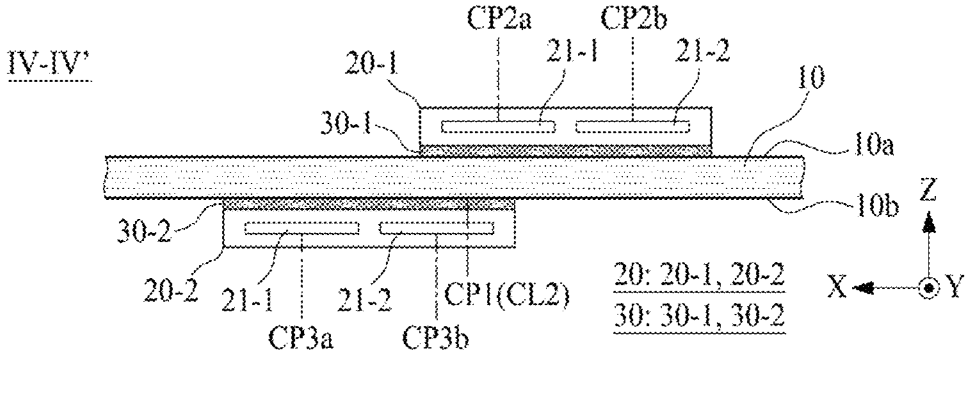
FIG. 10 is a cross-sectional view taken along line IV-IV' of FIG. 9 according to another embodiment of the present disclosure.

FIG. 9 is a cross-sectional view illustrating an apparatus according to another embodiment of the present disclosure. FIG. 10 is a cross-sectional view of line IV-IV' illustrated in FIG. 9 according to another embodiment of the present disclosure. FIGS. 9 and 10 illustrate an embodiment implemented by changing an active vibration member of the apparatus according to an embodiment of the present disclosure described with reference to FIGS. 1 to 6D. Therefore, in the following description, the other elements other than an active vibration member and relevant elements are referred to by like reference numerals, and their repetitive descriptions may be omitted or will be briefly given.

With reference to FIGS. 9 and 10, an apparatus 3 according to another embodiment of the present disclosure may include a passive vibration member 10 and an active vibration member 20.

The passive vibration member 10 may be substantially the same as described above with reference to FIGS. 1 and 2, and thus, the repetitive description thereof may be omitted or will be briefly given.

The active vibration member 20 according to another embodiment of the present disclosure may include a first active vibration member 20-1 and a second active vibration member 20-2.

The first active vibration member 20-1 may be connected to a first surface 10*a* of the passive vibration member 10 through a first connection member 30-1 of a connection member 30. For example, the first active vibration member 20-1 may be connected to a front surface 10*a* of the passive vibration member 10 through the first connection member 30-1. For example, the first connection member 30-1 may be substantially the same as a first connection member 30-1 described above with reference to FIGS. 1 and 2, and thus, the repetitive description thereof may be omitted or will be briefly given.

The first active vibration member 20-1 may be disposed at the first to fourth regions of the passive vibration member 10 to have an asymmetrical structure with respect to the center portion CP1 of the passive vibration member 10. The center portion of the first active vibration member 20-1 may be spaced apart from the center portion CP1 of the passive vibration member 10. For example, the center portion of the first active vibration member 20-1 may be spaced apart from the center portion CP1 of the passive vibration member 10 in a diagonal direction. The center portion of the first active vibration member 20-1 may be disposed at a fourth region (or a lower right region) of the passive vibration member 10. For example, the center portion of the first active vibration member 20-1 may be spaced apart from the center portion CP1 of the passive vibration member 10 toward the fourth region of the passive vibration member 10. For example, the size (or area) of the overlapping region (or the arrangement region) between each of the first to fourth regions of the passive vibration member 10 and the first active vibration member 20-1 may be the largest at the fourth region and may be the smallest at the first region. The size of the overlapping region at the second region may be greater than that of the size of the overlapping region at the third region. The size of the overlapping region at the third region may be greater than that of the size of the overlapping region at the first region.

The first active vibration member 20-1 according to another embodiment of the present disclosure may include a first vibration part 21-1 and a second vibration part 21-2.

In the first active vibration member 20-1, each of the first and second vibration parts 21-1 and 21-2 may be electrically separated and disposed while being spaced apart from each other along the first direction X. Each of the first and second vibration parts 21-1 and 21-2 may be disposed at a central portion of the first active vibration member 20-1. For example, each of the first and second vibration parts 21-1 and 21-2 may be disposed at the remaining central portion except for a periphery portion of the first active vibration member 20-1. Each of the first and second vibration parts 21-1 and 21-2 may be configured to be displaced (or vibrated or driven) in a same direction. A phase of the vibration driving signal applied to the first vibration part 21-1 and a phase of the vibration driving signal applied to the second vibration part 21-2 may be the same phase or opposite phases, but embodiments of the present disclosure are not limited thereto.

In the first active vibration member 20-1, the first and second vibration parts 21-1 and 21-2 may be implemented as one vibration apparatus (or a single vibration apparatus) which is driven as one complete single-body without being independently driven. The first active vibration member 20-1 may be driven by a large-area vibrator according to a single vibration of the first and second vibration parts 21-1 and 21-2 having a relatively small size, thereby increasing or improving each of a sound characteristic and a sound pressure level characteristic and a sound reproduction band in a low-pitched sound band.

In the first active vibration member 20-1, each of the center portion (or the second center portion) CP2*a* of the first vibration part 21-1 and the center portion CP2*b* of the second vibration part 21-2 may be spaced apart from the center portion CP1 of the passive vibration member 10. For example, each of the center portion CP2*a* of the first vibration part 21-1 and the center portion CP2*b* of the second vibration part 21-2 may be spaced apart from the center portion CP1 of the passive vibration member 10 in a diagonal direction. For example, each of the center portion CP2*a* of the first vibration part 21-1 and the center portion CP2*b* of the second vibration part 21-2 may be spaced apart from the center portion CP1 of the passive vibration member 10 toward the fourth region of the passive vibration member 10.

In the first active vibration member 20-1, either the first vibration part 21-1 or the second vibration part 21-2 may overlap the center portion CP1 of the passive vibration member 10. For example, the first vibration part 21-1 may overlap the center portion CP1 of the passive vibration member 10. The center portion CP2*a* of the first vibration part 21-1 may be spaced apart from the center portion CP1 of the passive vibration member 10. For example, the center portion CP2*a* of the first vibration part 21-1 may be spaced apart from the center portion CP1 of the passive vibration member 10 in a diagonal direction. For example, the center portion CP2*a* of the first vibration part 21-1 may be disposed at the fourth region of the passive vibration member 10 spaced apart from the center portion CP1 of the passive vibration member 10 in the diagonal direction. For example, the size (or area) of the overlapping region (or arrangement region) between each of the first to fourth regions of the passive vibration member 10 and the first vibration part 21-1 may be the largest at the fourth region and may be the smallest at the first region. The size of the overlapping region at the second region may be greater than that of the size of the overlapping region at the third region. The size of the overlapping region at the third region may be greater than that of the size of the overlapping region at the first region.

In the first active vibration member 20-1, the center portion CP2*a* of the first vibration part 21-1 may be spaced apart from the second center line CL2 of the passive vibration member 10 by a first distance D1 along the first direction X and may be spaced apart from the first center line CL1 of the passive vibration member 10 by a second distance D2 along the second direction Y. For example, the first distance D1 and the second distance D2 may be the same or different. Accordingly, the center portion CP2*a* of the first vibration part 21-1 may be disposed to be biased toward the center portion CP1 of the passive vibration member 10 within the fourth region of the passive vibration member 10. The fourth region of the passive vibration member 10 may be a region defined by the center portion CP1, the second side 10*s*2, and the third side 10*s*3 at the passive vibration member 10. The arrangement structure of the first vibration part 21-1 may be substantially the same as the arrangement structure of the vibration part 21 of the first active vibration member 20-1 described above with reference to FIGS. 1 and 2. The first distance D1 and the second distance D2 may be substantially the same as the first distance D1 and the second distance D2 described above with reference to FIGS. 1 and 2, and thus, their repetitive descriptions may be omitted.

In the first active vibration member 20-1, the second vibration part 21-2 may be disposed between the second side 10*s*2 of the passive vibration member 10 and the first vibration part 21-1. The second vibration part 21-2 may be disposed to overlap the second and fourth regions of the passive vibration member 10 and not to overlap the first and third regions of the passive vibration member 10. For example, the center portion CP2*b* of the second vibration part 21-2 may be spaced apart from the first center line CL1 of the passive vibration member 10 toward the fourth region of the passive vibration member 10. For example, the size (or area) of an overlapping region (or an arrangement region) between the fourth region of the passive vibration member 10 and the second vibration part 21-2 may be greater than that of the size of the overlapping region between the second region of the passive vibration member 10 and the second vibration part 21-2.

The second active vibration member 20-2 may be connected to the second surface 10*b* of the passive vibration member 10 through the second connection member 30-2 of the connection member 30. For example, the second active vibration member 20-2 may be connected to the rear surface 10*b* of the passive vibration member 10 through the second connection member 30-2. For example, the second connection member 30-2 may be substantially the same as the second connection member 30-2 described above with reference to FIGS. 1 and 2, and thus, their repetitive descriptions may be omitted.

The second active vibration member 20-2 may be disposed at the first to fourth regions of the passive vibration member 10 to have an asymmetrical structure with respect to the center portion CP1 of the passive vibration member 10. The center portion of the second active vibration member 20-2 may be spaced apart from the center portion CP1 of the passive vibration member 10. For example, the center portion of the second active vibration member 20-2 may be spaced apart from the center portion CP1 of the passive vibration member 10 in a diagonal direction. The center portion of the second active vibration member 20-2 may be disposed at the first region (or upper left region) of the passive vibration member 10. For example, the center portion of the second active vibration member 20-2 may be spaced apart from the center portion CP1 of the passive vibration member 10 toward the first region of the passive vibration member 10. For example, the size (or area) of an overlapping region (or an arrangement region) between each of the first to fourth regions of the passive vibration member 10 and the second active vibration member 20-2 may be the largest at the first region and may be the smallest at the fourth region. The size of the overlapping region at the third region may be greater than that of the size of the overlapping region at the second region. The size of the overlapping region at the second region may be greater than that of the size of the overlapping region at the fourth region.

The second active vibration member 20-2 according to another embodiment of the present disclosure may include a first vibration part 21-1 and a second vibration part 21-2.

In the second active vibration member 20-2, each of the first and second vibration parts 21-1 and 21-2 may be electrically separated and disposed while being spaced apart from each other along the first direction (X). Each of the first and second vibration parts 21-1 and 21-2 may be disposed at a central portion of the second active vibration member 20-2. For example, each of the first and second vibration parts 21-1 and 21-2 may be disposed at the remaining central portion except for a periphery portion of the second active vibration member 20-2. Each of the first and second vibration parts 21-1 and 21-2 may be configured to be displaced (or vibrated or driven) in a same direction.

In the second active vibration member 20-2, the first and second vibration parts 21-1 and 21-2 may be implemented as one vibration apparatus (or a single vibration apparatus) which is driven as one complete single-body without being independently driven. The second active vibration member 20-2 may be driven by a large-area vibrator according to a single vibration of the first and second vibration parts 21-1 and 21-2 having a relatively small size, thereby increasing or improving each of a sound characteristic and a sound pressure level characteristic and a sound reproduction band in a low-pitched sound band.

In the second active vibration member 20-2, a phase of the vibration driving signal applied to the first vibration part 21-1 and a phase of the vibration driving signal applied to the second vibration parts 21-2 may be a same phase or may be an opposite phase, but embodiments of the present disclosure are not limited thereto. For example, the vibration driving signals applied to the first and second vibration parts 21-1 and 21-2, respectively, may have a phase difference with each other. For example, the vibration driving signals applied to each of the first and second vibration parts 21-1 and 21-2 may have a phase difference of 135 degrees or more and 150 degrees or less from each other while having the same phase, but embodiments of the present disclosure are not limited thereto. For example, the vibration drive signals applied to each of the first and second vibration parts 21-1 and 21-2 of the second active vibration member 20-2 may have an opposite phase with the vibration drive signals applied to each of the first and second vibration parts 21-1 and 21-2 of the first active vibration member 20-1.

In the second active vibration member 20-2, each of the center portion (or the third center portion) CP3*a* of the first vibration part 21-1 and the center portion CP3*b* of the second vibration part 21-2 may be spaced apart from the center portion CP1 of the passive vibration member 10. For example, each of the center portion CP3*a* of the first vibration part 21-1 and the center portion CP3*b* of the second vibration part 21-2 may be spaced apart from the center portion CP1 of the passive vibration member 10 in a diagonal direction. For example, each of the center portion CP3*a* of the first vibration part 21-1 and the center portion CP3*b* of the second vibration part 21-2 may be spaced apart from the center portion CP1 of the passive vibration member 10 toward the first region of the passive vibration member 10.

In the second active vibration member 20-2, either the first vibration part 21-1 or the second vibration part 21-2 may overlap the center portion CP1 of the passive vibration member 10. For example, the second vibration part 21-2 may overlap the center portion CP1 of the passive vibration member 10. The center portion CP3*b* of the second vibration part 21-2 may be spaced apart from the center portion CP1 of the passive vibration member 10. For example, the center portion CP3*b* of the second vibration part 21-2 may be spaced apart from the center portion CP1 of the passive vibration member 10 in a diagonal direction. For example, the center portion CP3*a* of the second vibration part 21-2 may be disposed at the first region of the passive vibration member 10 in the diagonal direction spaced apart from the center portion CP1 of the passive vibration member 10. For example, the size (or area) of the overlapping region (or arrangement region) between each of the first to fourth regions of the passive vibration member 10 and the second vibration part 21-2 may be the largest at the first region and may be the smallest at the fourth region. The size of the overlapping region at the third region may be greater than that of the size of the overlapping region at the second region. The size of the overlapping region at the second region may be greater than that of the size of the overlapping region at the fourth region.

In the second active vibration member 20-2, the center portion CP3*a* of the second vibration part 21-2 may be spaced apart from the second center line CL2 of the passive vibration member 10 by a first distance D1 along the first direction X and may be spaced apart from the first center line CL1 of the passive vibration member 10 by a second distance D2 along the second direction Y. For example, the first distance D1 and the second distance D2 may be the same or different. Accordingly, the center portion CP3*b* of the second vibration part 21-2 may be disposed to be biased toward the center portion CP1 of the passive vibration member 10 at the first region of the passive vibration member 10. The first region of the passive vibration member 10 may be a region defined by the center portion CP1, the first side 10*s*1, and the fourth side 10*s*4 at the passive vibration member 10. The arrangement structure of the second vibration part 21-2 may be substantially the same as the arrangement structure of the vibration part 21 of the second active vibration member 20-2 described above with reference to FIGS. 1 and 2. The first distance D1 and the second distance D2 may be substantially the same as the first distance D1 and the second distance D2 described above with reference to FIGS. 1 and 2, and thus, their repetitive descriptions may be omitted.

The second vibration part 21-2 of the second active vibration member 20-2 may overlap the first vibration part 21-1 of the first active vibration member 20-1. The second vibration part 21-2 of the second active vibration member 20-2 and the first vibration part 21-1 of the first active vibration member 20-1 may be disposed to be staggered within a range overlapping each other with the passive vibration member 10 therebetween. For example, the second vibration part 21-2 of the second active vibration member 20-2 and the first vibration part 21-1 of the first active vibration member 20-1 may be disposed along a diagonal direction within a range overlapping each other with the passive vibration member 10 therebetween. For example, the center portion CP1 of the passive vibration member 10 may be disposed between the center portion CP2*a* of the first vibration part 21-1 of the first active vibration member 20-1 and the center portion CP3*b* of the second vibration part 21-2 of the second active vibration member 20-2. For example, the center portion CP1 of the passive vibration member 10, the center portion CP2*a* of the first vibration part 21-1 of the first active vibration member 20-1, and the center portion CP3*b* of the second vibration part 21-2 of the second active vibration member 20-2 may be positioned or aligned on one diagonal line or a same diagonal line, but embodiments of the present disclosure are not limited thereto.

According to another embodiment of the present disclosure, in the first active vibration member 20-1, the center portion CP2*a* of the first vibration part 21-1 may overlap the second active vibration member 20-2 and the center portion CP2*b* of the second vibration part 21-2 may not overlap the second active vibration member 20-2. In the second active vibration member 20-2, the center portion CP3*b* of the second vibration part 21-2 may overlap the first active vibration member 20-1 and the center portion CP3*a* of the first vibration part 21-1 may not overlap the first active vibration member 20-1.

In the second active vibration member 20-2, the first vibration part 21-1 may be disposed between the fourth side 10*s*4 of the passive vibration member 10 and the second vibration part 21-2. The first vibration part 21-1 may be disposed to overlap the first and third regions of the passive vibration member 10 and not to overlap the second and fourth regions of the passive vibration member 10. For example, the center portion CP3*a* of the first vibration part 21-1 may be spaced apart from the first center line CL1 of the passive vibration member 10 toward the first region of the passive vibration member 10. For example, the size (or area) of an overlapping region (or an arrangement region) between the first area of the passive vibration member 10 and the first vibration part 21-1 may be greater than that of the size of the overlapping area between the third area of the passive vibration member 10 and the first vibration part 21-1.

According to an embodiment of the present disclosure, the first active vibration member 20-1 and the second active vibration member 20-2 may be disposed to be staggered each other or to be shifted in a diagonal direction with respect to the center portion CP1 of the passive vibration member 10 within a range overlapping each other with the passive vibration member 10 therebetween, and thus it is possible to increase the displacement width (or vibration width or driving width) of the passive vibration member 10 and improve the sound pressure level characteristic and/or the sound characteristic in a low-pitched sound band generated by vibration of the passive vibration member 10. For example, a vibration magnitude of the active vibration member 20 is increased than that of a vibration magnitude of a single first active vibration member 20-1 (or a single second active vibration member 20-2) by the first active vibration member 20-1 and the second active vibration member 20-2 disposed to be staggered each other, thereby increasing a direct vibration area of the passive vibration member 10 directly vibrated by the active vibration member 20, and thus it is possible to improve the sound pressure level characteristic and/or the sound characteristic in a low-pitched sound band generated by vibration of the passive vibration member 10. For example, the low-pitched sound band may be less than 300 Hz or 500 Hz, but embodiments of the present disclosure are not limited thereto.

In the apparatus 3 according to another embodiment of the present disclosure, each of the first active vibration member 20-1 and the second active vibration member 20-2 are driven by a large-area vibrator due to a single vibration of the first and second vibration parts 21-1 and 21-2 having a relatively small size, thereby increasing or improving each of a sound characteristic and a sound pressure level characteristic and a sound reproduction band in a low-pitched sound band. Furthermore, the apparatus 3 according to another embodiment of the present disclosure includes the first active vibration member 20-1 and the second active vibration member 20-2 disposed to be staggered each other with respect to the center portion CP1 of the passive vibration member 10, thereby maximizing the central vibration mode and correcting the mode shape of the peripheral vibration mode. Accordingly, one or more of peak and dip generated in the reproduction frequency band of a sound (or a sound pressure level) generated by a vibration of the passive vibration member 10 may be reduced, each of the highest sound pressure level and the lowest sound pressure level generated in the reproduction frequency band of the sound (or the sound pressure level) generated by the vibration of the passive vibration member 10 are reduced, and thus a flatness of the sound pressure level may be improved.

Figure 11:
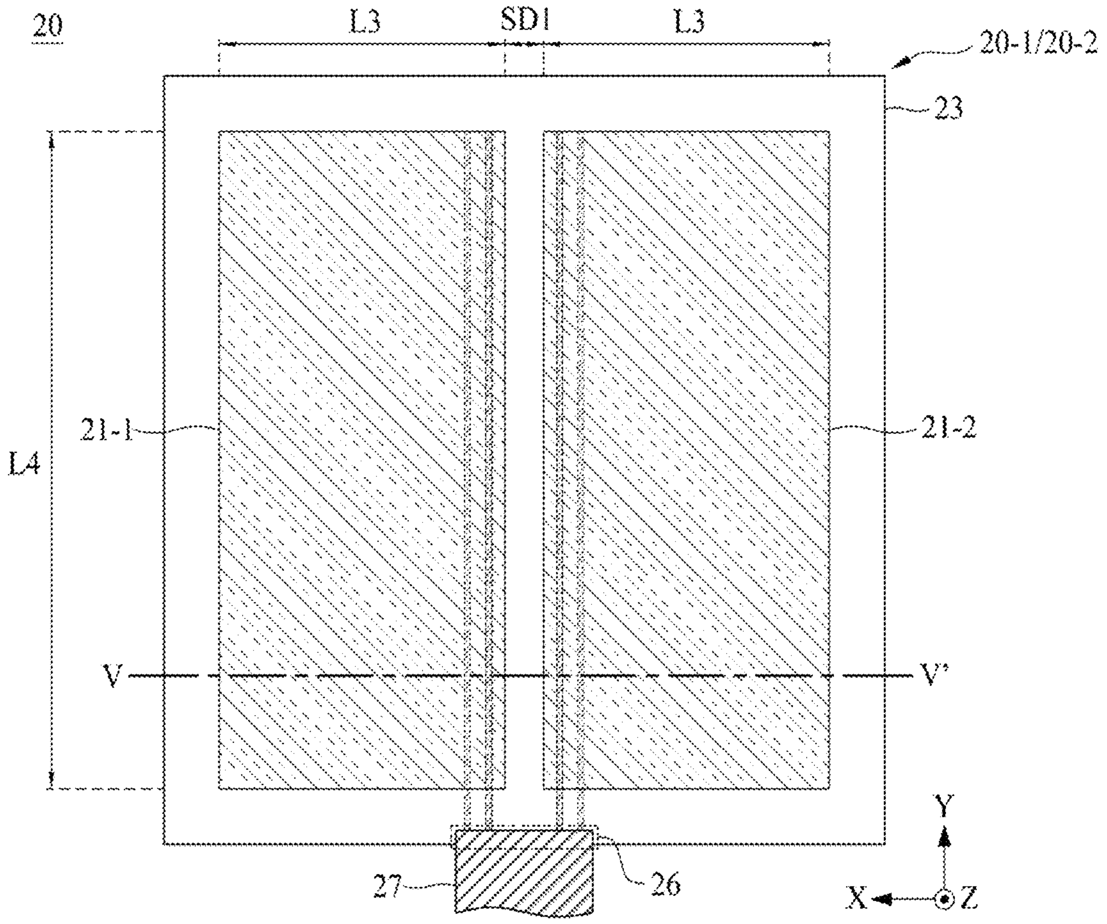
FIG. 11 illustrates an active vibration member according to another embodiment of the present disclosure illustrated in FIG. 9.
Figure 12:
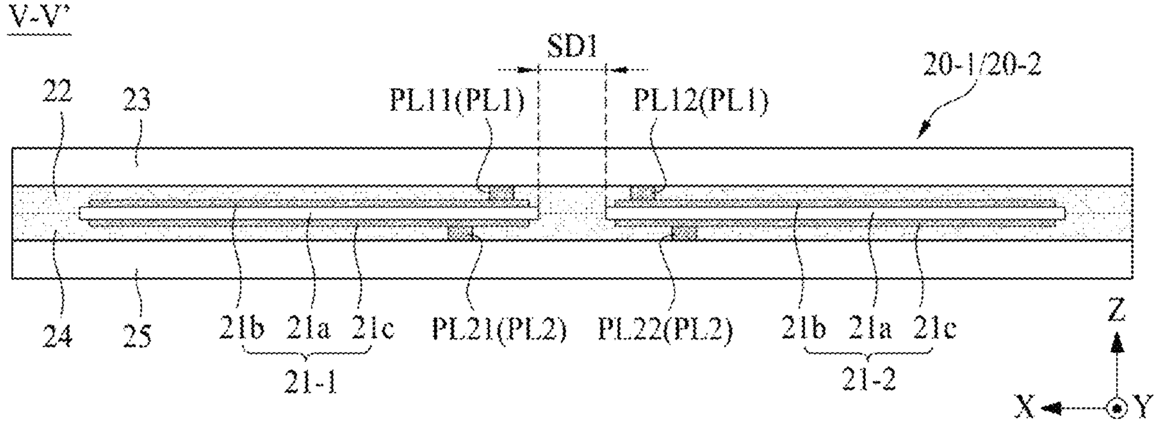
FIG. 12 is a cross-sectional view taken along line V-V' of FIG. 11 according to another embodiment of the present disclosure.

FIG. 11 illustrates an active vibration member according to another embodiment of the present disclosure illustrated in FIG. 9. FIG. 12 is a cross-sectional view of a line V-V' illustrated in FIG. 11 according to another embodiment of the present disclosure. FIGS. 11 and 12 illustrate a first active vibration member or a second active vibration member of an active vibration member according to another embodiment of the present disclosure.

With reference to FIGS. 9 to 12, an active vibration member 20 (or first and second active vibration members 20-1 and 20-2) according to another embodiment of the present disclosure may include a first vibration part 21-1 and a second vibration part 21-2.

Each of the first and second vibration parts 21-1 and 21-2 may be electrically separated and disposed while being spaced apart from each other along a first direction X. Each of the first and second vibration parts 21-1 and 21-2 may alternately and repeatedly contract and/or expand based on a piezoelectric effect to vibrate. For example, the first and second vibration parts 21-1 and 21-2 may be disposed or tiled at a certain separation distance (or an interval) SD1 along the first direction X. Thus, the active vibration member 20 (or the first and second active vibration members 20-1 and 20-2) in which the first and second vibration parts 21-1 and 21-2 are tiled may be a vibration array, a vibration array portion, a vibration module array portion, a vibration array structure, a tiling vibration array, a tiling vibration array module, or a tiling vibration film.

Each of the first and second vibration parts 21-1 and 21-2 according to an embodiment of the present disclosure may have a tetragonal shape having a third length L3 and a fourth length L4. For example, each of the first and second vibration parts 21-1 and 21-2 may have a rectangular shape having the third length L3 of 5 cm or more and the fourth length L4 of 10 cm or more, but embodiments of the present disclosure are not limited thereto.

Each of the first and second vibration parts 21-1 and 21-2 may be disposed or tiled on a same plane, and thus, the active vibration member 20 (or the first and second active vibration members 20-1 and 20-2) may have an enlarged area based on tiling of the first and second vibration parts 21-1 and 21-2 having a relatively small size.

Each of the first and second vibration parts 21-1 and 21-2 may be disposed or tiled to have a certain separation distance SD1, and thus, may be implemented as one active vibration apparatus (or a single vibration apparatus) which is driven as one complete single-body without being independently driven. According to an embodiment of the present disclosure, with respect to the first direction X, a first separation distance SD1 between the first and second vibration parts 21-1 and 21-2 may be 0.1 mm or more and less than 3 cm, but embodiments of the present disclosure are not limited thereto.

According to an embodiment of the present disclosure, each of the first and second vibration parts 21-1 and 21-2 may be disposed or tiled to have the separation distance SD1 of 0.1 mm or more and less than 3 cm, and thus, may be driven as one vibration apparatus, thereby increasing a reproduction band of a sound and a sound pressure level characteristic of a sound which is generated by interlocking with a single-body vibration of the first and second vibration parts 21-1 and 21-2. For example, the first and second vibration parts 21-1 and 21-2 may be disposed in the separation distance SD1 of 0.1 mm or more and less than 5 mm, in order to increase the reproduction band of the sound generated by interlocking with the single-body vibration of the first and second vibration parts 21-1 and 21-2 and to increase the sound of a low-pitched sound band, for example, a sound pressure level characteristic in 500 Hz or less.

According to an embodiment of the present disclosure, when the first and second vibration parts 21-1 and 21-2 are disposed in the separation distance SD1 of less than 0.1 mm or without the separation distance SD1, the reliability of the first and second vibration parts 21-1 and 21-2 or the active vibration member 20 may be reduced due to damage or a crack caused by a physical contact therebetween which occurs when each of the first and second vibration parts 21-1 and 21-2 vibrates.

According to an embodiment of the present disclosure, when the first and second vibration parts 21-1 and 21-2 are disposed in the separation distance SD1 of 3 cm or more, the first and second vibration parts 21-1 and 21-2 may not be driven as one vibration apparatus due to an independent vibration of each of the first and second vibration parts 21-1 and 21-2. Therefore, a reproduction band of a sound and a sound pressure level characteristic of a sound which is generated based on vibrations of the first and second vibration parts 21-1 and 21-2 may be reduced. For example, when the first and second vibration parts 21-1 and 21-2 are disposed in the separation distance SD1 of 3 cm or more, a sound characteristic and a sound pressure level characteristic of the low-pitched sound band (for example, in 500 Hz or less) may each be reduced.

According to an embodiment of the present disclosure, when the first and second vibration parts 21-1 and 21-2 are disposed in the separation distance SD1 of 5 mm, each of the first and second vibration parts 21-1 and 21-2 may not be driven as one vibration apparatus, and thus, a sound characteristic and a sound pressure level characteristic of the low-pitched sound band (for example, in 200 Hz or less) may each be reduced.

According to another embodiment of the present disclosure, when the first and second vibration parts 21-1 and 21-1 are disposed in the separation distance SD1 of 1 mm, each of the first and second vibration parts 21-1 and 21-2 may be driven as one vibration apparatus, and thus, a reproduction band of a sound may increase and a sound of the low-pitched sound band (for example, a sound pressure level characteristic in 500 Hz or less) may increase. For example, when the first and second vibration parts 21-1 and 21-2 are disposed in the separation distance SD1 of 1 mm, the active vibration member 20 may be implemented as a large-area vibrator which is enlarged based on optimization of a separation distance between the first and second vibration parts 21-1 and 21-2. Therefore, the active vibration member 20 may be driven as a large-area vibrator based on a single-body vibration of the first and second vibration parts 21-1 and 21-2, and thus, a sound characteristic and a sound pressure level characteristic may each increase a reproduction band of a sound and in the low-pitched sound band generated based on a large-area vibration of the active vibration member 20.

Therefore, to implement a single-body vibration (or one vibration apparatus) of the first and second vibration parts 21-1 and 21-2, the separation distance SD1 between the first and second vibration parts 21-1 and 21-2 may be adjusted to 0.1 mm or more and less than 3 cm. Also, to implement a single-body vibration (or one active vibration member or one vibration apparatus) of the first and second vibration parts 21-1 and 21-2 and to increase a sound pressure level characteristic of a sound of the low-pitched sound band, the separation distance SD1 between the first and second vibration parts 21-1 and 21-2 may be adjusted 0.1 mm or more and less than 5 mm.

Each of the first and second vibration parts 21-1 and 21-2 according to an embodiment of the present disclosure may include a vibration layer 21*a*, a first electrode layer 21*b*, and a second electrode layer 21*c*.

The vibration layer 21*a* of each of the first and second vibration parts 21-1 and 21-2 may include a piezoelectric material (or an electroactive material) which includes a piezoelectric effect.

According to an embodiment of the present disclosure, the vibration layer 21*a* of each of the first and second vibration parts 21-1 and 21-2 may be configured substantially the same as the vibration layer 21*a* described above with reference to FIGS. 3 and 4, or may be configured substantially the same as any one of the vibration layer 21*a* described above with reference to FIGS. 6A to 6D, and thus, like reference numeral refer to like element and the repetitive description thereof may be omitted.

According to another embodiment of the present disclosure, the vibration layer 21*a* of each of the first and second vibration parts 21-1 and 21-2 may include the same vibration layer 21*a* as any one of the vibration layer 21*a* described above with reference to FIGS. 6A to 6D, or may include different vibration layer 21*a*.

The first electrode layer 21*b* may be disposed at a first surface of the vibration layer 21*a* and electrically connected to the first surface of the vibration layer 21*a*. The first electrode layer 21*b* may be substantially the same as the first electrode layer 21*b* described above with reference to FIG. 4, and thus, like reference numeral refer to like element and the repetitive description thereof may be omitted.

The second electrode layer 21*c* may be disposed at a second surface of the vibration layer 21*a* and electrically connected to the second surface of the vibration layer 21*a*. The second electrode layer 21*c* may be substantially the same as the second electrode layer 21*c* described above with reference to FIG. 4, and thus, like reference numeral refer to like element and the repetitive description thereof may be omitted.

The active vibration member 20 (or the first active vibration member 20-1 and the second active vibration member 20-2) according to another embodiment of the present disclosure may further include a first cover member 23 and a second cover member 25.

The first cover member 23 may be disposed at the first surface of each of the first and second vibration parts 21-1 and 21-2. For example, the first cover member 23 may be configured to cover the first electrode layer 21*b* of each of the first and second vibration parts 21-1 and 21-2 in common. Accordingly, the first cover member 23 may support or protect the first surface of each of the first and second vibration parts 21-1 and 21-2 in common.

The second cover member 25 may be disposed at the second surface of each of the first and second vibration parts 21-1 and 21-2. For example, the second cover member 25 may be configured to cover the second electrode layer 21*c* of each of the first and second vibration parts 21-1 and 21-2 in common. Accordingly, the second cover member 25 may support or protect the second surface of each of the first and second vibration parts 21-1 and 21-2 in common.

Each of the first cover member 23 and the second cover member 25 according to an embodiment of the present disclosure may be configured as a material which is be substantially the same as the first cover member 23 and the second cover member 25 described above with reference to FIG. 4, and thus, like reference numeral refer to like element and the repetitive description thereof may be omitted.

The first cover member 23 according to an embodiment of the present disclosure may be disposed at the first surface of each of the first and second vibration parts 21-1 and 21-2 by a first adhesive layer 22. For example, the first cover member 23 may be directly disposed at the first surface of each of the first and second vibration parts 21-1 and 21-2 by a film laminating process using the first adhesive layer 22. Accordingly, each of the first and second vibration parts 21-1 and 21-2 may be integrated (or disposed) or tiled with the first cover member 23 to have a certain separation distance SD1.

The second cover member 25 according to an embodiment of the present disclosure may be disposed at the second surface of each of the first and second vibration parts 21-1 and 21-2 by a second adhesive layer 24. For example, the second cover member 25 may be directly disposed at the second surface of each of the first and second vibration parts 21-1 and 21-2 by a film laminating process using the second adhesive layer 24. Accordingly, each of the first and second vibration parts 21-1 and 21-2 may be integrated (or disposed) or tiled with the second cover member 25 to have a certain separation distance SD1.

The first adhesive layer 22 may be disposed between the first and second vibration parts 21-1 and 21-2 and disposed at the first surface of each of the first and second vibration parts 21-1 and 21-2. For example, the first adhesive layer 22 may be disposed at a rear surface (or an inner surface) of the first cover member 23 facing the first surface of each of the first and second vibration parts 21-1 and 21-2. The first adhesive layer 22 may be filled between the first and second vibration parts 21-1 and 21-2, and filled between the first cover member 23 and the first surface of each of the first and second vibration parts 21-1 and 21-2.

The second adhesive layer 24 may be disposed between the first and second vibration parts 21-1 and 21-2 and disposed at the second surface of each of the first and second vibration parts 21-1 and 21-2. For example, the second adhesive layer 24 may be disposed at a front surface (or an inner surface) of the second cover member 25 facing the second surface of each of the first and second vibration parts 21-1 and 21-2. The second adhesive layer 24 may be filled between the first and second vibration parts 21-1 and 21-2, and filled between the second cover member 25 and the second surface of each of the first and second vibration parts 21-1 and 21-2.

The first and second adhesive layers 22 and 24 may be connected or coupled to each other at a separation space between the first and second vibration parts 21-1 and 21-2. Therefore, each of the first and second vibration parts 21-1 and 21-2 may be surrounded by the first and second adhesive layers 22 and 24. For example, the first and second adhesive layers 22 and 24 may be configured between the first cover member 23 and the second cover member 25 to completely surround the first and second vibration parts 21-1 and 21-2. For example, each of the first and second vibration parts 21-1 and 21-2 may be embedded or built-in between the first adhesive layer 22 and the second adhesive layer 24.

Each of the first and second adhesive layers 22 and 24 according to an embodiment of the present disclosure may include an electrically insulating material which has adhesiveness and is capable of compression and decompression. For example, each of the first and second adhesive layers 22 and 24 may include an epoxy resin, an acrylic resin, a silicone resin, or a urethane resin, but embodiments of the present disclosure are not limited thereto. Each of the first and second adhesive layers 22 and 24 may be configured to be transparent, translucent, or opaque.

The active vibration member 20 (or the first active vibration member 20-1 and the second active vibration member 20-2) according to another embodiment of the present disclosure may further include a first power supply line PL1, a second power supply line PL2, and a pad part 26.

The first power supply line PL1 may be configured to be electrically connected to the first electrode layer 21*b* of each of the first and second vibration parts 21-1 and 21-2. For example, the first power supply line PL1 may be disposed between the first electrode layer 21*b* and the first cover member 23 of each of the first and second vibration parts 21-1 and 21-2 and may be electrically connected or electrically and directly connected to the first electrode layer 21*b* of each of the first and second vibration parts 21-1 and 21-2. For example, the first power supply line PL1 may be electrically connected to the first electrode layer 21*b* of each of the first and second vibration parts 21-1 and 21-2 through an anisotropic conductive film or a conductive material (or particle) included in the first adhesive layer 22.

The first power supply line PL1 according to an embodiment of the present disclosure may include first and second upper power lines PL11 and PL12 disposed along a second direction Y. For example, the first upper power line PL11 may be connected or electrically and directly connected to the first electrode layer 21*b* of the first vibration part 21-1. The second upper power line PL12 may be connected or electrically and directly connected to the first electrode layer 21*b* of the second vibration part 21-2.

The second power supply line PL2 may be configured to be electrically connected to the second electrode layer 21*c* of each of the first and second vibration parts 21-1 and 21-2. For example, the second power supply line PL2 may be disposed between the second electrode layer 21*c* and the second cover member 25 of each of the first and second vibration parts 21-1 and 21-2 and may be electrically connected or electrically and directly connected to the second electrode layer 21*c* of each of the first and second vibration parts 21-1 and 21-2. For example, the second power supply line PL2 may be electrically connected to the second electrode layer 21*c* of each of the first and second vibration parts 21-1 and 21-2 through an anisotropic conductive film or a conductive material (or particle) included in the second adhesive layer 24.

The second power supply line PL2 according to an embodiment of the present disclosure may include first and second lower power lines PL21 and PL22 disposed along the second direction Y. The first lower power line PL21 may be electrically connected to the second electrode layer 21*c* of the first vibration part 21-1. For example, the first lower power line PL21 may be disposed not to overlap the first upper power line PL11. When the first lower power line PL21 is disposed not to overlap the first upper power line PL11, a short circuit between the first power supply line PL1 and the second power supply line PL2 may be prevented. The second lower power line PL22 may be electrically connected to the second electrode layer 21*c* of the second vibration part 21-2. For example, the second lower power line PL22 may be disposed not to overlap the second upper power line PL12. When the second lower power line PL22 is disposed not to overlap the second upper power line PL12, a short circuit between the first power supply line PL1 and the second power supply line PL2 may be prevented.

The pad part 26 may be configured to be electrically connected to the first power supply line PL1 and the second power supply line PL2. The pad part 26 may be configured at one periphery portion of any one of the first cover member 23 and the second cover member 25 to be electrically connected to one end (or one side) of each of the first power supply line PL1 and the second power supply line PL2.

The pad part 26 according to an embodiment of the present disclosure may include first and second pad electrodes electrically connected to one end (or one side) of the first power supply line PL1, and third and fourth pad electrodes electrically connected to one end (or one side) of the second power supply line PL2.

The first pad electrode may be configured to be electrically connected to one end (or one side) of the first upper power line PL11 of the first power supply line PL1. The second pad electrode may be configured to be electrically connected to one end (or one side) of the second upper power line PL12 of the first power supply line PL1. The third pad electrode may be configured to be electrically connected to one end (or one side) of the first lower power line PL21 of the second power supply line PL2. The second pad electrode may be configured to be electrically connected to one end (or one side) of the second lower power line PL22 of the second power supply line PL2.

The apparatus 3 or the active vibration member 20 according to another embodiment of the present disclosure may further include a signal cable 27. For example, each of the first and second active vibration members 20-1 and 20-2 may further include a signal cable 27.

The signal cable 27 of the first active vibration member 20-1 may be electrically connected to the pad part 26 and may supply the first and second vibration parts 21-1 and 21-2 with a vibration driving signal provided from a sound processing circuit. The signal cable 27 of the second active vibration member 20-2 may be electrically connected to the pad part 26 and may supply the first and second vibration parts 21-1 and 21-2 with a vibration driving signal provided from a sound processing circuit.

The signal cable 27 according to another embodiment of the present disclosure may include a plurality of terminals. For example, the signal cable 27 may include first to fourth terminals.

The first terminal may be electrically connected to the first pad electrode of the pad part 26. The second terminal may be electrically connected to the second pad electrode of the pad part 26. The third terminal may be electrically connected to the third pad electrode of the pad part 26. The fourth terminal may be electrically connected to the fourth pad electrode of the pad part 26. For example, the signal cable 27 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate first to fourth vibration driving signals of an alternating current (AC) type based on a sound data.

Each of the first to fourth vibration driving signals may include a vibration driving signal having a first polarity and a vibration driving signal having a second polarity. For example, the vibration driving signal having the first polarity may be a positive (+) vibration driving signal. The vibration driving signal having the second polarity may be a negative (−) vibration driving signal.

The first vibration driving signal may be supplied to the first vibration part 21-1 of the first active vibration member 20-1 through the signal cable 27 of the first active vibration member 20-1. For example, the vibration driving signal having the first polarity of the first vibration driving signal may be supplied to the first electrode layer 21*b* of the first vibration part 21-1 through the first terminal of the signal cable 27, the first pad electrode of the pad part 26, and the first upper power line PL11. The vibration driving signal having the second polarity of the first vibration driving signal may be supplied to the second electrode layer 21*c* of the first vibration part 21-1 through the second terminal of the signal cable 27, the second pad electrode of the pad part 26, and the first lower power line PL21.

The second vibration driving signal may be supplied to the second vibration part 21-2 of the first active vibration member 20-1 through the signal cable 27 of the first active vibration member 20-1. For example, the vibration driving signal having the first polarity of the second vibration driving signal may be supplied to the first electrode layer 21*b* of the second vibration part 21-2 through the third terminal of the signal cable 27, the third pad electrode of the pad part 26, and the second upper power line PL12. The vibration driving signal having the second polarity of the second vibration driving signal may be supplied to the second electrode layer 21*c* of the second vibration part 21-2 through the fourth terminal of the signal cable 27, the fourth pad electrode of the pad part 26, and the second lower power line PL22.

The third vibration driving signal may be supplied to the first vibration part 21-1 of the second active vibration member 20-2 through the signal cable 27 of the second active vibration member 20-2. For example, the vibration driving signal having the first polarity of the third vibration driving signal may be supplied to the first electrode layer 21*b* of the first vibration part 21-1 through the first terminal of the signal cable 27, the first pad electrode of the pad part 26, and the first upper power line PL11. The vibration driving signal having the second polarity of the third vibration driving signal may be supplied to the second electrode layer 21*c* of the first vibration part 21-1 through the second terminal of the signal cable 27, the second pad electrode of the pad part 26, and the first lower power line PL21.

The fourth vibration driving signal may be supplied to the second vibration part 21-2 of the second active vibration member 20-2 through the signal cable 27 of the second active vibration member 20-2. For example, the vibration driving signal having the first polarity of the fourth vibration driving signal may be supplied to the first electrode layer 21*b* of the second vibration part 21-2 through the third terminal of the signal cable 27, the third pad electrode of the pad part 26, and the second upper power line PL12. The vibration driving signal having the second polarity of the fourth vibration driving signal may be supplied to the second electrode layer 21*c* of the second vibration part 21-2 through the fourth terminal of the signal cable 27, the fourth pad electrode of the pad part 26, and the second lower power line PL22.

Each of the first and second active vibration members 20-1 and 20-2 of the active vibration member 20 according to an embodiment of the present disclosure may individually vibrate based on the vibration driving signal supplied from the sound processing circuit through the corresponding signal cable 27. For example, each of the first and second active vibration members 20-1 and 20-2 may be displaced (or vibrated or driven) in the same direction based on the corresponding vibration driving signal.

The active vibration member 20 or each of the first and second active vibration members 20-1 and 20-2 according to another example embodiment of the present disclosure may be implemented as a thin film type. Accordingly, the active vibration member 20 or each of the first and second active vibration members 20-1 and 20-2 may be bent in a shape corresponding to a shape of the passive vibration member 10, thereby enhancing a sound characteristic and/or a sound pressure level characteristic in the low-pitched sound band generated based on a vibration of the passive vibration member 10. Furthermore, the active vibration member 20 or each of the first and second active vibration members 20-1 and 20-2 according to another example embodiment of the present disclosure may include the first and second vibration parts 21-1 and 21-2 which are arranged (or tiled) at a certain separation distance SD1, so as to be implemented as one single vibration body without being independently driven, and thus, may be driven as a large-area vibration body based on a single-body vibration of the first and second vibration parts 21-1 and 21-2.

Figure 13:
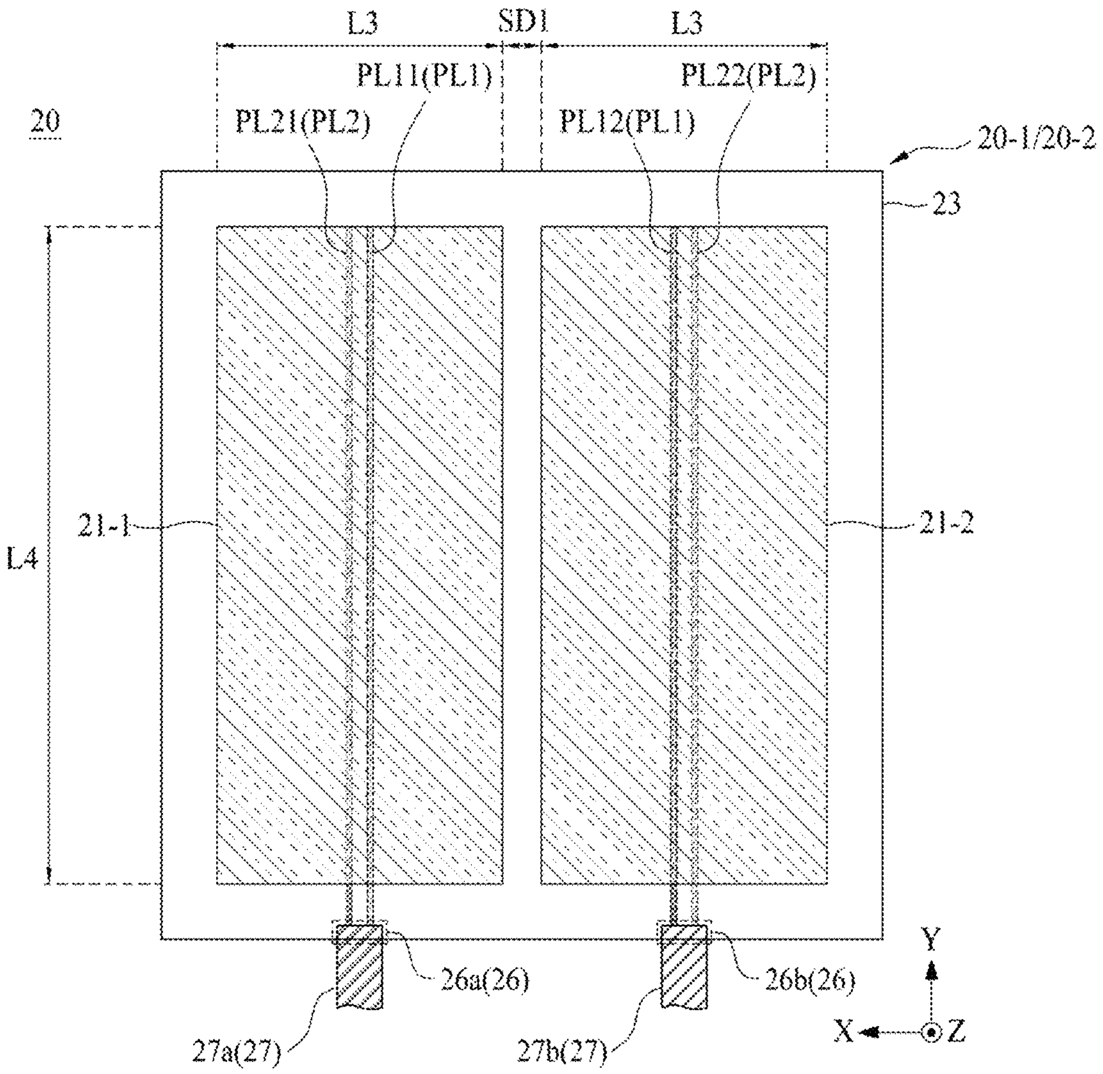
FIG. 13 illustrates an active vibration member according to another embodiment of the present disclosure illustrated in FIG. 9.

FIG. 13 illustrates an active vibration member according to another embodiment of the present disclosure illustrated in FIG. 9. FIG. 13 illustrates an embodiment implemented by changing a signal cable illustrated in FIG. 11. Therefore, in the following description, the other elements other than a signal cable and relevant elements are referred to by like reference numerals, and their repetitive descriptions may be omitted or will be briefly given.

With reference to FIG. 13, in the active vibration member 20 or each of the first and second active vibration members 20-1 and 20-2 according to another embodiment of the present disclosure, the pad part 26 may include a first pad part 26*a* and a second pad part 26*b*.

The first pad part 26*a* may be configured to be adjacent to one side of the first active vibration member 20-1. The first pad part 26*a* may be electrically connected to the first power supply line PL1 and the second power supply line PL2. For example, the first pad part 26*a* may be electrically connected to each of the first upper power line PL11 and the first lower power line P21. For example, the first upper power line PL11 and the first lower power line P21 may be configured to be parallel to each other at the central portion of the first vibration part 21-1.

The second pad part 26*b* may be spaced apart from the first pad part 26*a* and may be configured to be adjacent to one side of the second active vibration member 20-2. The second pad part 26*b* may be electrically connected to the first power supply line PL1 and the second power supply line PL2. For example, the second pad part 26*b* may be electrically connected to each of the second upper power line PL12 and the second lower power line PL22. For example, the second upper power line PL12 and the second lower power line PL22 may be configured to be parallel to each other at the central portion of the second vibration part 21-2.

In the active vibration member 20 or each of the first and second active vibration members 20-1 and 20-2 according to another embodiment of the present disclosure, the signal cable 27 may include a first signal cable 27*a* and a second signal cable 27*b*.

The first signal cable 27*a* may be electrically connected to the first pad part 26*a* and may supply the first vibration part 21-1 with a vibration driving signal (or a sound signal or a voice signal) provided from a sound processing circuit (or a vibration driving circuit or a vibration driving apparatus).

The second signal cable 27*b* may be electrically connected to the second pad part 26*b* and may supply the second vibration part 21-2 with a vibration driving signal (or a sound signal or a voice signal) provided from a sound processing circuit (or a vibration driving circuit or a vibration driving apparatus).

Figure 14:
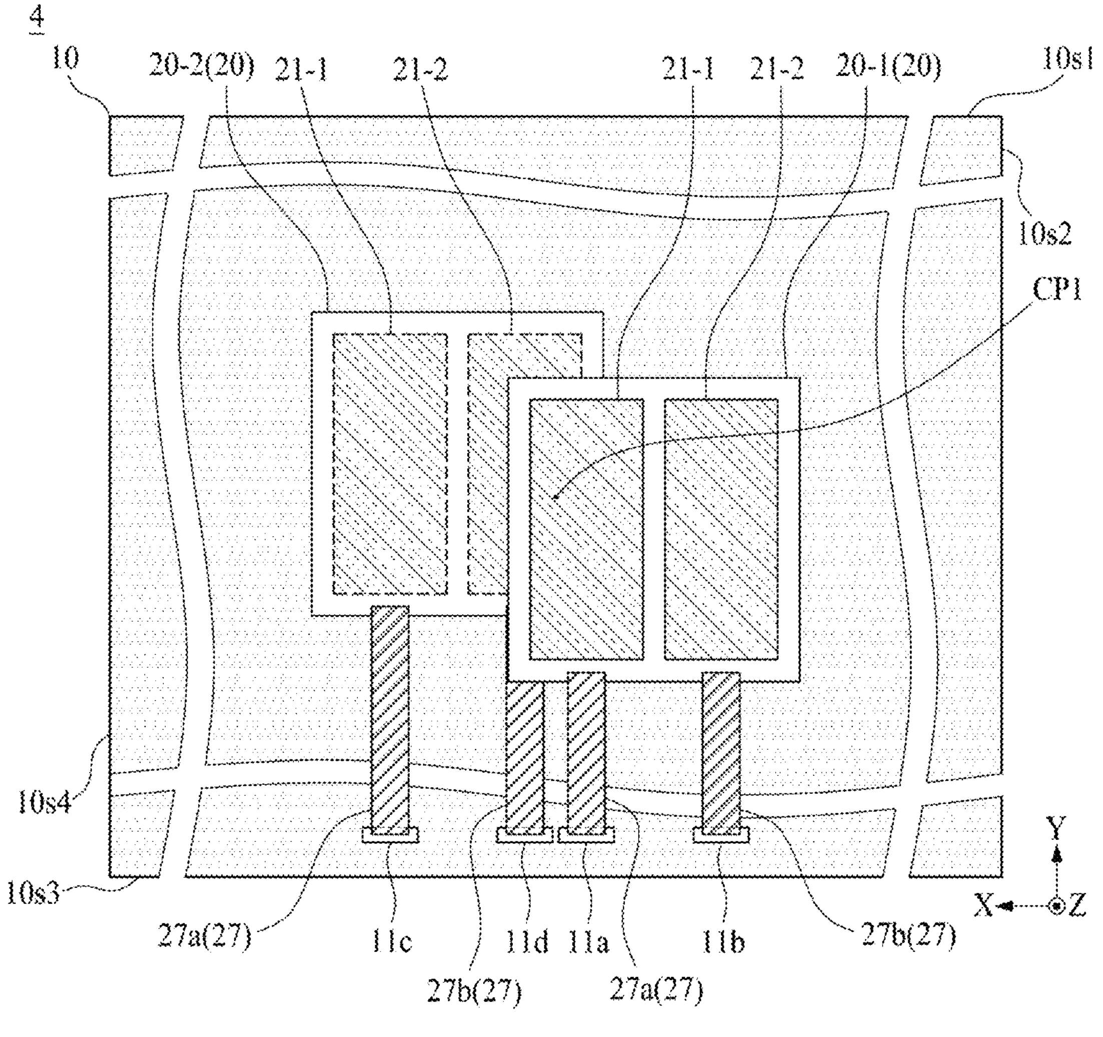
FIG. 14 illustrates a connection structure of a signal cable connected to the active vibration member according to another embodiment of the present disclosure illustrated in FIG. 13.

FIG. 14 illustrates a connection structure of a signal cable connected to the active vibration member according to another embodiment of the present disclosure illustrated in FIG. 13.

With reference to FIGS. 13 and 14, in an apparatus 4 according to another embodiment of the present disclosure, the signal cable 27 connected to the active vibration member 20 may pass through a hole 11 configured at the passive vibration member 10 to be electrically connected to a sound processing circuit. For example, one side of the signal cable 27 may be electrically connected to the pad part 26 of the active vibration member 20, and the other side of the signal cable 27 may be disposed at the second surface 10*b* of the passive vibration member 10 through the hole 11 configured at the passive vibration member 10. For example, the other side of the signal cable 27 may be electrically connected to the sound processing circuit at a rear surface of the second surface 10*b* of the passive vibration member 10. For example, the hole 11 may be a cable hole, a cable through hole, a cable outlet, a cable outlet hole, a slit, or a slot, but embodiments of the present disclosure are not limited thereto.

The passive vibration member 10 according to another embodiment of the present disclosure may include one or more holes 11*a* to 11*d*. For example, the passive vibration member 10 may include first to fourth holes 11*a* to 11*d*. According to an embodiment of the present disclosure, the first hole 11*a* and the second hole 11*b* may be connected (or communicated) to each other. The third hole 11*c* and the fourth hole 11*d* may be connected (or communicated) to each other. Accordingly, the passive vibration member 10 may include one or more holes 11*a* to 11*d* through which the signal cables 27*a* and 27*b* pass. The wiring of the signal cables 27*a* and 27*b* may pass through one or more holes 11*a* to 11 *d* collectively. And, the signal cables 27*a* and 27*b* may be disposed at one side of the passive vibration member 10, the wiring of the signal cables 27*a* and 27*b* may collectively pass through one or more holes 11*a* to 11*d*.

One or more holes 11*a* and 11*d* or the first to fourth holes 11*a* to 11*d* may be configured to penetrate (or vertically pass through) the passive vibration member 10 along a thickness direction Z of the passive vibration member 10.

The first hole 11*a* may be configured at a first part of the passive vibration member 10 adjacent to the first vibration part 21-1 disposed in the first active vibration member 20-1 of the active vibration member 20. Thereby, the first signal cable 27*a* connected to the first pad part 26*a* of the first active vibration member 20-1 may pass through the first hole 11*a* of the passive vibration member 10 to be electrically connected to the sound processing circuit.

The second hole 11*b* may be configured at a second part of the passive vibration member 10 adjacent to the second vibration part 21-2 disposed in the first active vibration member 20-1 of the active vibration member 20. Thereby, the second signal cable 27*b* connected to the second pad part 26*b* of the first active vibration member 20-1 may pass through the second hole 11*b* of the passive vibration member 10 to be electrically connected to the sound processing circuit.

The third hole 11*c* may be configured at a third part of the passive vibration member 10 adjacent to the first vibration part 21-1 disposed in the second active vibration member 20-2 of the active vibration member 20. Thereby, the first signal cable 27*a* connected to the first pad part 26*a* of the second active vibration member 20-2 may pass through the third hole 11*c* of the passive vibration member 10 to be electrically connected to the sound processing circuit.

The fourth hole 11*d* may be configured at a fourth part of the passive vibration member 10 adjacent to the second vibration part 21-2 disposed in the second active vibration member 20-2 of the active vibration member 20. Thereby, the second signal cable 27*b* connected to the second pad part 26*b* of the second active vibration member 20-2 may pass through the fourth hole 11*d* of the passive vibration member 10 to be electrically connected to the sound processing circuit.

Figure 15:
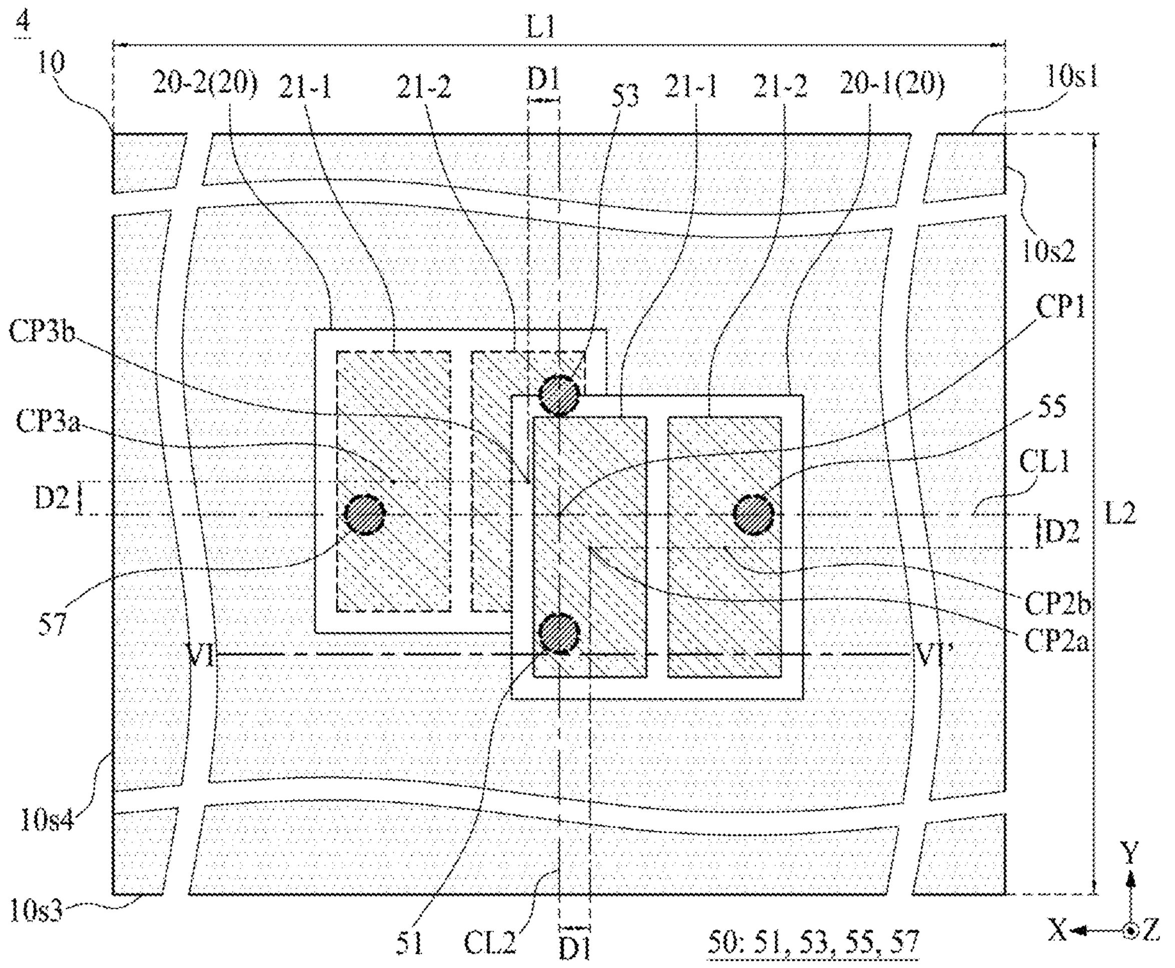
FIG. 15 illustrates an apparatus according to another embodiment of the present disclosure.
Figure 16:
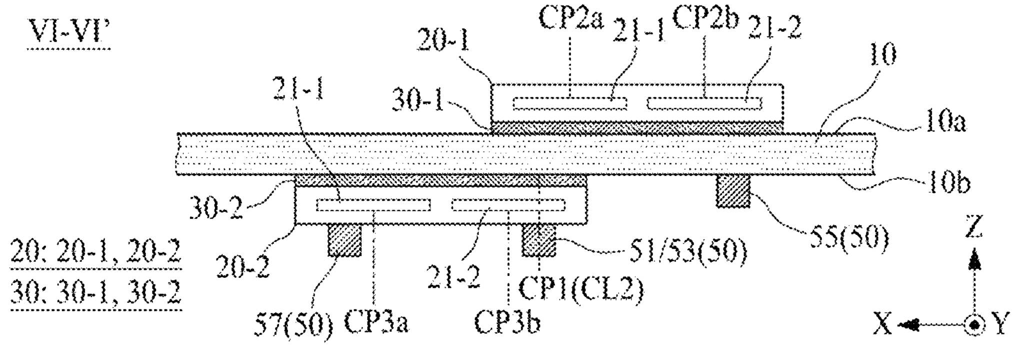
FIG. 16 is a cross-sectional view taken along line VI-VI' of FIG. 15 according to another embodiment of the present disclosure.

FIG. 15 is a cross-sectional view illustrating an apparatus according to another embodiment of the present disclosure. FIG. 16 is a cross-sectional view of line VI-VI' illustrated in FIG. 15 according to another embodiment of the present disclosure. FIGS. 15 and 16 illustrate an embodiment where a weight member added to the apparatus according to an embodiment of the present disclosure described with reference to FIGS. 9 to 14. Therefore, in the following description, the other elements other than a weight member and relevant elements are referred to by like reference numerals, and their repetitive descriptions may be omitted or will be briefly given.

With reference to FIGS. 15 and 16, the apparatus 4 according to another embodiment of the present disclosure may include a passive vibration member 10, an active vibration member 20, and a weight member 50.

Each of the passive vibration member 10 and the active vibration member 20 may be substantially the same as described above with reference to FIGS. 9 to 14, and thus, the repetitive description thereof may be omitted or will be briefly given.

The weight member 50 may be configured to reduce a dip generated in the reproduction frequency band of a sound (or a sound pressure level) generated by a vibration of the active vibration member 20. The weight member 50 may be substantially the same as the weight member 50 described above with reference to FIGS. 7 and 8, the descriptions of FIGS. 7 and 8 may be included in the descriptions of FIGS. 15 and 16.

The weight member 50 according to another embodiment of the present disclosure may include a first weight member 51 and a second weight member 53.

The first weight member 51 may be configured to be spaced apart from each of a center portion CP1 of the passive vibration member 10 and a center portion of a first active vibration member 20-1. For example, the first weight member 51 may be connected or attached to a second surface (or a rear surface) of the second active vibration member 20-2 to be spaced apart from each of the center portion CP1 of the passive vibration member 10 and a center portion CP2*a* of the first vibration part 21-1 in the first active vibration member 20-1. For example, the first weight member 51 may be connected or attached to the second surface (or the rear surface) of the second active vibration member 20-2.

The first weight member 51 according to an embodiment of the present disclosure may be spaced apart from each of the center portion CP1 of the passive vibration member 10 and the center portion CP2*a* of the first vibration part 21-1 in the first active vibration member 20-1, and may be attached to the second surface (or the rear surface) of the second active vibration member 20-2 overlapped with the third region or the fourth region among first to fourth regions of the first vibration part 21-1 in the first active vibration member 20-1. For example, the first vibration part 21-1 of the first active vibration member 20-1 may include a first region (or the first upper region) corresponding to the upper left region, a second region (or the second upper region) corresponding to the upper right region, and a third region (or the first lower region) corresponding to the lower left region, and a fourth region (or the second lower region) corresponding to the lower right region with respect to the center portion CP2*a*.

The first weight member 51 according to an embodiment of the present disclosure may be spaced apart from each of the center portion CP1 of the passive vibration member 10 and the center portion CP2*a* of the first vibration part 21-1 in the first active vibration member 20-1, and may be attached to the second surface (or the rear surface) of the second active vibration member 20-2 overlapped with the second center line CL2 of the passive vibration member 10. For example, the first weight member 51 may be connected or attached to the second surface 10*b* of the passive vibration member 10 to overlap each of the first vibration part 21-1 of the first active vibration member 20-1 and the second center line CL2 of the passive vibration member 10.

The second weight member 53 may be configured to be spaced apart from the first weight member 51. The second weight member 53 may be configured to overlap the first active vibration member 20-1 and the second active vibration member 20-2. The second weight member 53 may be configured to be spaced apart from each of the center portion CP1 of the passive vibration member 10 and the center portion CP3*b* of the second vibration part 21-2 in the second active vibration member 20-2. For example, the second weight member 53 may be connected or attached to the second surface (or the rear surface) of the second active vibration member 20-2 to be spaced apart from each of the center portion CP1 of the passive vibration member 10 and the center portion CP3*b* of the second vibration part 21-2 in the second active vibration member 20-2.

The second weight member 53 according to an embodiment of the present disclosure may be spaced apart from each of the center portion CP1 of the passive vibration member 10 and the center portion CP3*b* of the second vibration part 21-2 in the second active vibration member 20-2, and may be attached to the second surface (or the rear surface) of the second active vibration member 20-2 overlapped with the first region or the second region among the first to fourth regions of the second vibration part 21-2 in the second active vibration member 20-2. For example, the second vibration part 21-2 of the second active vibration member 20-2 may include a first region (or the first upper region) corresponding to the upper left region, a second region (or the second upper region) corresponding to the upper right region, and a third region (or the first lower region) corresponding to the lower left region, and a fourth region (or the second lower region) corresponding to the lower right region with respect to the center portion CP3*b*.

The second weight member 53 according to another embodiment of the present disclosure may be spaced apart from each of the center portion CP1 of the passive vibration member 10 and the center portion CP3*b* of the second active vibration member 20-2, and may be connected or attached to the second surface (or the rear surface) of the second active vibration member 20-2 overlapped with the second center line CL2 of the passive vibration member 10.

The first weight member 51 and the second weight member 53 according to an embodiment of the present disclosure may be arranged in parallel on the second center line CL2 of the passive vibration member 10. For example, the first weight member 51 and the second weight member 53 may be arranged on the second center line CL2 of the passive vibration member 10 so as to be symmetrical to each other with respect to the center portion CP1 of the passive vibration member 10. For example, the first weight member 51 and the second weight member 53 may have a polygonal pillar shape or a cylindrical pillar shape, but embodiments of the present disclosure are not limited thereto. For example, each of the first weight member 51 and the second weight member 53 may be configured as a weight material having a weight. For example, each of the first weight member 51 and the second weight member 53 may be configured as one or more of a metal material, a plastic material, and an elastic material, but embodiments of the present disclosure are not limited thereto. For example, each of the first weight member 51 and the second weight member 53 may have a weight of 20 g or less based on the displacement force (or the bending force) of the active vibration member 20, but embodiments of the present disclosure are not limited thereto.

Each of the first weight member 51 and the second weight member 53 may reduce the lowest resonance frequency (or a lowest natural frequency) of the passive vibration member 10 by increasing the weight in the direct vibration region of the passive vibration member 10 connected to the first active vibration member 20-1 and the second active vibration member 20-2. Thereby, the sound characteristic and/or the sound pressure level characteristic of the low-pitched sound band generated by the vibration of the first active vibration member 20-1 and the second active vibration member 20-2 may be improved. For example, each of the first weight member 51 and the second weight member 53 is configured around the center portion CP1 of the passive vibration member 10 without overlapping the center portion CP1 of the passive vibration member 10, thereby reducing the dip generated in the reproduction frequency band of the sound (or the sound pressure level) generated by the vibration of the first active vibration member 20-1 and the second active vibration member 20-2. Accordingly, the sound characteristic and/or the sound pressure level characteristic of the low-pitched sound band generated by the vibration of the first active vibration member 20-1 and the second active vibration member 20-2 may be further improved, and the flatness of the sound pressure level may be improved in the low-pitched sound band.

The weight member 50 according to another embodiment of the present disclosure may further include a third weight member 55 and a fourth weight member 57.

The third weight member 55 may be configured to overlap the second vibration part 21-2 of the first active vibration member 20-1. The third weight member 55 may improve the dip generated in the low-pitched sound band by generating a vibration mode at the region of the passive vibration member 10 overlapped with the second vibration part 21-2 of the first active vibration member 20-1. For example, a region of the passive vibration member 10 overlapped with the second vibration part 21-2 of the first active vibration member 20-1 may form a node without vibration, thereby generating a large dip in a low-pitched sound band. Accordingly, the third weight member 55 may improve the dip generated in the low-pitched sound band by generating a new vibration mode at the region of the passive vibration member 10 overlapped with the second vibration part 21-2 of the first active vibration member 20-1. For example, the third weight member 55 may improve a dip generated at 300 Hz to 500 Hz.

The third weight member 55 according to an embodiment of the present disclosure may be connected to or attached to a second surface 10*b* of the passive vibration member 10 overlapped with the second vibration part 21-2 of the first active vibration member 20-1. The third weight member 55 may be connected to or attached to the second surface 10*b* of the passive vibration member 10 overlapped the first region or the second region among the first to fourth regions of the second vibration part 21-2 in the first active vibration member 20-1. For example, the second vibration part 21-2 of the first active vibration member 20-1 may include a first region (or a first upper region) corresponding to the upper left region, a second region (or a second upper region) corresponding to the upper right region, a third region (or a first lower region) corresponding to the lower left region, and a fourth region (or a second lower region) corresponding to the lower right region with respect to the center portion CP2*b* of the second vibration part 21-2. For example, the third weight member 55 may be positioned or aligned on the first center line CL1 of the passive vibration member 10 within the first region or second region of the second vibration part 21-2 in the first active vibration member 20-1 to improve the dip generated in the low-pitched sound band, but embodiments of the present disclosure are not limited thereto.

The fourth weight member 57 may be configured to overlap the first vibration part 21-1 of the second active vibration member 20-2. The fourth weight member 57 may improve the dip generated in the low-pitched sound band by generating a vibration mode at the region of the passive vibration member 10 overlapped with the first vibration part 21-1 of the second active vibration member 20-2. For example, a region of the passive vibration member 10 overlapped with the first vibration part 21-1 of the second active vibration member 20-2 may form a node without vibration, thereby generating a large dip in a low-pitched sound band. Accordingly, the fourth weight member 57 may improve the dip generated in the low-pitched sound band by generating a new vibration mode at the region of the passive vibration member 10 overlapped with the first vibration part

21-1 of the second active vibration member 20-2. For example, the fourth weight member 57 may improve a dip generated at 300 Hz to 500 Hz.

The fourth weight member 57 may be connected to or attached to the second surface 10*b* of the second active vibration member 20-2 overlapped with the first vibration part 21-1 of the second active vibration member 20-2. The fourth weight member 57 may be connected to or attached to the second surface 10*b* of the second active vibration member 20-2 overlapped the third region or the fourth region among the first to fourth regions of the first vibration part 21-1 in the second active vibration member 20-2. For example, the first vibration part 21-1 of the second active vibration member 20-2 may include a first region (or a first upper region) corresponding to the upper left region, a second region (or a second upper region) corresponding to the upper right region, a third region (or a first lower region) corresponding to the lower left region, and a fourth region (or a second lower region) corresponding to the lower right region with respect to the center portion CP2*b* of the first vibration part 21-1. For example, the fourth weight member 57 may be positioned or aligned on the first center line CL1 of the passive vibration member 10 within the third region or fourth region of the first vibration part 21-1 in the second active vibration member 20-2 to improve the dip generated in the low-pitched sound band, but embodiments of the present disclosure are not limited thereto.

The third weight member 55 and the fourth weight member 57 according to an embodiment of the present disclosure may be arranged in parallel on the first center line CL1 of the passive vibration member 10. For example, the third weight member 55 and the fourth weight member 57 may be arranged on the first center line CL1 of the passive vibration member 10 so as to be symmetrical to each other with respect to the center portion CP1 of the passive vibration member 10. For example, the third weight member 55 and the fourth weight member 57 may have a polygonal pillar shape or a cylindrical pillar shape, but embodiments of the present disclosure are not limited thereto. For example, each of the third weight member 55 and the fourth weight member 57 may be configured as a weight material having a weight. For example, each of the third weight member 55 and the fourth weight member 57 may be configured as one or more of a metal material, a plastic material, and an elastic material, but embodiments of the present disclosure are not limited thereto. For example, each of third weight member 55 and the fourth weight member 57 may have a weight of 20 g or less based on the displacement force (or the bending force) of the active vibration member 20, but embodiments of the present disclosure are not limited thereto. For example, each of the first to fourth weight members 51 to 57 may be configured to have the same shape, size, and weight, but embodiments of the present disclosure are not limited thereto. For example, one or more of the first to fourth weight members 51 to 57 may be configured to have a different shape, size, and weight from the others.

Figure 17:
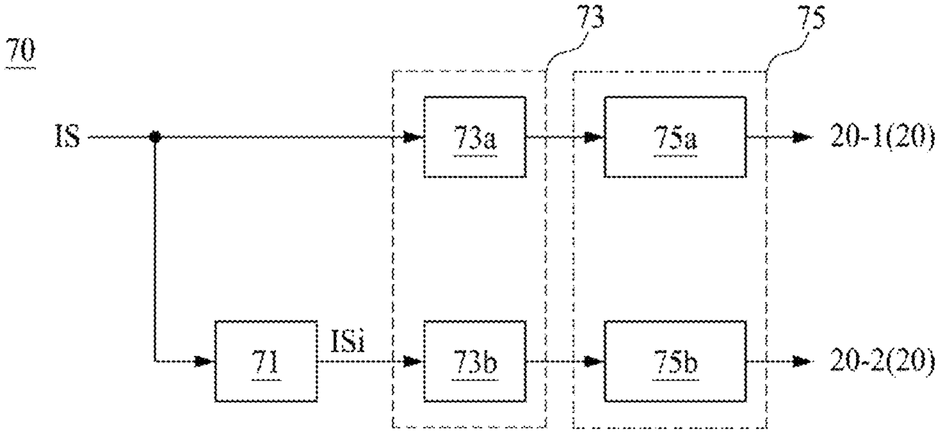
FIG. 17 illustrates a sound processing circuit according to an embodiment of the present disclosure.

FIG. 17 illustrates a sound processing circuit according to an embodiment of the present disclosure. FIG. 17 illustrates a sound processing circuit of an apparatus according to an embodiment of the present disclosure described with reference to FIGS. 1 to 8.

With reference to FIG. 17, a sound processing circuit 70 according to an embodiment of the present disclosure may include a signal inversion circuit 71, a correction circuit 73, and a driving signal generator 75.

The signal inversion circuit (or a phase inversion circuit) 71 may be configured to invert the phase of the input signal IS input according to the control of the host controller of the apparatus and output a phase-inverted input signal ISi. For example, the signal inversion circuit 71 may be configured to invert the phase of the input signal IS by 180 degrees and output the phase-inverted input signal ISi.

The correction circuit 73 may be configured to correct the sound quality of each of the input signal IS input according to the control of the host controller and the phase-inverted input signal ISi input from the signal inversion circuit 71. For example, the correction circuit 73 may cut or amplify the frequency range of each of the input signal IS and the phase-inverted input signal ISi based on a reference level, thereby reinforcing the sound quality of each of the input signal IS and the phase-inverted input signal ISi or improving the sound pressure level to output sound.

The correction circuit 73 according to an embodiment of the present disclosure may include a first correction circuit 73*a* and a second correction circuit 73*b*.

The first correction circuit 73*a* may cut or amplify the frequency range of the input signal IS based on the reference level, thereby reinforcing the sound quality of the input signal IS or improving the flatness of the sound pressure level to output sound. For example, the first correction circuit 73*a* may amplify or attenuate the input signal IS based on the reference level for each frequency to output a first sound correction signal. For example, the first correction circuit 73*a* may be a parametric equalizer, but embodiments of the present disclosure are not limited thereto.

The second correction circuit 73*b* may cut or amplify the frequency range of the phase-inverted input signal ISi based on the reference level, thereby reinforcing the sound quality of the phase-inverted input signal ISi or improving the flatness of the sound pressure level to output sound. For example, the second correction circuit 73*b* may amplify or attenuate the phase-inverted input signal ISi with respect to a reference level for each frequency to output a second sound correction signal. For example, the second correction circuit 73*b* may be a parametric equalizer, but embodiments of the present disclosure are not limited thereto.

The driving signal generator 75 may generate and output a first vibration driving signal and a second vibration driving signal based on each of the first sound correction signal and the second sound correction signal supplied from the correction circuit 73. For example, the first vibration driving signal may be applied to the first active vibration member 20-1 of the active vibration member 20 illustrated in FIG. 1, 5, or 7. The second vibration driving signal may be applied to the second active vibration member 20-2 of the active vibration member 20 illustrated in FIG. 1, 5, or 7.

The driving signal generator 75 according to an embodiment of the present disclosure may include a first driving signal generator 75*a* and a second driving signal generator 75*b*.

The first driving signal generator 75*a* may include a first digital-analog converter and a first amplifier. The first digital-to-analog converter may be configured to convert the first sound correction signal supplied from the correction circuit 73 into a first analog signal to output sound. The first amplifier may be configured to amplify the first analog signal supplied from the first digital-to-analog converter into a first vibration driving signal. The first vibration driving signal may be supplied to the vibration part through a pad part in the first active vibration member 20-1 through the signal cable.

The second driving signal generator 75*b* may include a second digital-analog converter and a second amplifier. The second digital-to-analog converter may be configured to convert the second sound correction signal supplied from the correction circuit 73 into a second analog signal to output sound. The second amplifier may be configured to amplify the second analog signal supplied from the second digital-to-analog converter into a second vibration driving signal. The second vibration driving signal may be supplied to the vibration part through a pad part in the second active vibration member 20-2 through the signal cable.

The sound processing circuit 70 according to an embodiment of the present disclosure may supply the first and second vibration driving signals having opposite phases to each other to the first and second active vibration members 20-1 and 20-2 disposed to be staggered each other. Thereby, the central vibration mode of the passive vibration member 10 is maximized and the mode shape of the peripheral vibration mode of passive vibration member 10 is corrected, and thus one or more of peak and dip generated in the reproduction frequency band of a sound (or a sound pressure level) generated by the vibration of the passive vibration member 10 may be reduced. At this time, the central vibration mode and the peripheral vibration mode are generated by the vibration of the first active vibration member 20-1 and the second active vibration member 20-2. Furthermore, each of the highest sound pressure level and the lowest sound pressure level generated in the reproduction frequency band of the sound (or the sound pressure level) by the vibration of the passive vibration member 10 are reduced, thereby improving the flatness of the sound pressure level.

Figure 18:
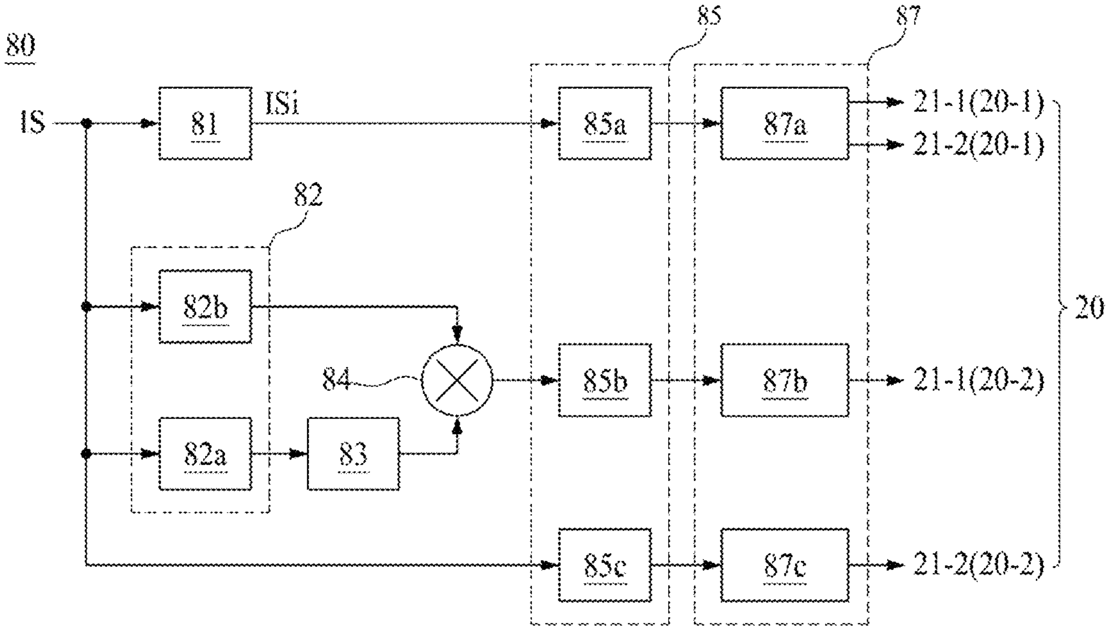
FIG. 18 illustrates a sound processing circuit according to another embodiment of the present disclosure

FIG. 18 illustrates a sound processing circuit according to another embodiment of the present disclosure. FIG. 18 illustrates a sound processing circuit of an apparatus according to another embodiment of the present disclosure described with reference to FIGS. 9 to 16.

With reference to FIG. 18, a sound processing circuit 80 according to another embodiment of the present disclosure may include a signal inversion circuit 81, a signal separation circuit 82, a filter circuit 83, a mixing circuit 84, a correction circuit 85, and a driving signal generator 87.

The signal inversion circuit (or a phase inversion circuit) 81 may be configured to invert the phase of the input signal IS input according to the control of the host controller of the apparatus and output a phase-inverted input signal ISi. For example, the signal inversion circuit 81 may be configured to invert the phase of the input signal IS by 180 degrees and output the phase-inverted input signal ISi.

The signal separation circuit 82 may be configured to separate the input signal IS input according to the control of the host controller into a first sound band signal and a second sound band signal. For example, the signal separation circuit 82 may separate the input signal IS into a low-pitched sound band signal and a high-pitched sound band signal and output sound. For example, the signal separation circuit 82 may be configured to separate the input signal IS into the first sound band signal and the second sound band signal with respect to 250 Hz, and embodiments of the present disclosure are not limited to the above frequency range.

The signal separation circuit 82 according to an embodiment of the present disclosure may include a first signal separation circuit 82*a* and a second signal separation circuit 82*b*.

The first signal separation circuit 82*a* may be configured to output the first sound band signal among the input signals IS input according to the control of the host controller. For example, the first signal separation circuit 82*a* may be configured to output an input signal of less than 250 Hz among the input signals IS. For example, the first signal separation circuit 82*a* may include a crossover circuit, but embodiments of the present disclosure are not limited thereto.

The second signal separation circuit 82*b* may be configured to output the second sound band signal among the input signals IS input according to the control of the host controller. For example, the second signal separation circuit 82*b* may be configured to output an input signal of 250 Hz or more among the input signals IS. For example, the second signal separation circuit 82*b* may include a crossover circuit, but embodiments of the present disclosure are not limited thereto.

The filter circuit 83 may output a first sound band correction signal by shifting the phase of the first sound band signal input from the signal separation circuit 82. The filter circuit 83 may output the first sound band correction signal by delaying the phase of the first low-pitched sound band signal supplied from the signal separation circuit 82. For example, the filter circuit 83 may be configured to output a first sound band correction signal in which the phase of the first sound band signal is shifted or delayed in a range of 135 degrees to 150 degrees. For example, the filter circuit 83 may be a Butterworth filter configured to have a frequency response as flat as possible in a pass band, but embodiments of the present disclosure are not limited thereto.

According to an embodiment of the present disclosure, with respect to the input signal IS, when the first vibration part 21-1 of the first active vibration member 20-1 and the second vibration part 21-2 of the second active vibration member 20-2 partially overlapping each other are the central vibration part, one or more of peak and dip in the low-pitched sound band may be greatly generated due to a vibration deviation between the vibration of the central vibration part and the vibration of the first vibration part 21-1 in the second active vibration member 21-2 or a phase difference between the vibration driving signals, thereby reducing the flatness of the sound pressure level in low-pitched sound band. Accordingly, the filter circuit 83 may shift or delay the phase of the first sound band signal in the range of 135 degrees to 150 degrees, thereby improving one or more of peak and dip in the low-pitched sound band generated due to a vibration deviation between the vibration of the central vibration part and the vibration of the first vibration part 21-1 in the second active vibration member 21-2 or a phase difference between the vibration driving signals. Through this, it is possible to improve the flatness of the sound pressure level in the low-pitched sound band.

The mixing circuit 84 may output a mixing signal by mixing the second sound band signal input from the signal separation circuit 82 and the first sound band correction signal input from the filter circuit 83.

The correction circuit 85 may be configured to correct the sound quality of each of the phase-inverted input signal ISi input from the signal inversion circuit 81, the mixing signal input from the mixing circuit 84, and the input signal IS input according to the control of the host controller. For example, the correction circuit 85 may cut or amplify the frequency range of each of the input signal IS, the phase-inverted input signal ISi, and the mixing signal with respect to a reference level, and thus, the correction circuit 85 may reinforce the sound quality of each of the input signal IS, the phase-inverted input signal ISi, and the mixing signal or improve the flatness of the sound pressure level to output sound.

The correction circuit 85 according to an embodiment of the present disclosure may include a first correction circuit 85*a*, a second correction circuit 85*b*, and a third correction circuit 85*c*.

The first correction circuit 85*a* may cut or amplify the frequency range of the phase-inverted input signal ISi with respect to the reference level, thereby reinforcing the sound quality of the phase-inverted input signal ISi or improving the flatness of the sound pressure level to output sound. For example, the first correction circuit 85*a* may amplify or attenuate the phase-inverted input signal ISi with respect to the reference level for each frequency to output first and second sound correction signals. For example, the first correction circuit 85*a* may be a parametric equalizer, but embodiments of the present disclosure are not limited thereto.

The second correction circuit 85*b* may cut or amplify the frequency range of the mixing signal with respect to the reference level, thereby reinforcing the sound quality of the mixing signal or improving the flatness of the sound pressure level to output sound. For example, the second correction circuit 85*b* may amplify or attenuate the mixing signal with respect to the reference level for each frequency to output a third sound correction signal. For example, the second correction circuit 85*b* may be a parametric equalizer, but embodiments of the present disclosure are not limited thereto.

The third correction circuit 85*c* may cut or amplify the frequency range of the input signal with respect to the reference level, thereby reinforcing the sound quality of the input signal IS or improving the flatness of the sound pressure level to output sound. For example, the third correction circuit 85*c* may amplify or attenuate the input signal IS with respect to the reference level for each frequency to output a fourth sound correction signal. For example, the third correction circuit 85*c* may be a parametric equalizer, but embodiments of the present disclosure are not limited thereto.

The driving signal generator 87 may generate and output first to fourth vibration driving signals based on each of the first to the fourth sound correction signals supplied from the correction circuit 85. For example, the first vibration driving signal may be applied to the first vibration part 21-1 in the first active vibration member 20-1 of the active vibration member 20 illustrated in FIG. 9, 14, or 15. The second vibration driving signal may be applied to the second vibration part 21-2 in the first active vibration member 20-1 of the active vibration member 20 illustrated in FIG. 9, 14, or 15. The third vibration driving signal may be applied to the first vibration part 21-1 in the second active vibration member 20-2 of the active vibration member 20 illustrated in FIG. 9, 14, or 15. The fourth vibration driving signal may be applied to the second vibration part 21-2 in the second active vibration member 20-2 of the active vibration member 20 illustrated in FIG. 9, 14, or 15.

The driving signal generator 87 according to an embodiment of the present disclosure may include a first driving signal generator 87*a*, a second driving signal generator 87*b*, and a third driving signal generator 87*c*.

The first driving signal generator 87*a* may include a first digital-analog converter and a first amplifier. The first digital-to-analog converter may be configured to convert each of the first and sound correction signals supplied from the correction circuit 85 into a first analog signal and a second analog signal to output sound. The first amplifier may be configured to amplify each of the first and second analog signals supplied from the first digital-to-analog converter into the first vibration driving signal and the second vibration driving signal. The first vibration driving signal may be supplied to the first vibration part through a pad part in the first active vibration member 20-1 through the signal cable. The second vibration driving signal may be supplied to the second vibration part through a pad part in the first active vibration member 20-1 through the signal cable.

The second driving signal generator 87*b* may include a second digital-analog converter and a second amplifier. The second digital-to-analog converter may be configured to convert the third correction signal supplied from the correction circuit 85 into a third analog signal to output sound. The second amplifier may be configured to amplify the third analog signal supplied from the second digital-to-analog converter into a third vibration driving signal. The third vibration driving signal may be supplied to the first vibration part through a pad part in the second active vibration member 20-2 through the signal cable.

The third driving signal generator 87*c* may include a third digital-analog converter and a third amplifier. The third digital-to-analog converter may be configured to convert the fourth correction signal supplied from the correction circuit 85 into a fourth analog signal to output sound. The third amplifier may be configured to amplify the fourth analog signal supplied from the third digital-to-analog converter into a fourth vibration driving signal. The fourth vibration driving signal may be supplied to the second vibration part through a pad part in the second active vibration member 20-2 through the signal cable.

The sound processing circuit 80 according to another embodiment of the present disclosure may supply the vibration driving signals having opposite phases to each other to the first and second vibration parts 21-1 and 21-2 tiled to the first active vibration member 20-1 and the second vibration part 21-2 of the second active vibration member 20-2. Further, the sound processing circuit 80 may supply a vibration driving signal phase-delayed or phase-shifted to the first vibration part 21-1 of the second active vibration member 20-2. Accordingly, the central vibration mode of the passive vibration member 10 is maximized and the mode shape of the peripheral vibration mode is corrected, and thus one or more of peak and dip generated in the reproduction frequency band of the sound (or the sound pressure level) generated by the vibration of the passive vibration member 10 may be reduced. At this time, the central vibration mode and the peripheral vibration mode are generated by the vibration of the first active vibration member 20-1 and the second active vibration member 20-2. Furthermore, each of the highest sound pressure level and the lowest sound pressure level generated in the reproduction frequency band of the sound (or the sound pressure level) by the vibration of the passive vibration member 10 are reduced, thereby improving the flatness of the sound pressure level.

Figure 19:
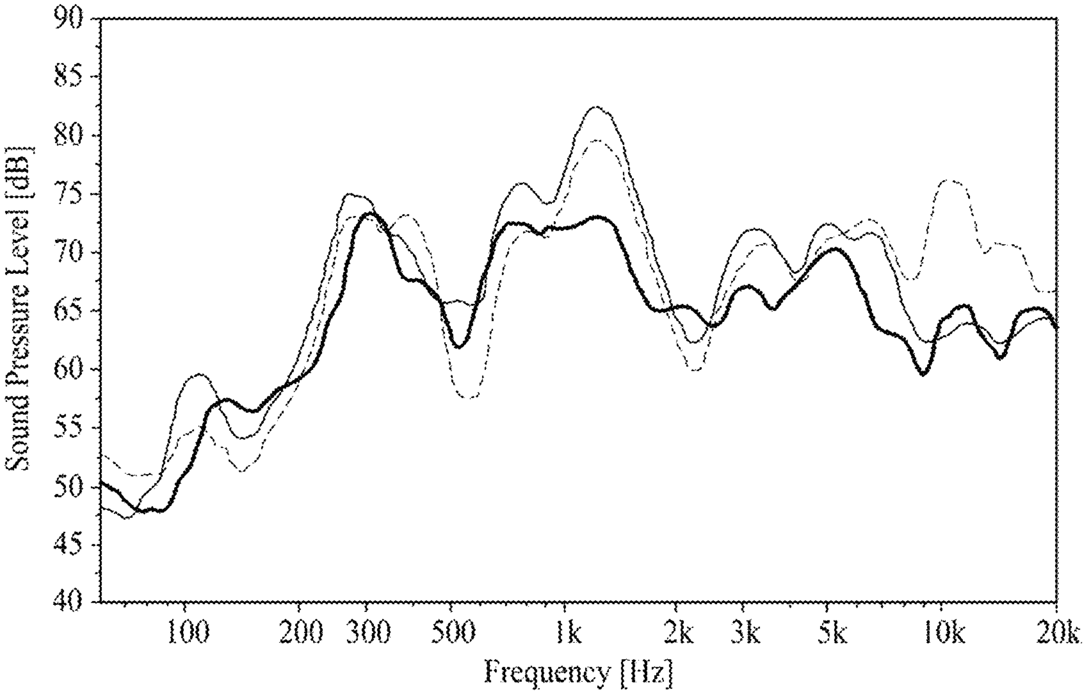
FIG. 19 illustrates a sound output characteristic of an apparatus according to an embodiment of the present disclosure and sound output characteristic of an apparatus according to an experimental example.

FIG. 19 illustrates sound output characteristic of an apparatus according to an embodiment of the present disclosure and sound output characteristic of an apparatus according to an experimental example. In FIG. 19, the abscissa axis represents a frequency in hertz (Hz), and the ordinate axis represents a sound pressure level (SPL) in decibel (dB). In FIG. 19, the thick solid line represents sound output characteristic of the apparatus according to an embodiment of the present disclosure illustrated in FIGS. 9 and 10. The solid line represents sound output characteristic when two active vibration members are overlapped without being staggered each other in the apparatus according to an embodiment of the present disclosure shown in FIGS. 9 and 10. The dotted line represents sound output characteristic when two active vibration members are stacked on the front surface of the passive vibration member. In the apparatus according to an embodiment of the present disclosure and the apparatus according to an experimental example, the passive vibration member is configured as aluminum material.

The sound output characteristic of the apparatus may be measured by a sound analysis equipment. The sound analysis equipment may be configured to a sound card that may transmit and receive the sound signal to or from a control personal computer (PC), an amplifier that may amplify a sound signal generated from the sound card and transfer the amplified sound signal to a vibration device, and a microphone that may collect sound generated at a rearward surface of an apparatus based on driving of the vibration device. The sound collected through the microphone may be input to the control PC through the sound card, and a control program may check the input sound to analyze the sound output characteristic of the apparatus.

The sound output characteristic has been measured in a half anechoic room. During measurement, the input voltage is adjusted to −20 dBFS (dB full scale), the applied frequency signal is applied as a sine sweep within a range of 20 Hz to 20 kHz, and ⅓ octave smoothing has been performed on a measurement result. A separation distance between a rearmost surface of the apparatus and the microphone is adjusted to 50 cm. The measurement method may be not limited thereto.

As seen in FIG. 19, comparing with the solid line, in the thick solid line, it may be seen that a sound pressure level and dip are improved in each of a low-pitched sound band of 300 Hz or less (for example, 120 Hz to 190 Hz) and a high-pitched sound band of 3 kHz or less (for example, 2 kHz to 2.5 kHz). Further, it may be seen that the peak is improved as the flatness of the sound pressure level in a full frequency range is improved. Comparing with the dotted line, in the thick solid line, it may be seen that that the sound pressure level and dip are improved in each of the low-pitched sound band of 300 Hz or less (for example, 110 Hz to 200 Hz), a middle-pitched sound band of 2 kHz or less (for example, 500 Hz to 1.9 kHz), and the high-pitched sound band of 3 kHz or less (for example, 2 kHz to 2.5 kHz). Further, it may be seen that flatness of the sound pressure level is improved in a full frequency range.

Therefore, the apparatus according to an embodiment of the present disclosure includes the first active vibration member 20-1 and the second active vibration member 20-2 disposed to be staggered each other or asymmetrically with respect to the center portion CP1 of the passive vibration member 10, and thus one or more of peak and dip generated in the reproduction frequency band of the sound (or the sound pressure level) generated by the vibration of the passive vibration member 10 may be reduced. Furthermore, each of the highest sound pressure level and the lowest sound pressure level generated in the reproduction frequency band of the sound (or the sound pressure level) generated by the vibration of the passive vibration member 10 are reduced, thereby improving the flatness of the sound pressure level.

Figure 20:
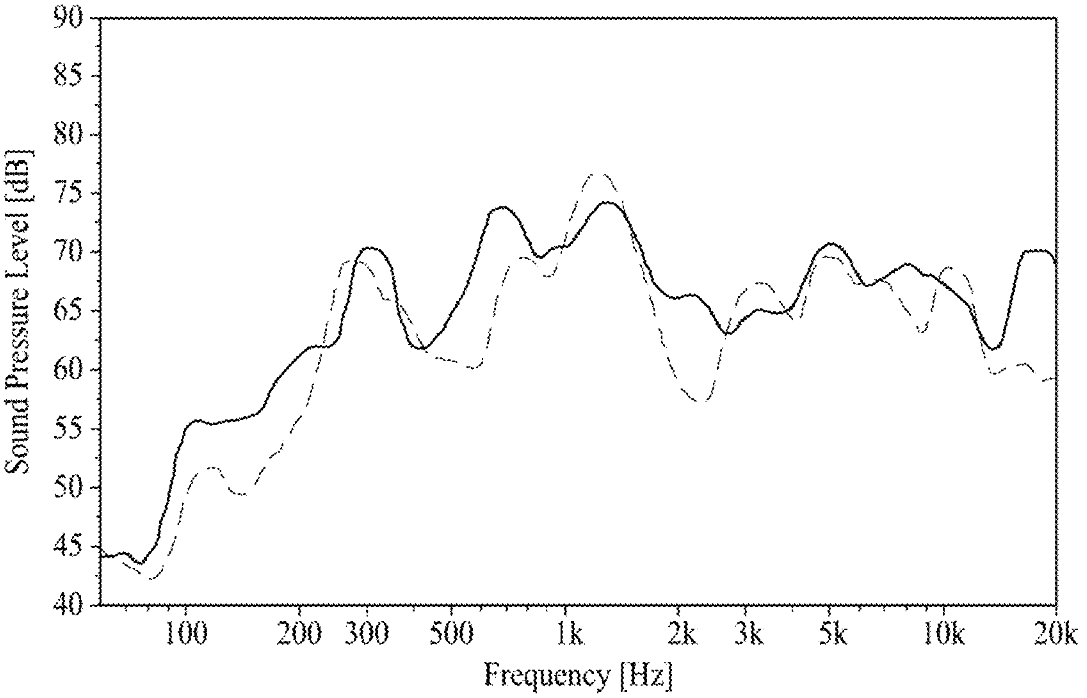
FIG. 20 illustrates a sound output characteristic of an apparatus according to another embodiment of the present disclosure and sound output characteristic of an apparatus according to an experimental example.

FIG. 20 illustrates sound output characteristic of an apparatus according to another embodiment of the present disclosure and sound output characteristic of an apparatus according to an experimental example. In FIG. 20, the abscissa axis represents a frequency in hertz (Hz), and the ordinate axis represents a sound pressure level SPL in decibel (dB). In FIG. 20, the thick solid line represents sound output characteristic of the apparatus according to another embodiment of the present disclosure illustrated in FIGS. 15 and 16. The dotted line represents sound output characteristic when only the first active vibration member is configured on the front surface of the passive vibration member. In the apparatus according to another embodiment of the present disclosure and the apparatus according to the experimental example, the passive vibration member is configured as aluminum material.

The measurement method of the sound output characteristics may be the same as that described in FIG. 19, and thus, repetitive description thereof may be omitted. The sound output characteristic has been measured in a half anechoic room. During measurement, the input voltage is adjusted to 1 Vrms, the applied frequency signal is applied as a sine sweep within a range of 20 Hz to 20 kHz, and ⅓ octave smoothing has been performed on a measurement result. A separation distance between a rearmost surface of the apparatus and the microphone is adjusted to 50 cm. The measurement method may be not limited thereto.

As seen in FIG. 20, comparing with the dotted line, in the thick solid line, it may be seen that the sound pressure level increases in each of a sound band range of 1 kHz or less (for example, 110 Hz to 200 Hz, 410 Hz to 1 kHz) and a sound range of 3 kHz or less (for example, 1.5 kHz to 2.8 kHz) and it may be seen that the dip generated in sound band of each of 150 Hz, 580 Hz, and 2.2 kHz is improved. Further, it may be seen that flatness of the sound pressure level is improved due to the improvement of the peak and the dip in a full frequency range.

Figure 21:
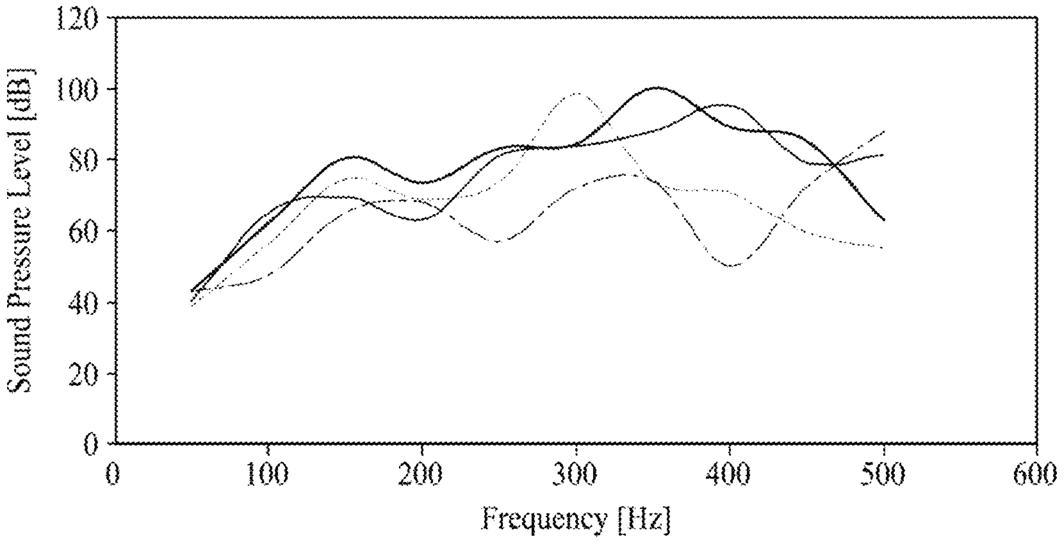
FIG. 21 illustrates a sound output characteristic of an apparatus according to another embodiment of the present disclosure and sound output characteristic of an apparatus according to an experimental example.

FIG. 21 illustrates sound output characteristic of an apparatus according to another embodiment of the present disclosure and sound output characteristic of an apparatus according to an experimental example. In FIG. 21, the abscissa axis represents a frequency in hertz (Hz), and the ordinate axis represents a sound pressure level (SPL) in decibel (dB). In FIG. 21, the thick solid line represents sound output characteristic when the passive vibration member is configured as aluminum material in the apparatus according to another embodiment of the present disclosure illustrated in FIGS. 9 and 10. The solid line represents sound output characteristic when the passive vibration member is configured as paper material in the apparatus according to another embodiment of the present disclosure illustrated in FIGS. 9 and 10. A chain line (or a dash-dotted line) represents sound output characteristic when the passive vibration member is configured as ABS material in the apparatus according to another embodiment of the present disclosure illustrated in FIGS. 9 and 10. The dotted line represents sound output characteristic when only the first active vibration member is configured on the front surface of the passive vibration member configured as aluminum material.

The measurement method of the sound output characteristics may be the same as that described in FIG. 19, and thus, repetitive description thereof may be omitted. The sound output characteristic has been measured in a half anechoic room. During measurement, the input voltage is adjusted to 3 Vrms, the applied frequency signal is applied as a sine sweep within a range of 50 Hz to 500 Hz, and ⅓ octave smoothing has been performed on a measurement result. A separation distance between a rearmost surface of the apparatus and the microphone is adjusted to 50 cm. The measurement method may be not limited thereto.

As seen in FIG. 21, it may be seen that the thick solid line and the solid line, except for the chain line, have the excellent sound pressure level characteristic and flatness characteristic of sound pressure level in low-pitched sound band compared to the dotted line. According to the experiment of FIG. 21, in the apparatus according to an embodiment of the present disclosure, the passive vibration member may be configured as aluminum material, paper material, or ABS material according to the sound pressure level characteristic and the flatness characteristic of the sound pressure level in a low-pitched sound band.

An apparatus according to one or more embodiments of the present disclosure are described below.

An apparatus according to one or more embodiments of the present disclosure may comprise a passive vibration member, and an active vibration member including a first active vibration member and a second active vibration member disposed at the passive vibration member, the first active vibration member and the second active vibration member may be disposed to be staggered each other with respect to a center portion of the passive vibration member.

According to one or more embodiments of the present disclosure, the first active vibration member and the second active vibration member may be disposed in an asymmetrical structure with respect to the center portion of the passive vibration member within a range overlapping each other with the passive vibration member therebetween.

According to one or more embodiments of the present disclosure, the first active vibration member and the second active vibration member may be disposed to be staggered each other in a diagonal direction within a range overlapping each other with the passive vibration member therebetween, and the diagonal direction may be a direction between a first direction and a second direction intersecting the first direction.

According to one or more embodiments of the present disclosure, center portions of each of the first active vibration member and the second active vibration member may be disposed at different quadrants of the passive vibration member.

According to one or more embodiments of the present disclosure, each of a center portion of the first active vibration member and a center portion of the second active vibration member may be spaced apart from the center portion of the passive vibration member by a first distance along a first direction and a second distance along a second direction intersecting the first direction.

According to one or more embodiments of the present disclosure, the passive vibration member may include a first length parallel to the first direction and a second length parallel to the second direction, the first distance may be less than or equal to 0.1 times the first length of the passive vibration member, and, the second distance may be less than or equal to 0.1 times the second length of the passive vibration member.

According to one or more embodiments of the present disclosure, the apparatus may further comprise a weight member configured to be spaced apart from each of the center portion of the passive vibration member, a center portion of the first active vibration member, and a center portion of the second active vibration member.

According to one or more embodiments of the present disclosure, the weight member may comprise first and second weight members disposed at a rear surface of the second active vibration member. The first and second weight members may be symmetrical to each other with respect to the center portion of the passive vibration member.

According to one or more embodiments of the present disclosure, a phase of a vibration driving signal applied to the first active vibration member and a phase of vibration driving signal applied to the second active vibration member may be opposite to each other.

According to one or more embodiments of the present disclosure, each of the first active vibration member and the second active vibration member may comprise a first vibration part and a second vibration part disposed parallel to each other. The first vibration part of the first active vibration member and the second vibration part of the second active vibration member may be disposed to be staggered each other with respect to the center portion of the passive vibration member within a range overlapping each other with the passive vibration member therebetween.

According to one or more embodiments of the present disclosure, each of a center portion of the first vibration part in the first active vibration member and the second vibration part in the second active vibration member may be spaced apart from the center portion of the passive vibration member by a first distance along a first direction and by a second distance along a second direction intersecting the first direction.

According to one or more embodiments of the present disclosure, the passive vibration member may include a first length parallel to the first direction and a second length parallel to the second direction. The first distance may be less than or equal to 0.1 times the first length of the passive vibration member. The second distance may be less than or equal to 0.1 times the second length of the passive vibration member.

According to one or more embodiments of the present disclosure, the apparatus may further comprise a weight member configured to be spaced apart from each of the center portion of the passive vibration member, a center portion of the first vibration part in the first active vibration member, and a center portion of the second vibration part in the second active vibration member.

According to one or more embodiments of the present disclosure, the weight member may comprise first and second weight members disposed at a rear surface of the second active vibration member. The first and second weight members may be symmetrical to each other with respect to the center portion of the passive vibration member.

According to one or more embodiments of the present disclosure, the weight member may further comprise a third weight member configured to overlap the second vibration part in the first active vibration member an d a fourth weight member configured to overlap the first vibration part in the second active vibration member.

According to one or more embodiments of the present disclosure, the third and fourth weight members may be disposed to be symmetrical to each other with respect to the center portion of the passive vibration member.

According to one or more embodiments of the present disclosure, phases of vibration driving signals applied to the first and second vibration parts in the first active vibration member and a phase of a vibration driving signal applied to the second vibration part in the second active vibration member may be opposite to each other. A vibration driving signal applied to the first vibration part of the second active vibration member and a vibration driving signal applied to the second vibration part of the second active vibration member may have a phase difference.

According to one or more embodiments of the present disclosure, the vibration driving signal applied to the first vibration part of the second active vibration member and the vibration driving signal applied to the second vibration part of the second active vibration member may have the phase difference of 135 degrees or more and 150 degrees or less.

According to one or more embodiments of the present disclosure, each of the first vibration part and the second vibration part may comprise a vibration layer having a plurality of inorganic material portions and an organic material portion between the plurality of inorganic material portions, a first electrode layer at a first surface of the vibration layer, and a second electrode layer at a second surface of the vibration layer, the second surface of the vibration layer being different from the first surface of the vibration layer.

According to one or more embodiments of the present disclosure, each of the first vibration part and the second vibration part may further comprise a first cover member configured to commonly cover the first surface of each of the first vibration part and the second vibration part and a second cover member configured to commonly cover the second surface of each of the first vibration part and the second vibration part.

According to one or more embodiments of the present disclosure, each of the first active vibration member and the second active vibration member may comprise a vibration part. The vibration part may comprise a vibration layer having a plurality of inorganic material portions and an organic material portion between the plurality of inorganic material portions, a first electrode layer at a first surface of the vibration layer and a second electrode layer at a second surface of the vibration layer, the second surface of the vibration layer being different from the first surface of the vibration layer.

According to one or more embodiments of the present disclosure, the apparatus may further comprise a signal cable configured to be connected to the active vibration member. The passive vibration member may comprise one or more holes through which the signal cable passes.

According to one or more embodiments of the present disclosure, the passive vibration member may comprise one or more materials of metal, plastic, fiber, leather, wood, cloth, rubber, carbon, glass, and paper.

According to one or more embodiments of the present disclosure, the passive vibration member may comprise one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

According to one or more embodiments of the present disclosure, the first active vibration member may be connected to a first surface of the passive vibration member and the second active vibration member may be connected to a second surface of the passive vibration member different from the first surface of the passive vibration member.

An apparatus according to one or more embodiments of the present disclosure comprises a passive vibration member having first to fourth regions with respect to a center portion, and an active vibration member including a first active vibration member and a second active vibration member, the first and second active vibration members being disposed to overlap the center portion of the passive vibration member, center portions of each of the first active vibration member and the second active vibration member may be spaced apart from the center portion of the passive vibration member to different regions among the first to fourth regions.

According to one or more embodiments of the present disclosure, the center portions of each of the first active vibration member and the second active vibration member may be spaced apart from the center portion of the passive vibration member to different regions in a diagonal direction among the first to fourth regions, and the diagonal direction may be a direction between a first direction and a second direction intersecting the first direction.

According to one or more embodiments of the present disclosure, the center portion of the first active vibration member may be disposed at the fourth region of the passive vibration member, and wherein the center portion of the second active vibration member may be disposed at the first region of the passive vibration member.

According to one or more embodiments of the present disclosure, each of a center portion of the first active vibration member and a center portion of the second active vibration member may be spaced apart from the center portion of the passive vibration member by a first distance along a first direction and a second distance along a second direction intersecting the first direction.

According to one or more embodiments of the present disclosure, the passive vibration member may include a first length parallel to the first direction and a second length parallel to the second direction, the first distance may be less than or equal to 0.1 times the first length of the passive vibration member, and the second distance may be less than or equal to 0.1 times the second length of the passive vibration member.

According to one or more embodiments of the present disclosure, the apparatus may further comprise a weight member configured to be spaced apart from each of the center portion of the passive vibration member, a center portion of the first active vibration member, and a center portion of the second active vibration member.

According to one or more embodiments of the present disclosure, the weight member may comprise first and second weight members disposed at a rear surface of the second active vibration member, and the first and second weight members may be symmetrical to each other with respect to the center portion of the passive vibration member.

According to one or more embodiments of the present disclosure, a phase of a vibration driving signal applied to the first active vibration member and a phase of vibration driving signal applied to the second active vibration member may be opposite to each other.

According to one or more embodiments of the present disclosure, each of the first active vibration member and the second active vibration member may comprise a first vibration part and a second vibration part disposed parallel to each other, and the first vibration part of the first active vibration member and the second vibration part of the second active vibration member may be disposed to be staggered each other with respect to the center portion of the passive vibration member within a range overlapping each other with the passive vibration member therebetween.

According to one or more embodiments of the present disclosure, each of a center portion of the first vibration part in the first active vibration member and a center portion of the second vibration part in the second active vibration member may be spaced apart from the center portion of the passive vibration member by a first distance along a first direction and by a second distance along a second direction intersecting the first direction.

According to one or more embodiments of the present disclosure, the passive vibration member may include a first length parallel to the first direction and a second length parallel to the second direction, the first distance may be less than or equal to 0.1 times the first length of the passive vibration member, and the second distance may be less than or equal to 0.1 times the second length of the passive vibration member.

According to one or more embodiments of the present disclosure, the apparatus may further comprise a weight member configured to be spaced apart from each of the center portion of the passive vibration member, a center portion of the first vibration part in the first active vibration member, and a center portion of the second vibration part in the second active vibration member.

According to one or more embodiments of the present disclosure, the weight member may comprise first and second weight members disposed at a rear surface of the second active vibration member, and the first and second weight members may be symmetrical to each other with respect to the center portion of the passive vibration member.

According to one or more embodiments of the present disclosure, the weight member may further comprise a third weight member configured to overlap the second vibration part in the first active vibration member, and a fourth weight member configured to overlap the first vibration part in the second active vibration member.

According to one or more embodiments of the present disclosure, the third and fourth weight members may be disposed to be symmetrical to each other with respect to the center portion of the passive vibration member.

According to one or more embodiments of the present disclosure, phases of vibration driving signals applied to the first and second vibration parts in the first active vibration member and a phase of a vibration driving signal applied to the second vibration part in the second active vibration member may be opposite to each other, and a vibration driving signal applied to the first vibration part of the second active vibration member and a vibration driving signal applied to the second vibration part of the second active vibration member may have a phase difference.

According to one or more embodiments of the present disclosure, the vibration driving signal applied to the first vibration part of the second active vibration member and the vibration driving signal applied to the second vibration part of the second active vibration member may have the phase difference of 135 degrees or more and 150 degrees or less.

According to one or more embodiments of the present disclosure, each of the first vibration part and the second vibration part may comprise a vibration layer having a plurality of inorganic material portions and an organic material portion between the plurality of inorganic material portions, a first electrode layer at a first surface of the vibration layer, and a second electrode layer at a second surface of the vibration layer, the second surface of the vibration layer being different from the first surface of the vibration layer.

According to one or more embodiments of the present disclosure, each of the first vibration part and the second vibration part may further comprise a first cover member configured to commonly cover the first surface of each of the first vibration part and the second vibration part, and a second cover member configured to commonly cover the second surface of each of the first vibration part and the second vibration part.

According to one or more embodiments of the present disclosure, each of the first active vibration member and the second active vibration member may comprise a vibration part, a vibration layer having a plurality of inorganic material portions and an organic material portion between the plurality of inorganic material portions, a first electrode layer at a first surface of the vibration layer, and a second electrode layer at a second surface of the vibration layer, the second surface of the vibration layer being different from the first surface of the vibration layer.

According to one or more embodiments of the present disclosure, the apparatus may further comprise a signal cable configured to be connected to the active vibration member, and the passive vibration member may comprise one or more holes through which the signal cable passes.

According to one or more embodiments of the present disclosure, the passive vibration member may comprise one or more materials of metal, plastic, fiber, leather, wood, cloth, rubber, carbon, glass, and paper.

According to one or more embodiments of the present disclosure, the passive vibration member may comprise one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

An apparatus according to one or more embodiments of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. And, a vibration generating apparatus according to one or more embodiments of the present disclosure may be applied to or included in an organic light-emitting lighting apparatus or an inorganic light-emitting lighting apparatus. When the vibration generating apparatus is applied to or included in the lighting apparatuses, the lighting apparatuses may act as lighting and a speaker. In addition, when the vibration generating apparatus according to one or more embodiments of the present disclosure is applied to or included in the mobile apparatuses, or the like, the vibration generating apparatus may be one or more of a speaker, a receiver, and a haptic device, but embodiments of the present disclosure are not limited thereto.

It will be apparent to those skilled in the art that various modifications and variations can be made in the apparatus of the present disclosure without departing from the scope of the present disclosure. Thus, it is intended that the present disclosure covers the modifications and variations of this disclosure provided they come within the scope of the appended claims and their equivalents.

What is claimed is:

1. An apparatus, comprising:
- a passive vibration member;
- an active vibration member including a first active vibration member and a second active vibration member disposed at the passive vibration member; and
- a weight member configured to be spaced apart from a center portion of the passive vibration member,
- wherein the first active vibration member and the second active vibration member are disposed to be staggered each other with respect to the center portion of the passive vibration member,
- wherein the weight member comprises first and second weight members disposed at a rear surface of the second active vibration member, and
- wherein the first and second weight members are symmetrical to each other with respect to the center portion of the passive vibration member.

2. The apparatus of claim 1, wherein the first active vibration member and the second active vibration member are disposed in an asymmetrical structure with respect to the center portion of the passive vibration member within a range overlapping each other with the passive vibration member therebetween.

3. The apparatus of claim 1, wherein the first active vibration member and the second active vibration member are disposed to be staggered each other in a diagonal direction within a range overlapping each other with the passive vibration member therebetween, and
- wherein the diagonal direction is a direction between a first direction and a second direction intersecting the first direction.

4. The apparatus of claim 1, wherein center portions of each of the first active vibration member and the second active vibration member are disposed at different quadrants of the passive vibration member.

5. The apparatus of claim 1, wherein each of a center portion of the first active vibration member and a center portion of the second active vibration member is spaced apart from the center portion of the passive vibration member by a first distance along a first direction and a second distance along a second direction intersecting the first direction.

6. The apparatus of claim 5, wherein the passive vibration member includes a first length parallel to the first direction and a second length parallel to the second direction,
- wherein the first distance is less than or equal to 0.1 times the first length of the passive vibration member, and
- wherein the second distance is less than or equal to 0.1 times the second length of the passive vibration member.

7. The apparatus of claim 1, wherein the weight member is configured to be spaced apart from each of a center portion of the first active vibration member and a center portion of the second active vibration member.

8. The apparatus of claim 1, wherein a phase of a vibration driving signal applied to the first active vibration member and a phase of vibration driving signal applied to the second active vibration member are opposite to each other.

9. The apparatus of claim 1, wherein each of the first active vibration member and the second active vibration member comprises a first vibration part and a second vibration part disposed parallel to each other, and
- wherein the first vibration part of the first active vibration member and the second vibration part of the second active vibration member are disposed to be staggered each other with respect to the center portion of the passive vibration member within a range overlapping each other with the passive vibration member therebetween.

10. The apparatus of claim 9, wherein each of a center portion of the first vibration part in the first active vibration member and the second vibration part in the second active vibration member is spaced apart from the center portion of the passive vibration member by a first distance along a first direction and by a second distance along a second direction intersecting the first direction.

11. The apparatus of claim 10, wherein the passive vibration member includes a first length parallel to the first direction and a second length parallel to the second direction, wherein the first distance is less than or equal to 0.1 times the first length of the passive vibration member, and wherein the second distance is less than or equal to 0.1 times the second length of the passive vibration member.

12. The apparatus of claim 9, wherein the weight member is configured to be spaced apart from each of a center portion of the first vibration part in the first active vibration member and a center portion of the second vibration part in the second active vibration member.

13. The apparatus of claim 12, wherein the weight member further comprises:

a third weight member configured to overlap the second vibration part in the first active vibration member; and a fourth weight member configured to overlap the first vibration part in the second active vibration member.

14. The apparatus of claim 13, wherein the third and fourth weight members are disposed to be symmetrical to each other with respect to the center portion of the passive vibration member.

15. The apparatus of claim 9, wherein phases of vibration driving signals applied to the first and second vibration parts in the first active vibration member and a phase of a vibration driving signal applied to the second vibration part in the second active vibration member are opposite to each other, and wherein a vibration driving signal applied to the first vibration part of the second active vibration member and a vibration driving signal applied to the second vibration part of the second active vibration member have a phase difference.

16. The apparatus of claim 15, wherein the vibration driving signal applied to the first vibration part of the second active vibration member and the vibration driving signal applied to the second vibration part of the second active vibration member have the phase difference of 135 degrees or more and 150 degrees or less.

17. The apparatus of claim 9, wherein each of the first vibration part and the second vibration part of the first active vibration member and each of the first vibration part and the second vibration part of the second active vibration member comprises:

a vibration layer having a plurality of inorganic material portions and an organic material portion between the plurality of inorganic material portions;

a first electrode layer at a first surface of the vibration layer; and a second electrode layer at a second surface of the vibration layer, the second surface of the vibration layer being different from the first surface of the vibration layer.

18. The apparatus of claim 17, wherein each of the first vibration part and the second vibration part of the first active vibration member and each of the first vibration part and the second vibration part of the second active member further comprises:

a first cover member configured to commonly cover the first surface of each of the first vibration part and the second vibration part; and a second cover member configured to commonly cover the second surface of each of the first vibration part and the second vibration part.

19. The apparatus of claim 1, wherein each of the first active vibration member and the second active vibration member comprises a vibration part, and wherein the vibration part comprises:

a vibration layer having a plurality of inorganic material portions and an organic material portion between the plurality of inorganic material portions;

a first electrode layer at a first surface of the vibration layer; and a second electrode layer at a second surface of the vibration layer, the second surface of the vibration layer being different from the first surface of the vibration layer.

20. The apparatus of claim 1, further comprising a signal cable configured to be connected to the active vibration member, wherein the passive vibration member comprises one or more holes through which the signal cable passes.

21. The apparatus of claim 1, wherein the passive vibration member comprises one or more materials of metal, plastic, fiber, leather, wood, cloth, rubber, carbon, glass, and paper.

22. The apparatus of claim 1, wherein the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

23. The apparatus of claim 1, wherein:

the first active vibration member is connected to a first surface of the passive vibration member; and the second active vibration member is connected to a second surface of the passive vibration member different from the first surface of the passive vibration member.

24. An apparatus, comprising:

a passive vibration member having first to fourth regions with respect to a center portion;

an active vibration member including a first active vibration member and a second active vibration member, the first and second active vibration members being disposed to overlap the center portion of the passive vibration member; and a weight member configured to be spaced apart from the center portion of the passive vibration member, wherein center portions of each of the first active vibration member and the second active vibration member are spaced apart from the center portion of the passive vibration member to different regions among the first to fourth regions, wherein the weight member comprises first and second weight members disposed at a rear surface of the second active vibration member, and wherein the first and second weight members are symmetrical to each other with respect to the center portion of the passive vibration member.

25. The apparatus of claim 24, wherein the center portions of each of the first active vibration member and the second active vibration member are spaced apart from the center portion of the passive vibration member to different regions in a diagonal direction among the first to fourth regions, and wherein the diagonal direction is a direction between a first direction and a second direction intersecting the first direction.

26. The apparatus of claim 24, wherein the center portion of the first active vibration member is disposed at the fourth region of the passive vibration member, and wherein the center portion of the second active vibration member is disposed at the first region of the passive vibration member.

27. The apparatus of claim 24, wherein each of the center portion of the first active vibration member and thea center portion of the second active vibration member is spaced apart from the center portion of the passive vibration member by a first distance along a first direction and a second distance along a second direction intersecting the first direction.

28. The apparatus of claim 27, wherein the passive vibration member includes a first length parallel to the first direction and a second length parallel to the second direction, wherein the first distance is less than or equal to 0.1 times the first length of the passive vibration member, and wherein the second distance is less than or equal to 0.1 times the second length of the passive vibration member.

29. The apparatus of claim 24, wherein the weight member is configured to be spaced apart from each of the center portion of the first active vibration member and the center portion of the second active vibration member.

30. The apparatus of claim 24, wherein a phase of a vibration driving signal applied to the first active vibration member and a phase of vibration driving signal applied to the second active vibration member are opposite to each other.

31. The apparatus of claim 24, wherein each of the first active vibration member and the second active vibration member comprises a first vibration part and a second vibration part disposed parallel to each other, and wherein the first vibration part of the first active vibration member and the second vibration part of the second active vibration member are disposed to be staggered each other with respect to the center portion of the passive vibration member within a range overlapping each other with the passive vibration member therebetween.

32. The apparatus of claim 31, wherein each of a center portion of the first vibration part in the first active vibration member and a center portion of the second vibration part in the second active vibration member is spaced apart from the center portion of the passive vibration member by a first distance along a first direction and by a second distance along a second direction intersecting the first direction.

33. The apparatus of claim 32, wherein the passive vibration member includes a first length parallel to the first direction and a second length parallel to the second direction, wherein the first distance is less than or equal to 0.1 times the first length of the passive vibration member, and wherein the second distance is less than or equal to 0.1 times the second length of the passive vibration member.

34. The apparatus of claim 31, wherein the weight member is configured to be spaced apart from each of a center portion of the first vibration part in the first active vibration member and a center portion of the second vibration part in the second active vibration member.

35. The apparatus of claim 34, wherein the weight member further comprises:

a third weight member configured to overlap the second vibration part in the first active vibration member; and a fourth weight member configured to overlap the first vibration part in the second active vibration member.

36. The apparatus of claim 35, wherein the third and fourth weight members are disposed to be symmetrical to each other with respect to the center portion of the passive vibration member.

37. The apparatus of claim 34, wherein phases of vibration driving signals applied to the first and second vibration parts in the first active vibration member and a phase of a vibration driving signal applied to the second vibration part in the second active vibration member are opposite to each other, and wherein a vibration driving signal applied to the first vibration part of the second active vibration member and a vibration driving signal applied to the second vibration part of the second active vibration member have a phase difference.

38. The apparatus of claim 37, wherein the vibration driving signal applied to the first vibration part of the second active vibration member and the vibration driving signal applied to the second vibration part of the second active vibration member have the phase difference of 135 degrees or more and 150 degrees or less.

39. The apparatus of claim 31, wherein each of the first vibration part and the second vibration part of the first active vibration member and each of the first vibration part and the second vibration part of the second active vibration member comprises:

a vibration layer having a plurality of inorganic material portions and an organic material portion between the plurality of inorganic material portions;

a first electrode layer at a first surface of the vibration layer; and a second electrode layer at a second surface of the vibration layer, the second surface of the vibration layer being different from the first surface of the vibration layer.

40. The apparatus of claim 39, wherein each of the first vibration part and the second vibration part of the first active vibration member and each of the first vibration part and the second vibration part of the second active vibration member further comprises:

a first cover member configured to commonly cover the first surface of each of the first vibration part and the second vibration part; and a second cover member configured to commonly cover the second surface of each of the first vibration part and the second vibration part.

41. The apparatus of claim 24, wherein each of the first active vibration member and the second active vibration member comprises a vibration part, and wherein the vibration part comprises:

a vibration layer having a plurality of inorganic material portions and an organic material portion between the plurality of inorganic material portions;

a first electrode layer at a first surface of the vibration layer; and a second electrode layer at a second surface of the vibration layer, the second surface of the vibration layer being different from the first surface of the vibration layer.

42. The apparatus of claim 24, further comprising a signal cable configured to be connected to the active vibration member, wherein the passive vibration member comprises one or more holes through which the signal cable passes.

43. The apparatus of claim 24, wherein the passive vibration member comprises one or more materials of metal, plastic, fiber, leather, wood, cloth, rubber, carbon, glass, and paper.

44. The apparatus of claim 24, wherein the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

* * * * *